US010832212B2

(12) United States Patent
Rhoads et al.

(10) Patent No.: US 10,832,212 B2
(45) Date of Patent: *Nov. 10, 2020

(54) SYSTEMS AND METHODS FOR MANAGING DOCUMENTS FOR LAW FIRMS

(71) Applicant: Thomson Reuters Enterprise Centre GmbH, Zug (CH)

(72) Inventors: Forrest Rhoads, North Oaks, MN (US); Trace Liggett, Rosemount, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 12 days.

This patent is subject to a terminal disclaimer.

(21) Appl. No.: 15/633,481

(22) Filed: Jun. 26, 2017

(65) Prior Publication Data

US 2017/0344947 A1    Nov. 30, 2017

Related U.S. Application Data

(63) Continuation of application No. 13/406,331, filed on Feb. 27, 2012, now Pat. No. 9,710,786, which is a continuation of application No. 10/751,269, filed on Dec. 30, 2003, now Pat. No. 8,126,818.

(60) Provisional application No. 60/480,476, filed on Jun. 19, 2003, provisional application No. 60/437,169, filed on Dec. 30, 2002.

(51) Int. Cl.
*G06Q 50/00* (2012.01)
*G06Q 10/10* (2012.01)
*G06Q 50/18* (2012.01)

(52) U.S. Cl.
CPC ............. *G06Q 10/10* (2013.01); *G06Q 50/18* (2013.01); *G06Q 50/184* (2013.01)

(58) Field of Classification Search
CPC combination set(s) only.
See application file for complete search history.

(56) References Cited

U.S. PATENT DOCUMENTS

| | | |
|---|---|---|
| 5,157,783 A | 10/1992 | Anderson et al. |
| 5,265,065 A | 11/1993 | Turtle |
| 5,418,948 A | 5/1995 | Turtle |
| 5,434,932 A | 7/1995 | Scott |
| 5,488,725 A | 1/1996 | Turtle et al. |

(Continued)

FOREIGN PATENT DOCUMENTS

| | | |
|---|---|---|
| AU | 2002301438 B2 | 9/2006 |
| NZ | 228136 A | 4/1991 |

(Continued)

OTHER PUBLICATIONS

International Search Report for Application No. PCT/US03/41708, date Nov. 24, 2004, 8 pages.

(Continued)

*Primary Examiner* — Farhan M Syed
(74) *Attorney, Agent, or Firm* — Norton Rose Fulbright US LLP

(57) ABSTRACT

The present inventors devised unique systems, methods, interfaces, and software for managing and leveraging knowledge in law firms and potentially other enterprises. For example, one system provides a single user interface for researching case law for online legal research service and identifying and accessing law-firm documents.

18 Claims, 2 Drawing Sheets

(56) References Cited

U.S. PATENT DOCUMENTS

| | | | |
|---|---|---|---|
| 5,497,317 A | 3/1996 | Hawkins et al. | |
| 5,644,720 A | 7/1997 | Boll et al. | |
| 5,794,236 A | 8/1998 | Mehrle | |
| 5,815,392 A | 9/1998 | Bennett et al. | |
| 5,832,494 A | 11/1998 | Egger et al. | |
| 5,859,972 A | 1/1999 | Subramaniam et al. | |
| 5,875,431 A | 2/1999 | Heckman et al. | |
| 5,991,751 A * | 11/1999 | Rivette | G06F 16/34 |
| 6,009,428 A | 12/1999 | Kleewein et al. | |
| 6,556,992 B1 * | 4/2003 | Barney | G06Q 10/10 |
| 6,662,178 B2 * | 12/2003 | Lee | G06Q 10/10 |
| 6,694,331 B2 * | 2/2004 | Lee | G06Q 10/10 707/706 |
| 6,738,760 B1 | 5/2004 | Krachman | |
| 6,772,149 B1 * | 8/2004 | Morelock | G06F 16/334 |
| 7,062,498 B2 * | 6/2006 | Al-Kofahi | G06K 9/6292 |
| 7,315,841 B1 | 1/2008 | McDonald et al. | |
| 7,412,463 B2 | 8/2008 | Mitchell et al. | |
| 7,529,756 B1 * | 5/2009 | Haschart | G06Q 50/18 |
| 7,571,174 B2 | 8/2009 | Arumainayagam et al. | |
| 7,580,939 B2 * | 8/2009 | Al-Kofahi | G06K 9/6292 |
| 7,698,298 B2 | 4/2010 | Ciaramitaro et al. | |
| 7,716,103 B1 * | 5/2010 | Donner | G06Q 10/10 705/30 |
| 7,730,113 B1 * | 6/2010 | Payette | G06Q 10/00 707/821 |
| 7,778,954 B2 * | 8/2010 | Rhoads | G06F 16/951 715/713 |
| 7,797,336 B2 * | 9/2010 | Blair | G06F 16/34 707/773 |
| 7,831,437 B2 | 11/2010 | Bennett et al. | |
| 8,001,129 B2 | 8/2011 | Arumainayagam et al. | |
| 8,126,818 B2 * | 2/2012 | Rhoads | G06Q 10/10 705/310 |
| RE43,391 E | 5/2012 | Costin et al. | |
| 8,185,560 B2 | 5/2012 | Arumainayagam et al. | |
| 8,196,061 B1 | 6/2012 | Bhojan | |
| 2001/0037460 A1 * | 11/2001 | Porcari | G06F 16/93 726/28 |
| 2002/0019741 A1 * | 2/2002 | Heston | G06Q 30/04 705/34 |
| 2002/0049705 A1 * | 4/2002 | Haviv-Segal | G06N 5/025 |
| 2002/0055932 A1 | 5/2002 | Wheeler et al. | |
| 2002/0087597 A1 | 7/2002 | Wilson | |
| 2002/0138465 A1 | 9/2002 | Lee | |
| 2002/0143760 A1 | 10/2002 | Kim et al. | |
| 2002/0147745 A1 * | 10/2002 | Houben | G06F 40/221 715/234 |
| 2002/0165856 A1 * | 11/2002 | Gilfillan | G06F 16/3338 |
| 2003/0046277 A1 * | 3/2003 | Jackson | G06F 16/3334 |
| 2003/0101181 A1 * | 5/2003 | Al-Kofahi | G06K 9/6292 |
| 2003/0144969 A1 | 7/2003 | Coyne | |
| 2004/0095378 A1 | 5/2004 | Vigue et al. | |
| 2004/0193943 A1 | 9/2004 | Angelino et al. | |
| 2005/0010605 A1 | 1/2005 | Conrad et al. | |
| 2005/0149343 A1 | 7/2005 | Rhoads et al. | |
| 2005/0203899 A1 | 9/2005 | Anderson et al. | |
| 2005/0228788 A1 * | 10/2005 | Dahn | G06F 16/951 |
| 2006/0195430 A1 | 8/2006 | Arumainayagam et al. | |
| 2008/0059435 A1 | 3/2008 | Steensgard | |
| 2009/0076836 A1 | 3/2009 | Arvidson et al. | |
| 2009/0150827 A1 | 6/2009 | Meyer et al. | |
| 2010/0268708 A1 | 10/2010 | Zhang et al. | |
| 2010/0312764 A1 | 12/2010 | Liao et al. | |
| 2011/0191335 A1 | 8/2011 | Miller et al. | |
| 2012/0005155 A1 * | 1/2012 | Lynch | G06F 16/93 707/608 |
| 2012/0036077 A1 | 2/2012 | Quinn, Jr. | |
| 2012/0089640 A1 | 4/2012 | Arumainayagam et al. | |
| 2012/0158781 A1 | 6/2012 | Rhoads et al. | |
| 2012/0323880 A9 * | 12/2012 | Al-Kofahi | G06F 16/38 707/708 |

FOREIGN PATENT DOCUMENTS

| | | |
|---|---|---|
| NZ | 280973 A | 2/1997 |
| NZ | 298861 A | 1/1999 |
| NZ | 293197 A | 1/2000 |
| NZ | 336782 A | 1/2000 |
| NZ | 503065 A | 8/2001 |
| NZ | 507194 A | 5/2002 |
| WO | WO-97/12334 A1 | 4/1997 |
| WO | WO-98/55945 A1 | 12/1998 |
| WO | WO-00/43918 A2 | 7/2000 |
| WO | WO-00/67162 A1 | 11/2000 |
| WO | WO-00/77690 A1 | 12/2000 |
| WO | WO-01/33349 A2 | 5/2001 |
| WO | WO-01/33387 A2 | 5/2001 |
| WO | WO-01/067282 A2 | 9/2001 |
| WO | WO-01/82117 A1 | 11/2001 |
| WO | WO-02/01323 A2 | 1/2002 |
| WO | WO-02/29623 A1 | 4/2002 |
| WO | WO-02/31738 A1 | 4/2002 |
| WO | WO-021044932 A2 | 6/2002 |

OTHER PUBLICATIONS

D'Agostini, Bueno, T.C. et al., "Juris Consulto: Retrieval in Jurispredencial Text Bases using Juridial Terminology," Proceedings of the Seventh International Conference on Artificial Intelligence and Law, Oslow, Norway, (1999), pp. 147-155.

Canadian Application Serial. No. 2,512,488, Office Action dated Nov. 5, 2008.

New Zealand Application Serial No. 541580, ExaminationReport dated Jun. 16, 2008.

European Application Serial No. 03800400.8, Supplementary European Search Report dated Mar. 6, 2008.

Canadian Application Serial No. 2,512,488, Office Action dated Sep. 11, 2007.

International Application Serial No. 541580, Examination Report dated Aug. 30, 2006.

International Application Serial No. 541580, Examination Report dated Feb. 27, 2008.

International Application Serial No. 541580, Examination Report dated Sep. 24, 2008.

Australian Application Serial No. 2003300142, Search Report dated Feb. 27, 2009.

"Knowledge Management in a Law Firm," Upgrade, vol. III, No. 1, Feb. 2002, pp. 51-55.

"KnowMaw: Every Lawyer's Dream—The KM Portal," Computers and Law, vol. 11, No. 5, Dec. 2000-Jan. 2001, pp. 9-11.

"Entwicklungen bei Patentdatenbanken," NfD, pp. 331-334, (1995). English translation of "Entwicklungen bei Patentdatenbanken" above.

Canadian Application Serial No. 2,512,488, Office Action dated Oct. 28, 2009, 9 pages.

Japanese Application Serial No. 2005/508649, Office Action dated Nov. 17, 2009, with English translation, 10 pages.

First Amended Notice of Opposition in New Zealand to Grant of Patent dated Sep. 28, 2009, 13 pages.

Notice of Opposition in New Zealand to Grant of Patent dated Jul. 27, 2008, 1 page.

Nemoto, T., "E-Personnel Development," first edition, Chuokeizai-Sha, Inc., Tokio Yamamoto, May 20, 2002, p. 97, with a certified English translation prepared by Kevin Kelley.

European Application Serial No. 03800400.8, Office Action dated May 25, 2009.

Beresford & Co.'s letter of Mar. 23, 2010 with enclosures of original claims and marked- up version of claims, 11 pages.

* cited by examiner

SYSTEMS AND METHODS FOR MANAGING DOCUMENTS FOR LAW FIRMS

RELATED APPLICATIONS

The present application is a continuation of U.S. patent application Ser. No. 13/406,331 filed Feb. 27, 2012 and entitled "SYSTEMS AND METHODS FOR MANAGING DOCUMENTS FOR LAW FIRMS," which is a continuation of U.S. patent application Ser. No. 10/751,269 filed Dec. 30, 2003 and entitled "KNOWLEDGE-MANAGEMENT SYSTEMS FOR LAW FIRMS," which issued Feb. 28, 2012 as U.S. Pat. No. 8,126,818. The present application also claims priority to U.S. Provisional Patent Application No. 60/437,169 filed Dec. 30, 2002 and entitled "SYSTEMS, METHODS, AND SOFTWARE FOR INTEGRATING, SEARCHING, AND/OR MANAGING DOCUMENTS AND DATABASES," and claims priority to U.S. Provisional Patent Application No. 60/480,476 filed Jun. 19, 2003 and entitled "SYSTEMS, METHODS, AND SOFTWARE FOR INTEGRATING, SEARCHING, AND/OR MANAGING DOCUMENTS AND DATABASES." The disclosures of these applications are incorporated herein by reference in their entirety.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright® 2002, Thomson Legal & Regulatory, Inc.

TECHNICAL FIELD

Various embodiments of the present invention concern information retrieval systems and knowledge-management systems, particularly such systems in a legal-research or law-firm context.

BACKGROUND

The American legal system, as well as some other legal systems around the world, rely heavily on written judicial opinions, the written pronouncements of judges, to articulate or interpret the laws governing resolution of disputes. As a consequence, judges and lawyers within our legal system are continually researching an ever expanding body of past opinions, or case law, for the ones most relevant to resolution or prevention of new disputes. Found cases are studied for relevance and are ultimately cited and discussed in documents, called work product, which, for example, advocate court action, counsel clients on likely court actions, or educate clients and lawyers on the state of the law in particular jurisdictions.

Over time, law firms, particularly large one with scores of lawyers and hundreds of clients, amass large collections of work product. In attempting to manage and leverage the value of these collections, many law firms in the last decade or so have sought to use knowledge-managements systems.

Most, if not all, of these systems have been built around document-management systems (DMSs) that assist in storing, indexing, and searching law-firm documents. The indexing and searching capability of these systems allows lawyers to reuse some of their work product, and thus have in some instances enhanced the efficiency of lawyers in developing new work product.

However, the present inventors have recognized that centering a law firm's knowledge management on document-management systems presents at least two problems. First, the document collections in these systems are generally undisciplined in the sense that they include multiple versions of the same document, non-legal documents, and so forth. Thus, searches in the DMS collections often turn up marginally relevant documents or draft documents that frustrate efforts to quickly identify the high-quality finished documents most likely to have reusable content. Second, even when apparently reusable documents are found, it is necessary for lawyers or other highly trained personnel to assess not only whether their legal arguments are of high quality, but also whether their supporting case law has been overruled, weakened, or otherwise affected by newer case law or other legal developments. (Even with online legal research services, such as the Westlaw online service, that allow one to check the validity of case law on a case-by-case basis,) this assessment is generally time consuming and thus offsets the efficiency gains of reusing work product.

Accordingly, the present inventors have identified a need for better systems, tools, and methods of managing and leveraging the accumulated knowledge within law-firm document collections.

SUMMARY

To address this and/or other needs, the present inventors have devised unique systems, methods, interfaces, and software for managing and leveraging knowledge in law firms and potentially other enterprises. For example, one system provides a single user interface for researching case law for online legal research service and identifying and accessing law-firm documents. The interface allows a user, such as an attorney, to initiate or submit a legal research query and view search results that identify not only relevant external documents from the online legal research service, but also relevant internal documents, such as briefs, client letters, and legal memoranda, from the law firm's own document collection.

Moreover, in this exemplary system, the external and internal documents are displayed with validity indicators, such as color-coded icons, that indicate whether cases they cite are still valid law, enabling the attorney to more readily assess the strength or weakness of each identified document.

Notably, the exemplary embodiment provides a seamless integration of the internal and external documents, yet the internal documents never leave the security of the law firm firewalls.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Information System

Figure 1:
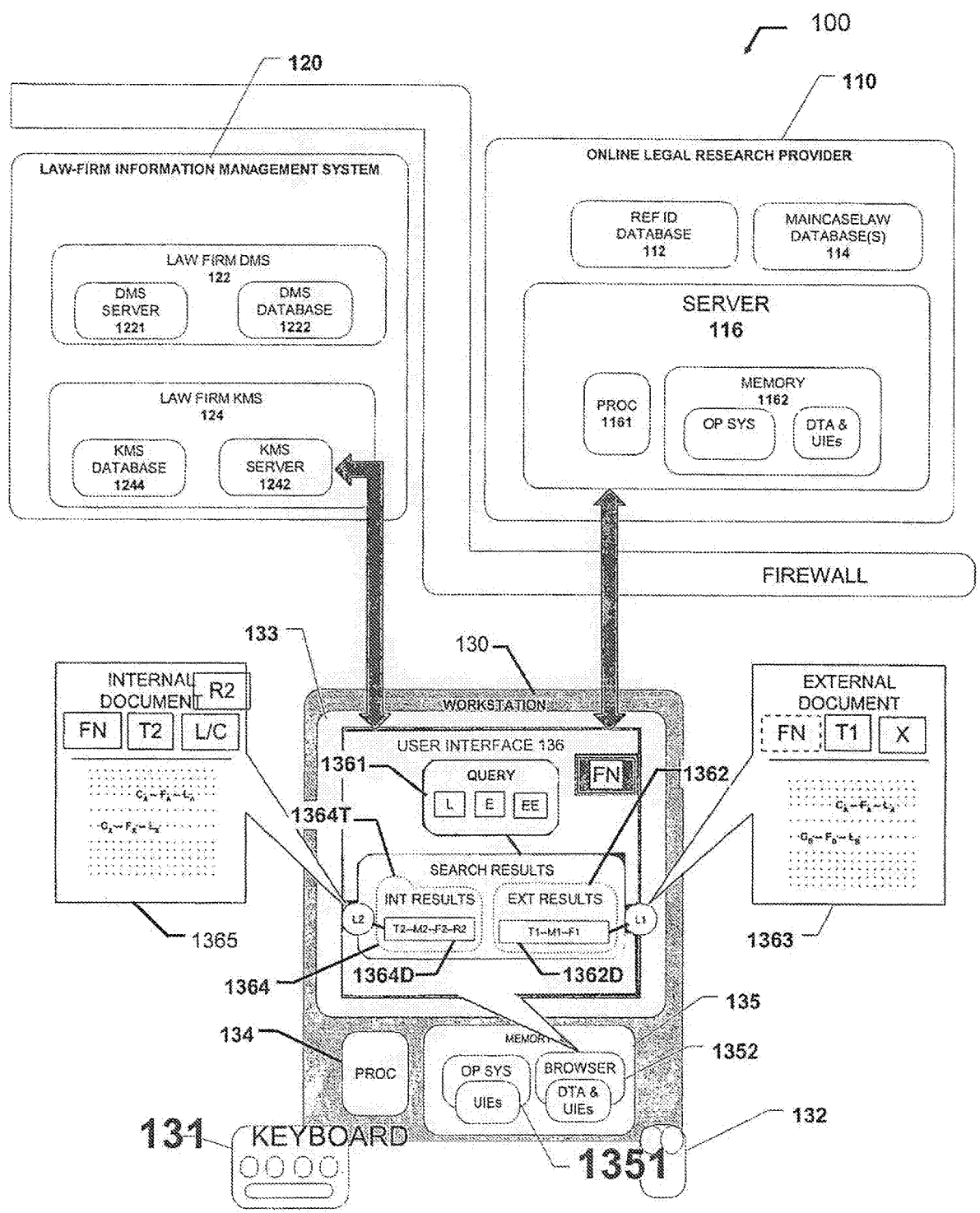
FIG. 1 is a block diagram of an exemplary information system 100 corresponding to one or more embodiments of the present invention.

FIG. 1 depicts an exemplary information retrieval and knowledge management system 100 that incorporates one or more teachings of the present invention. System 100 includes a commercial online legal-data (or research) provider 110, a law-firm information-management system 120, and a client access device 130.

Specifically, commercial online legal data (or research) provider 110 includes main databases 112, reference identification database 114, and server 116. In the exemplary embodiment, main databases 112 contain a wide variety of legal documents, including for example, case law (judicial opinions), legislation, and journal articles. Reference identification database 114 includes a list of document identifiers and corresponding citations, with each document identifier and citation corresponding to a document within main databases 112. Databases 112 are coupled to server 116.

Server 116, representative of one or more servers, includes a processing unit 1161, and a memory 1162. Memory 1161, which can take the form of an electronic, magnetic, or optical computer- (or machine-) readable medium, includes one or more one or more search engines, and other modules and software, such as browser-compatible user-interface elements (UTEs) for receiving and fulfilling queries from clients.

In the exemplary embodiment, server 116 serves active or dynamic content in the form of hypertext markup language (HTML), extensible markup language (XML), or more generally a markup-language, documents or pages. To this end, the exemplary server supports the following web services or protocols: TCP/IP, SOAP (HTTP, HTML, XML), and UDDI. Additionally, the UIEs of server 116 include one or more Java scripts, applets, or other related software and data structures for serving data in association with desired interactive control or user-interface features, objects, modules, or elements. (In some embodiments, the HTML pages include URL or other embedded instructions that include one or more portions of queries submitted from an access device, such as access device 130.) These features work in conjunction with client processor and software platforms to define one or more portions of a browser-based graphical user interface for legal research. Server 116 is coupled or couplable, for example, via an Internet Protocol (IP) network, to law-firm information-management system 120.

Law-firm information-management system 120 includes a document-management subsystem 122, and a knowledge-management subsystem 124. Document-management subsystem (DMS) 122 includes a DMS database server 1221 and a DMS database 1222. DMS database 1222 includes internal firm work-product documents, such as briefs, legal memorandum, opinions, letters, and multiple versions of same in multiple stages of completion. It may also include non-legal materials. The contents of the DMS database are generally associated with metadata profiles indicating authors, creation dates, update dates, client numbers, security settings, access restrictions and so forth.

Knowledge management subsystem (KMS) 124 includes a KMS server 1242 and a KMS database (or document repository) 1244. KMS server 1242, which may present one or more servers depending on loading and performance issues, includes a full-text index module, an engines-and-applications module, an HTML library module, a metadata database module, a citation index module, and a usage-and-tracking module, all of which are not shown as separate items in FIG. 1.

In the exemplary embodiment, full-text-indexer module is used to facilitate general retrieval of documents from KMS database by indexing documents and/or providing index data. Engines-and-applications module includes the following engines and applications: citation-identification engine, full-text search engine, KeyCite Flags engine (see appendix for further details); scheduler application for handling migrating documents from DMS database, DMS integration components, and system administration tools.

HTML library module stores HTML version of each document contained in the research repository, including KeyCite flags and tags. Metadata database module 1242D stores descriptive information and attributes of documents contained in the KMS database, includes information from the DMS database. Citation index module indexes the citations relationships between documents to maintain flags and tags on citations. And, usage-tracking database stores and maintains a historical log of all search and retrieval activity containing detail information by document name, author, area of law, and user ID.

KMS database stores a selected set of high-quality internal work-product documents. In the exemplary embodiment, these documents are copies of documents selected from DMS database 1222. When copied into KMS database 1244, one or more portion of the metadata profile data is also incorporated into KMS database.

Law-firm information-management system 120 and online legal-research provider 110 are both communicatively coupled or couplable, via a local-area network (such a corporate intranet) or wide-area network (such as the Internet) to access device 130.

Access device 130, which is generally representative of one or more access devices within a business organization, such as a law firm, takes the exemplary form of a workstation. In addition to a keyboard 131 (lower left hand corner), a mouse (graphical pointer) 132, and a display 133, access device 130 includes a processing unit 134, a memory module 135, and a browser-compatible legal-research interface 136.

More particularly, processing unit 134 includes at least one processing circuit. Memory module 135, which takes the form of one or more electronic, magnetic, optical machine-readable mediums, includes operating system 1351, a browser application 1352, and a word processor application 1353.

Operating system 1351, which cooperates with processing unit 134 and takes the exemplary form of the Microsoft Windows operating system, includes a set of user-interface objects, modules, or elements, accessible via application programs such as browser application 1352. Browser application 1352 takes exemplary form of a Microsoft Internet Explorer™ or Netscape Navigator browser, cooperates with operating system 1351 and externally provided data, coded instructions (collectively UIEs) from servers such as (external legal-research) server 116 and internal KMS server 1242, to define and render, on display 133, browser-compatible legal research interface 136.

Legal-research interface 136 includes a query portion 1361, an external re-results portion 1362, an external document display portion 1363, an internal-results portion 1364, and an internal document display portion 1365. In the exemplary embodiment, portions 1361-1365 are not necessarily displayed or accessed simultaneously. For example, the interface can include tabs and full-screen-display options that enable the user to focus the display on particular portion of the data or interface portions. One embodiment provides one folder tab to invoke display of a combined listing of internal and external results with corresponding indicators to distinguish internal results from external ones and the other to invoke display of internal results only.

Query portion 1361 includes a label portion L and one or more associated interactive user-interface (UI) elements (objects, features, or widgets), E and EE (referred to hereinafter as label portion 1361L, and elements 1361E and 1361EE.) Label portion 1361L is defined to display a query-indicator label, such as "Search Based on this New Citation," "KeyCite this Citation, or "Search these Databases," to indicate to a user that some form of query input is expected within this portion of the interface. UI element 1361E accepts input from a user. In the exemplary embodiment, this UI element takes the form of a text box or menu, with the menu enabling the use to select a target for the query, such as the KMS database. As a default, the exemplary embodiment will run the query against the KMS database in combination with any other database set that is selected. (Some embodiments provide a set of UI elements that enable the user to select from a number of predefined category- or subject-matter-specific queries. The queries are defined, for example, by expert legal researches in the specific legal areas. A hierarchical organization or outline of the queries facilitates user selection of the appropriate query by the user. The user may also view the details of the predefined queries and modify as desired prior to submission.)

UI element 1361EE allows a user to initiate submission and execution of a query defined via user-interface element 1361E. The exemplary embodiment provides this feature in the form of a "go" button, which upon actuation results in transmission of the defined query (or relevant portion of it) to not only main database 112 (server 116), but also to KMS database XYX for fulfillment. (In some embodiments, the query is submitted only to KMS database XYX.)

External-results portion 1362 is defined to display search results obtained or received from online legal-research provider 110, or more precisely its main database 112. In the exemplary embodiment, external-results portion 1362 includes one or more document identifiers or descriptors 1362D which are displayable in association with corresponding user-interface element L1. Descriptor 1362D provides information regarding a corresponding external-results document within database 112. In the exemplary embodiment, this information includes a title T1, metadata M1, and a case validity flag F1. U1 element L1, for example a hyperlink, provides an option which can be invoked for example, by clicking, to retrieve and display the document(s) associated with descriptor 1362D, as indicated by document display 1363.

Document display 1363, which in some embodiments is presented in a spit-screen along a listing of the internal and/or external results, displays at least a portion of the external document associated with UI element L1. The document includes text (denoted by the broken lines) and legal citations CA and CB, which are respectively associated with case-validity flags FA and FB and hyperlinks LA and LB. Selection of hyperlinks LA and LB all a user retrieve the documents corresponding to the citations from online legal-research provider 110.

Internal-results portion 1364 is defined to display results of querying internal firm database, KMS database 1244. In the exemplary embodiment, internal-results portion 1364 includes one or more sets of document-specific UI elements, such as UI element set 1364D, one or more of which are displayable in association with a corresponding UI element L2. Each UI-element provides data or access to data about the contents of an associated internal-results documents, such as a document title T2, metadata M2, case-law validity flag F2, and law-firm rating R2.

More precisely, metadata M2 includes one or more portion of the metadata associated with the original DMS copy of the identified document. (The exemplary embodiment populates KMS database with copies of documents selected from DMS database.) In the exemplary embodiment, this includes author, client, document ID, dates of creation and revision, etc. Case-law validity flag F2 provides an indication of the validity of case law cited within the corresponding firm document. Law-firm rating R1 provides an indication of the utility and/or quality of the document as determined by previous law-firm users of the document.

UI element L2, similar to UI element L1, provides a user option to retrieve and display the internal document(s) associated with descriptor 1364D. Exercising this option results in a display document display 1365.

Document display 1365, which in some embodiments is presented in a spit-screen along a listing of the internal and/or external results, displays at least a portion of the internal document associated with UI element L2. The document includes text (denoted by the broken lines) and legal citations CA and CX, which are respectively associated with case-validity flags FA and FB and hyperlinks LA and LX. In addition to providing a visual indication of case-law validity, the case-validity flags can be selected in some embodiments to cause retrieval and/or display of further information regarding the nature of the flags. Hyperlinks LA and LX all a user retrieve the documents corresponding to the citations from online legal-research provider 110. In addition to the text and citations, document display 1365 provides a firm-name label FN to clearly identify the document as an internal law firm document, a title label T2 for indicating the title of the corresponding internal document, and a load-copy UI element LC for enabling user to initiate loading of a copy of the corresponding internal document directly into a word processor application of access device 130 for use in generating a new work product document. Moreover, document display portion 1365 also includes a ratings UI-element R1 which enables a user to see the current law-firm-user rating of the document as well as to rate the current document. Figure X shows an exemplary set of UI elements for achieving this rating.

Exemplary Method of Operation

Figure 2:
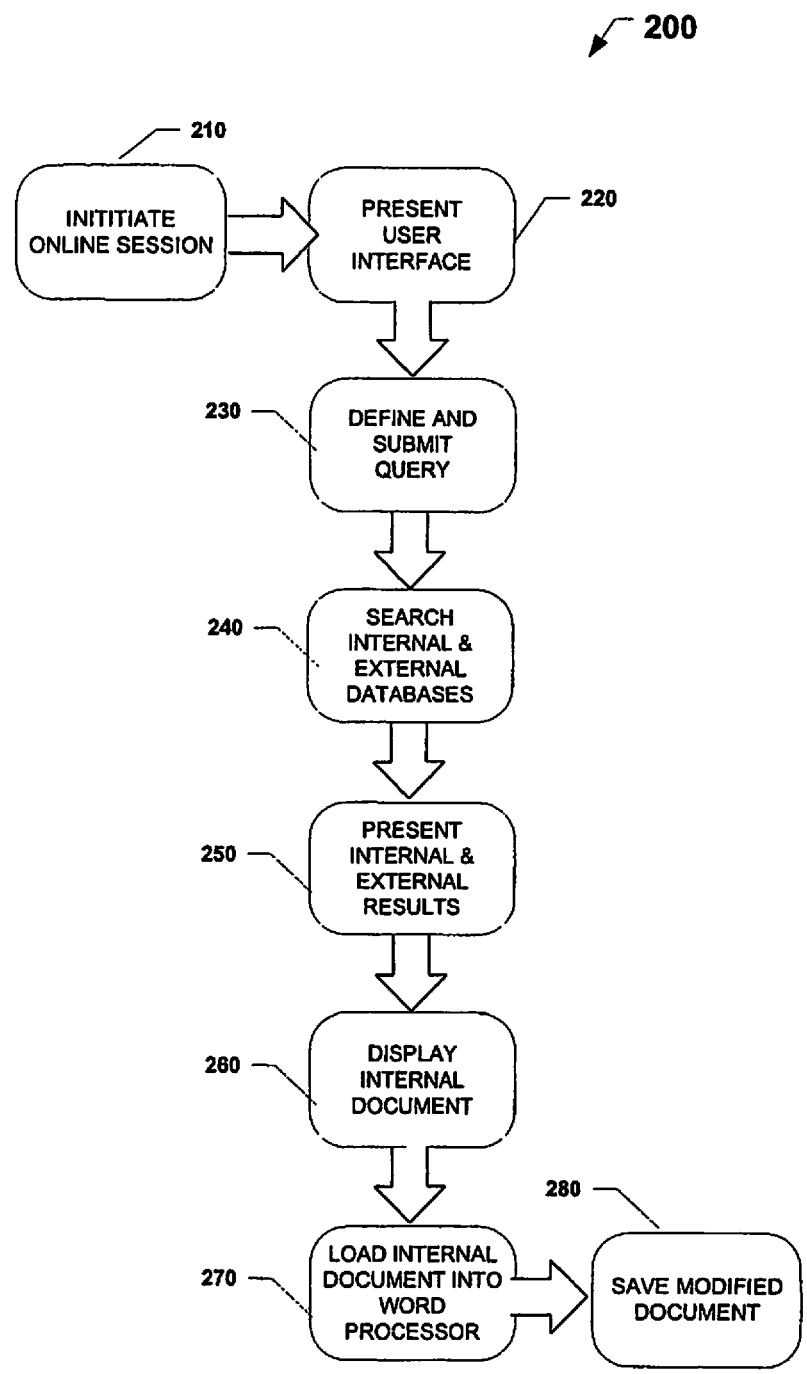
FIG. 2 is a flow chart corresponding to one or more exemplary methods of operating an information system and associated components that embody the present invention.

FIG. 2 shows a flow chart 200 of one or more exemplary methods of operating an information-management system, such as system 100. Flow chart 200 includes blocks 210-280, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with a law-firm user, such as an attorney or paralegal, initiating a search session with online legal-research system 110. In the exemplary embodiment, this entails the user at access device 130 logging onto a law-firm network using security measures, such as an assigned username and password. After login, the user then launches and directs the Internet browser within access device 130 to connect to the online legal research system. In some embodiments, the user enters a separate username and password to initiate the search session, and in others the previous network login suffices. Execution continues at block 220.

Block 220 entails displaying or otherwise loading and presenting one or more portions of legal-research user interface 136. In the exemplary embodiment, this entails server 116 of online legal-research system 110 sending an HTML document (or webpage) that includes scripts, applets, and associated data for causing access device 130 to display query portion 1361 of user interface 136. For users at law firms that have a knowledge management system, such as management system 100, which is provided or authorized by the online legal research system, the associated data includes at least one firm-name label to use in labeling specific portion of the user interface as well as the name of KMS server 1242, which is configured and/or authorized to access KMS database 1244. Execution continues at block 230.

Block 230 entails the user defining and submitting a query. In the exemplary embodiment, this entails the user defining a query using query portion 1361 of interface 136. Query portion includes features, such as a text box or pull-down menus that enable the user to define a citation, natural-language, or terms-and-connectors query. The interface also presents the user an option to specify the scope of the search or query as including one or more databases within online legal research system and/or at least one internal law firm database. Options related to identifying the internal law firm databases are labeled based on the firm-name label provided by the online legal research system. After defining the query, the user submits it to system by actuating a UI element, such as a "go" button, using an input device, such as a mouse or keyboard. The query is then communicated over the Internet to server 116 and KMS server 1242.

Block 240 entails searching databases at one or both of the online legal search system and the law-firm information management system based on the submitted query. In the exemplary embodiment, online legal-search system 110, or more precisely, server 116 executes or causes execution of the query against the requested databases, and returns results the search (external results) to access device 130 in the form of HTML documents with associated control features and data. If the query was defined to include law-firm databases, an applet, script or other device is returned along with the external results of access device 130 to trigger or cause access device to call KMS server 1242 to execute the query against an internal law-firm database, such as KMS database 1244. Some embodiments may call the KMS server concurrently with submission of a query identifying an internal law-firm database. In any case, KMS server executes the search against the KMS databases and serves results in the form of a mark-up language document, such as HTML, to access device 130. Execution of the exemplary method continues at block 250.

Block 250 entails presenting the search results. In the exemplary embodiment, this presentation entails presenting the internal results and the external results via the browser interface in association with one or more sets of UI elements (or interactive control features), as shown in FIG. 1.

Block 260 entails displaying an internal law-firm document from internal results set. In the exemplary embodiment, this entails the user selecting a UI element, such a link, associated with one of the listed internal documents and the KMS server retrieving the document from the KMS database and serving it to the access device. Notably, the KMS server automatically updates the document to the current state of the law—that is, current validity flags are inserted next to all of the authorities in the document. The KMS server requests these from the online legal-research provider—in real time—an inserts them prior to serving up the pages to the access device. Another feature of this interface allows the use to click on an UI element and move the mouse cursor to each place in the document that contained terms from the search, for example, a citation in the case of a citation search.

Block 270 entails loading the displayed internal document into a word-processing application program. In the exemplary embodiment, this entails the user selecting a "load copy" icon LC on the internal-document display portion 1365 of interface 136. In response, user interface 136, which includes an appropriate application program interface, launches or otherwise communicates with the word-processing application to load the document from interface 136 into the word-processing application for user modification. In response, tracking system data within KMS server 1242 is also updated to reflect usage of this internal document. (The exemplary system generally tracks everytime a user clicks on something, specifically creating a usage record indicating the date, time, user, client-mater, type of transaction.)

Block 280 saves the modified copy of the internal document in the DMS database as a new work product document. In the exemplary embodiment, this entails the user also providing metadata profile data for the new document.

Exemplary Method of Building the Research Repository

In the exemplary system of FIG. 1, knowledge-management subsystem 120 includes KMS database 1244, which serves as a research repository of documents selected from DMS database 1224. KMS server 1242 includes software (that is, coded instructions) for automatically migrating or mirroring select documents from firm's DMS or network file system to the KMS database 1242.

In the exemplary embodiment, this migration process initially entails retrieving one or more documents from DMS database, for example, using administrator defined queries and executing those queries on a scheduled basis or event-driven basis. Next, the exemplary method entails converting the retrieved documents into a markup language, such as HTML, subsequently indexing the converted documents based on citations and text. The next series of operations include storing citation relationships, storing the HTML documents with tagged citations, and storing document profile data all in a relevant portion of the KMS server.

APPENDIX

The following appendix includes a detailed user guide and an administrative guide of an exemplary knowledge management-system and related software and components that corresponding to one or more embodiments of the present invention.

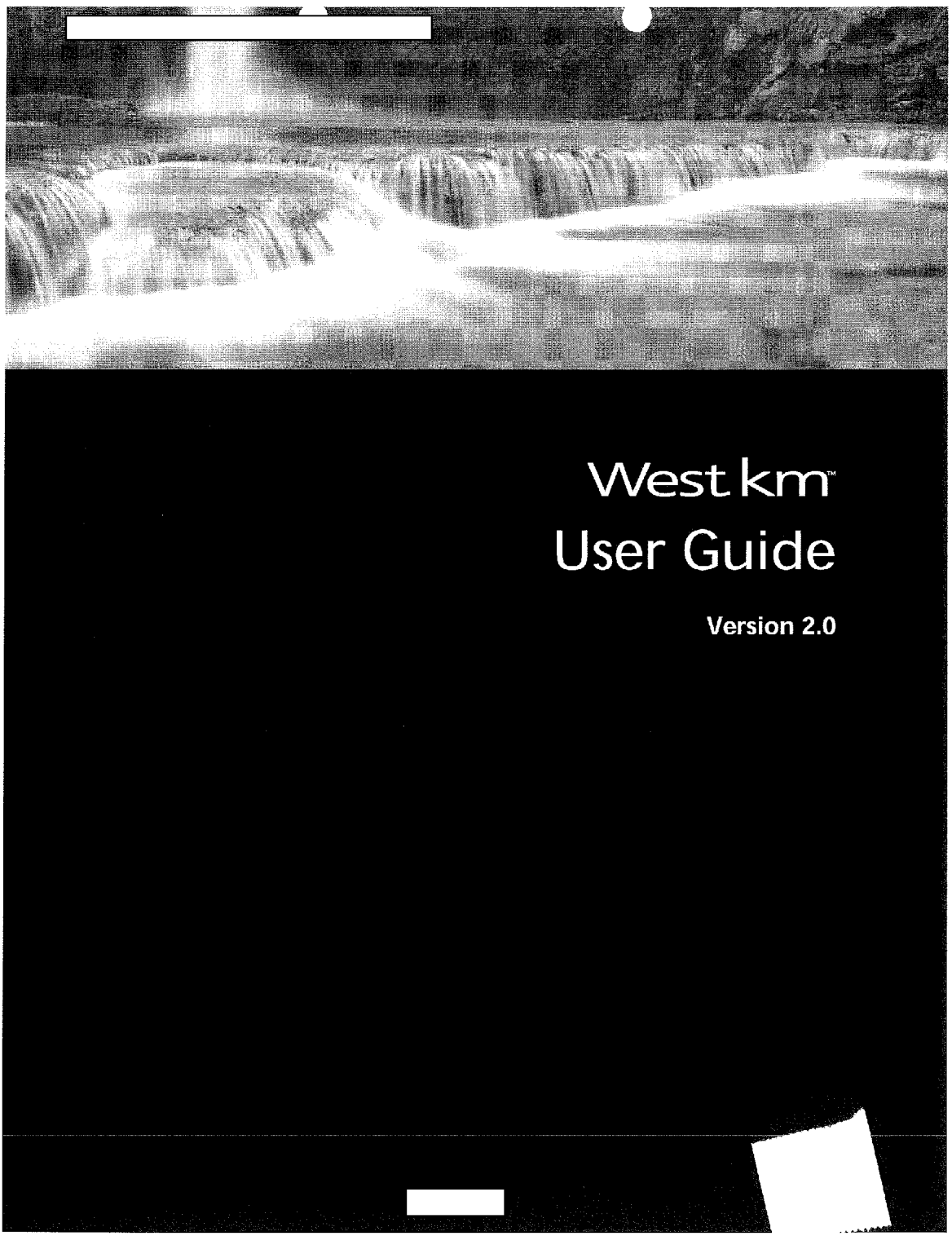

Contents

Welcome to West km........................................1
    West km Features ................................................................................................... 1
    System Requirements .............................................................................................. 1
    West km and Westlaw Usage ................................................................................. 2

Retrieving Your Organization's Documents Using KeyCite ..............3
    Retrieving Citing Documents from a Displayed Westlaw Document ....................... 3
    Retrieving Citing Documents from a Westlaw Citations List ................................. 5

Searching for Your Organization's Documents........................6
    Searching Only Your Organization's Documents .................................................... 6
    Searching Westlaw and Your Organization's Documents ...................................... 8
    Searching for Documents with KeySearch ............................................................ 10
    Using Westlaw Search Methods ............................................................................ 14

Browsing Your Organization's Retrieved Documents .................18
    Viewing a Document ............................................................................................. 18
    Choosing a Page View .......................................................................................... 20
    Opening a Document ............................................................................................ 21

Using Knowledge Management Features ............................22
    Building a Citations List Using KeyCite ................................................................ 23
    Searching Documents ........................................................................................... 24
    Searching for a Document with KeySearch ......................................................... 25
    Detailing a Specific Document .............................................................................. 28

Understanding KeyCite Information .............................29
    KeyCite Status Flags ............................................................................................ 29
    Depth of Treatment Stars ..................................................................................... 31

Generating KeyCite Information for Your Document...................32

Adding Citation Links and KeyCite Status Flags...............................................................32

Updating KeyCite Status Flags.........................................................................................35

Hiding and Showing Citation Links and KeyCite Status Flags.............................................36

Deleting Citation Links and KeyCite Status Flags...............................................................36

Linking to Documents on Westlaw....................................................................................37

Accessing KeyCite Information on Westlaw......................................................................38

Welcome to West km

Welcome to West km (West knowledge management), a legal research product from West that integrates KeyCite and full-text search technology with your organization's internal documents, such as briefs and memoranda.

West km Features

West km allows you to easily find and reuse your organization's best work via westlaw.com and generate KeyCite information for your own word-processing documents. With West km, you can

- build a citations list of your organization's documents.
- search your organization's internal documents using Westlaw® search methods, including Terms and Connectors, Natural Language, and the KeySearch™ hierarchy of legal topics.
- search your organization's internal document and Westlaw documents simultaneously, using those same Westlaw search methods.
- generate KeyCite information for your word-processing document, so you can quickly and easily evaluate the validity of sources that you are citing in your document.
- update KeyCite information in your word-processing document, so you can take advantage of the currentness and accuracy of KeyCite in your own document and quickly identify the citations whose KeyCite status has changed.
- link from your word-processing document directly to documents and KeyCite information on Westlaw.

This guide assumes you have some familiarity with basic searching in westlaw.com; for more information, see *Using westlaw.com*. This guide includes basic information about KeyCite; for detailed information, see *Using KeyCite in westlaw.com*.

System Requirements

Your administrator will index the appropriate documents at your organization so they can be identified with West km. To make use of all West km features once this indexing process is complete, you must have the following:

- The Windows XP, 2000, 98, or 95 operating system
- Microsoft® Word 2002, 2000, or 97 word-processing software (for the feature that allows you to generate KeyCite information for your word-processing document)

- Microsoft Internet Explorer 5.x with JavaScript enabled
- the ability to sign on to your organization's network
- A Westlaw password Depending on your organization's West km setup, a West km username and password may also be required. If so, your administrator will provide this information, and you will be prompted for it when accessing West km content from your Web browser or word-processor.

West km and Westlaw Usage

With West km, the westlaw.com interface allows you to easily access your organization's internal document and Westlaw documents simultaneously.

When you access only your organization's content in westlaw.com, Westlaw usage charges do not apply. Regardless of your pricing method—hourly or transactional—all Westlaw usage charges, including connect and communication charges, are suspended when you do any one of the following activities in westlaw.com:

- access one of your organization's documents in the right frame (see page 18)
- access the Search page for searching only your organization's documents and conduct a search on only your organization's documents (see page 6)
- browse the KeySearch hierarchy for your organization (see page 10)
- click More Information on a results tab and access the West km pages (see page 22)

Westlaw usage charges are activated again when you access content related to Westlaw.

Retrieving Your Organization's Documents Using KeyCite

Once your administrator has indexed your organization's documents to be used with West km, you can easily find your organization's documents that cite Westlaw documents. In westlaw.com, your organization's West km icon indicates that one or more of your organization's internal documents cite a particular Westlaw document.

Retrieving Citing Documents from a Displayed Westlaw Document

When you are viewing cases, statutes, or administrative materials in westlaw.com, your organization's West km icon is displayed in the document header when the document is cited in your organization's documents. To access your organization's documents that cite the Westlaw document, click your organization's West km icon (Figure 1).

Click your organization's West km icon to access your organization's citing documents.

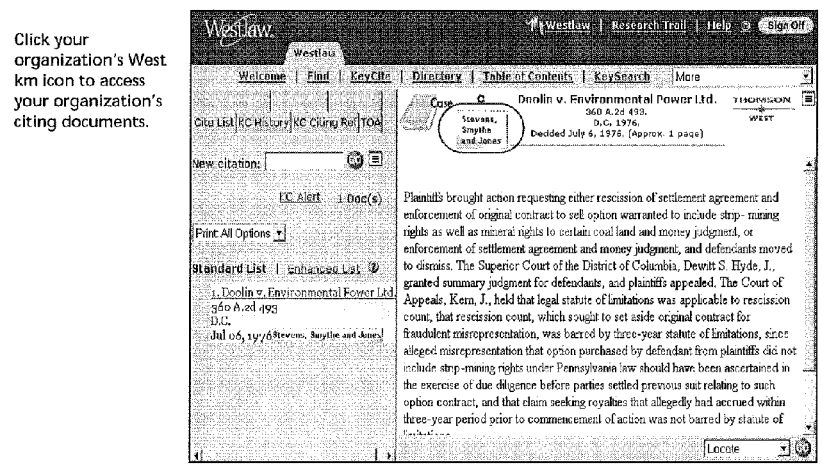

Figure 1: An organization's West km icon in a Westlaw document header

Your organization's citing documents are listed on your organization's Citing Refs subtab, e.g., Stevens Citing Refs (Figure 2). Westlaw sources that cite the document are listed on the KC Citing Refs subtab.

Depending on your organization's settings, your organization's citing documents are listed one of two ways: (1) in reverse chronological order, based on the date the document was last modified, or (2) by their depth of treatment (see page 32), and then reverse chronological order. To restrict the list of your organization's citing documents, such as to an office location, select an item from the *Viewing docs from* drop-down list.

View a list of your organization's citing documents on your organization's Citing Refs subtab.

Figure 2: An organization's Citing Refs subtab

Retrieving Citing Documents from a Westlaw Citations List

West km is also integrated with the other Information Tabs and research tools in westlaw.com. When you are viewing a list of documents on the Cite List, KC History, or TOA tab, or viewing a list of documents from a KeyCite Notes result, your organization's West km icon is displayed next to a document citation when that Westlaw document is cited in your organization's documents.

To access your organization's documents that cite the Westlaw document, click your organization's West km icon next to the document citation (Figure 3).

Click your organization's West km icon to access your organization's citing documents.

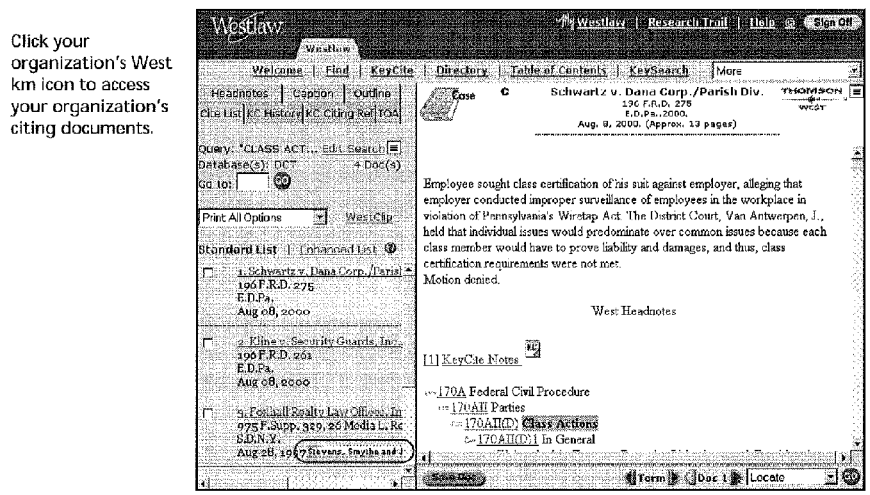

Figure 3: An organization's West km icon on an Information Tab

Your organization's citing documents are listed on your organization's Citing Refs subtab, and the Westlaw document is displayed in the right frame.

Searching for Your Organization's Documents

With West km, you can search your organization's internal documents using the westlaw.com interface and Westlaw search methods. You also have the option to simultaneously search your organization's internal documents and publicly available information on Westlaw. In this way, you can seamlessly access both internal and external sources in your research.

Searching Only Your Organization's Documents

To search only your organization's documents, complete the following steps:

1. Click your organization's Documents link (e.g., Stevens Documents) at the tabbed Westlaw page (Figure 4) in westlaw.com.

Click your organization's Documents link to search only your organization's documents.

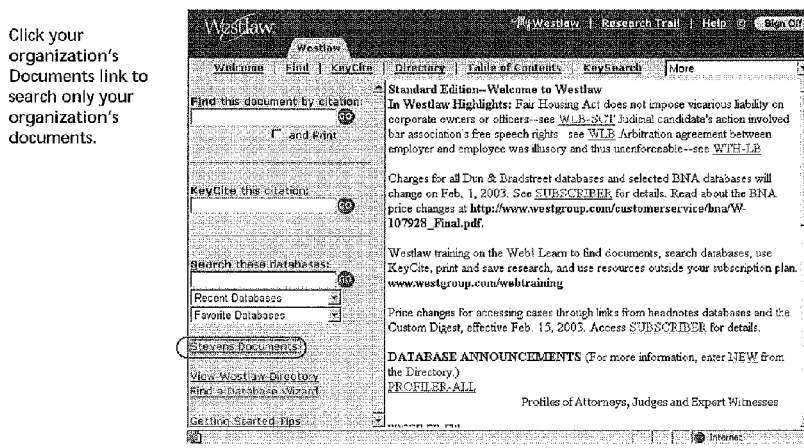

Figure 4: An organization's Documents link at the tabbed Westlaw page

2. At the Search page (Figure 5), click either Terms and Connectors or Natural Language as necessary, depending on the search method you'd like to use. See "Using Westlaw Search Methods" on page 14 for more information.

3. Type either your Terms and Connectors query or your Natural Language description in the text box.

4. Click Search.

Type a Terms and Connectors query or a Natural Language description in the text box and click Search.

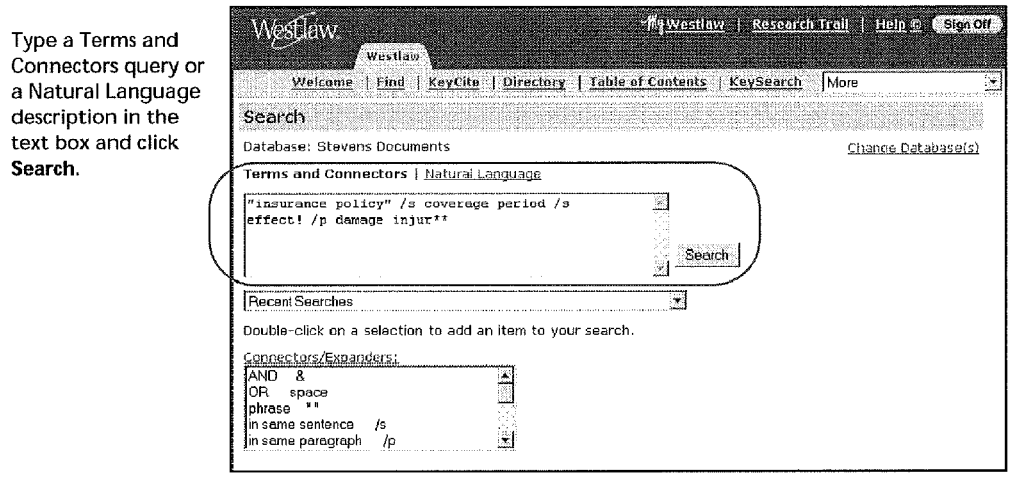

Figure 5: The Search page when searching your organization's documents

Retrieved documents are listed on the Cite List tab, with the first document in the result displayed in the right frame (Figure 6).

When searching your organization's documents, retrieved documents are listed on the Cite List tab.

The first document in the result is displayed in the right frame.

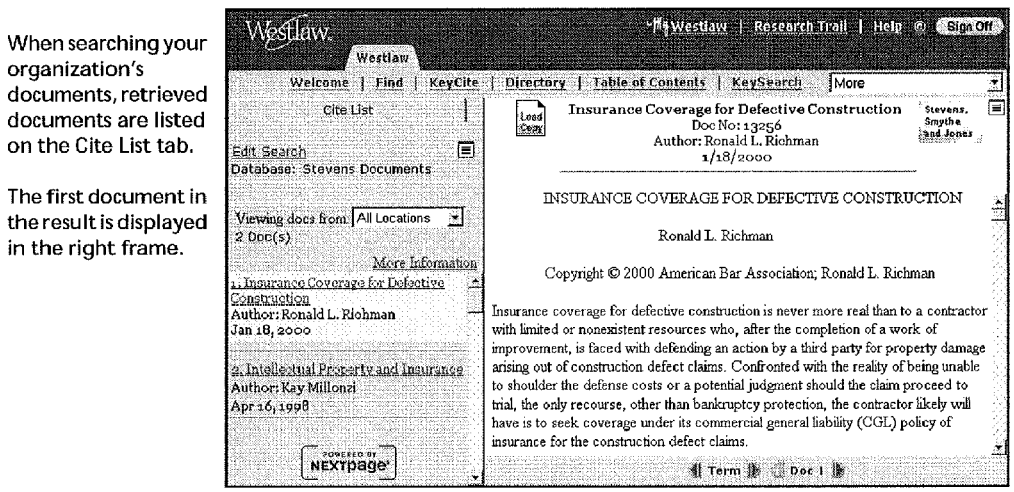

Figure 6: An organization's retrieved documents

To restrict the list of your organization's documents in the search result, such as to an office location, select an item from the *Viewing docs from* drop-down list.

Searching Westlaw and Your Organization's Documents

To simultaneously search your organization's internal documents and Westlaw documents, or to search only Westlaw documents, complete the following steps:

1. At the tabbed Westlaw page in westlaw.com, type up to 10 database identifiers, separated by commas or semicolons, in the *Search these databases* text box and click GO.

2. At the Westlaw database Search page (Figure 7), click Terms and Connectors, Natural Language, or Search by Title as necessary, depending on the search method you'd like to use. See "Using Westlaw Search Methods" on page 14 for more information.

3. Depending on your selected search method, type a Terms and Connectors query, a Natural Language description, or party name(s).

4. If you want to search only Westlaw documents, clear the check box for your organization's documents (e.g., Include Stevens Documents in search) at the Westlaw database Search page. Otherwise, both external and internal documents will be searched.

5. Click Search.

Both Westlaw and your organization's documents are searched when your organization's check box is selected.

To search only Westlaw documents, clear your organization's check box.

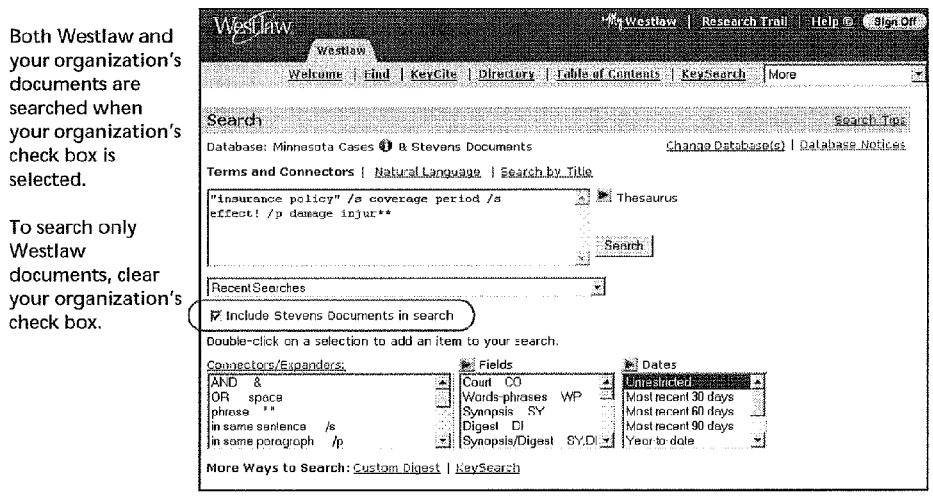

Figure 7: The Westlaw database Search page

Retrieved Westlaw documents are listed on the Westlaw Results subtab, with the first Westlaw document in the result displayed in the right frame (Figure 8).

View retrieved Westlaw sources on the Westlaw Results subtab.

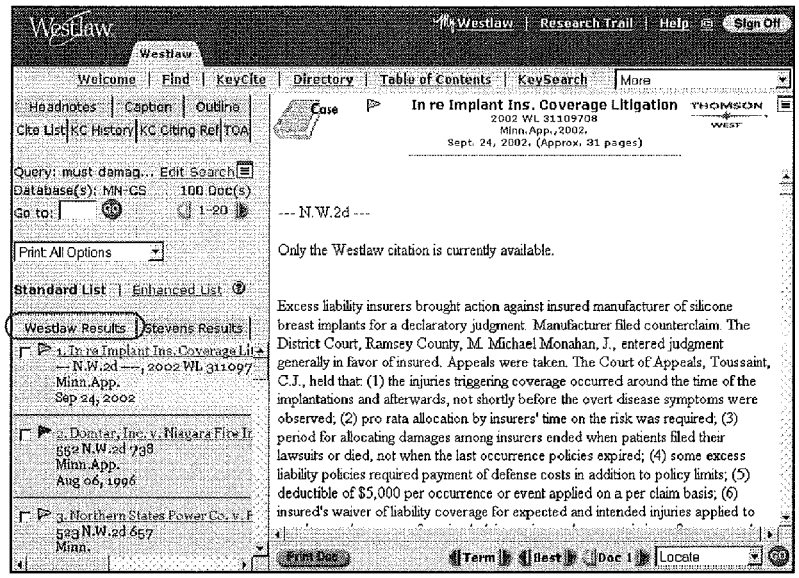

Figure 8: The Westlaw Results subtab

To access a list of your organization's documents that were retrieved by the same search, click your organization's Results subtab, e.g., Stevens Results (Figure 9). The first document in the result is displayed in the right frame.

Click your organization's Results subtab to view a list of retrieved documents at your organization.

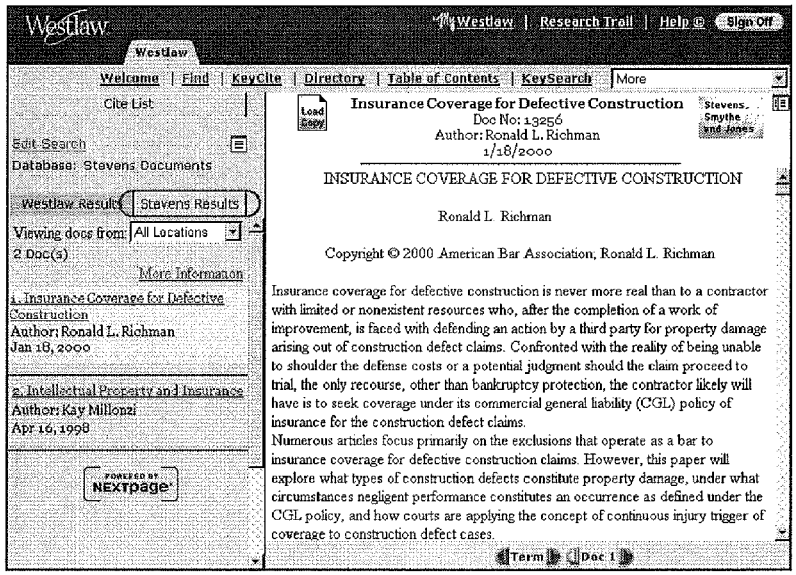

Figure 9: An organization's Results subtab

Note:  While your organization's documents are being searched, your organization's Results subtab displays the searching icon ⊕ and is unavailable. The subtab remains unavailable if no results are found.

To restrict the list of your organization's documents in the search result, such as to an office location, select a value from the *Viewing docs from* drop-down list.

Note: When you access the Find or Custom Digest service, you search *only* Westlaw documents; specific documents at your organization are not retrieved when using the Find and Custom Digest services.

Searching for Documents with KeySearch

KeySearch is a research tool that helps you easily and precisely retrieve documents on Westlaw that are relevant to your topic. For each legal topic in the KeySearch hierarchy, Westlaw identifies the West key numbers and terms most relevant to the topic and creates a query for you.

With West km, the power of KeySearch is expanded to help you easily and precisely retrieve relevant documents at your organization, as well as on Westlaw. The following combination of document categorization and retrieval techniques ensures that KeySearch retrieves comprehensive, reliable, and relevant documents at your organization:

- Automatic Classification: State-of-the-art classification tools can automatically index and assign your organization's documents to KeySearch topics.
- Manual Classification: Your administrator manually assigns documents to KeySearch topics. In addition, your administrator can customize the existing KeySearch hierarchy of topics for your organization's specific needs.
- Full-Text Queries: Queries crafted by West attorney-editors and your administrator (and editable by you) leverage full-text searching to retrieve documents on KeySearch topics.

To retrieve documents at your organization using KeySearch,

1. Click KeySearch on the westlaw.com toolbar. The KeySearch page is displayed (Figure 10).

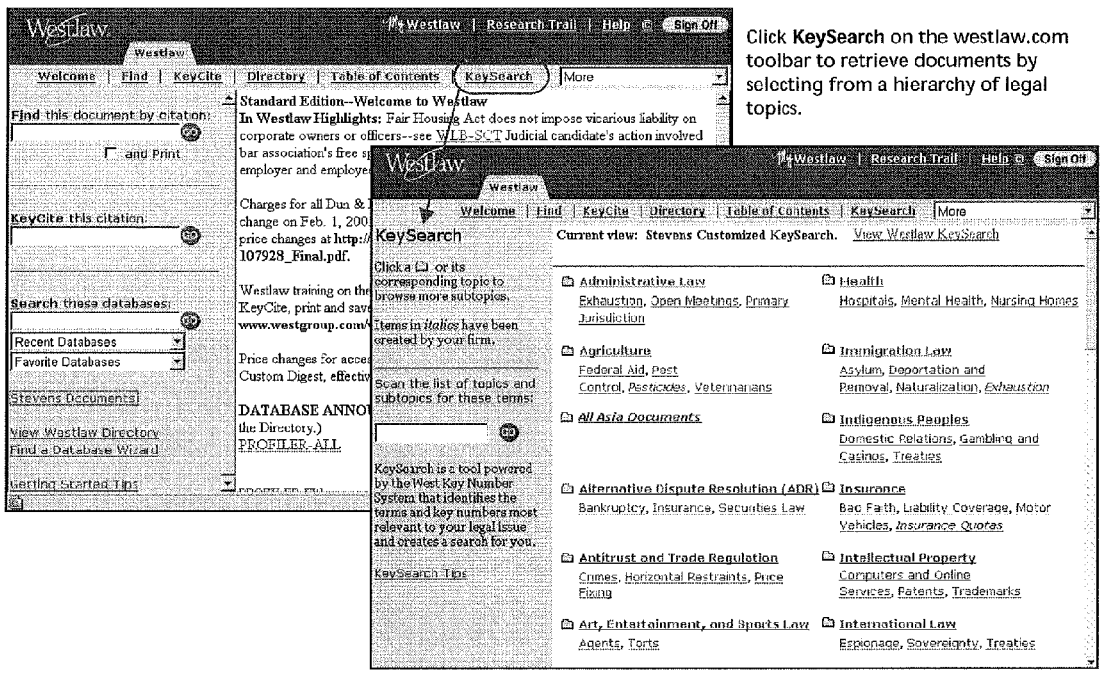

Click KeySearch on the westlaw.com toolbar to retrieve documents by selecting from a hierarchy of legal topics.

Figure 10: The KeySearch link in westlaw.com and the KeySearch page

By default, KeySearch in westlaw.com retrieves both Westlaw and your organization's documents. If your administrator has customized the KeySearch hierarchy for your organization, you can access the standard hierarchy (for retrieving Westlaw documents only) by clicking View Westlaw KeySearch at the top of the KeySearch page.

2. Browse the list of KeySearch topics and subtopics by clicking the Browse icons  or hypertext links in the right frame.

- Links in regular text (not italics) represent standard topics and subtopics. They can retrieve both Westlaw and your organization's documents.

- Links in italic text represent topics and subtopics that your administrator has created. They retrieve only your organization's documents.

If displayed, counts after each topic show the number of documents at your organization that have been assigned to that topic via automatic classification.

To scan the available KeySearch topics and subtopics for specific terms, type the terms in the text box in the left frame and click GO.

3. When you see a topic or subtopic related to your issue, select it by clicking the Search all of ... link at the top of the page or by selecting a topic link prefaced by a search icon  (Figure 11).

Select a KeySearch topic by clicking the Search all of ... link or a topic link prefaced by the search icon.

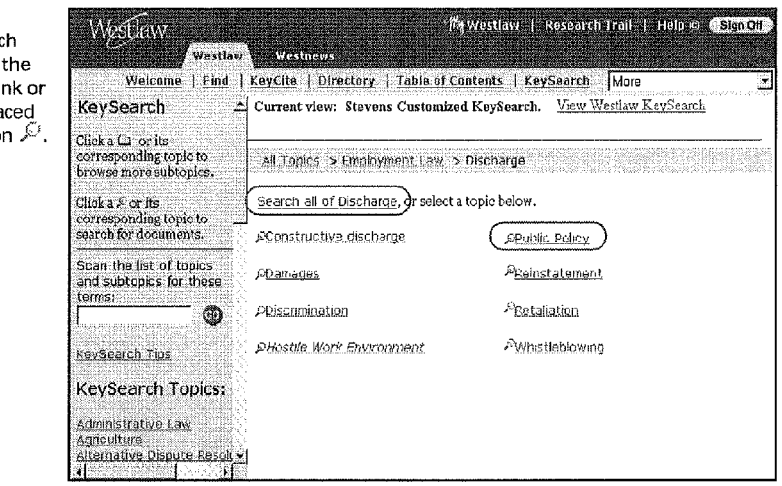

Figure 11: KeySearch topics and subtopics

4. Select the sources from which you want to retrieve documents (Figure 12). When you select a standard KeySearch topic, you can retrieve Westlaw documents, your organization's documents, or both.

If desired, type additional search terms in the *Add search terms* text box.

Select the sources—internal and external—from which you want to retrieve documents.

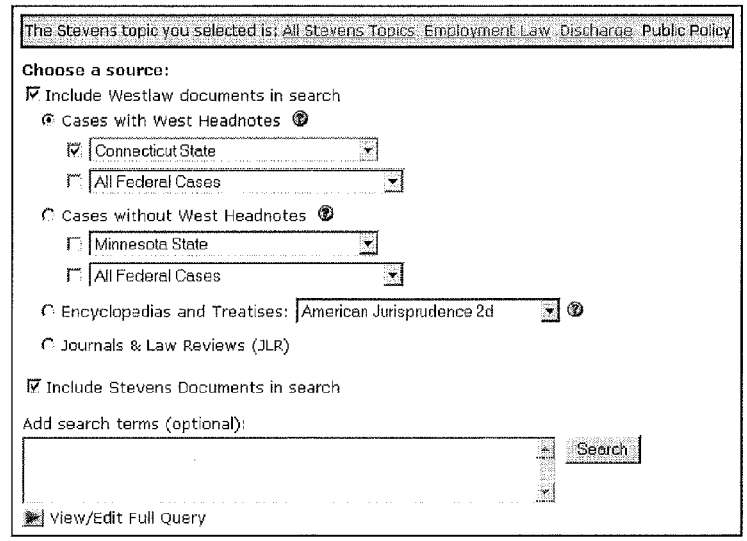

Figure 12: The KeySearch page for selecting document sources

Note: If you select a KeySearch topic created by your administrator that does not have an associated query, your KeySearch results are displayed without prompting you to select a source.

5. If you want to view or edit the query for the selected KeySearch topic, click View/Edit Full Query. Note the following when editing the query (Figure 13):

- If you opted to retrieve both external and internal documents in the previous step, two query boxes are displayed—the first query is used to search Westlaw documents, the second to search your organization's documents. You can edit either or both queries (see page 14 for more information about formulating queries).

- By default, KeySearch uses automatic and manual classification and full-text queries to retrieve documents. If you do not want documents retrieved via automatic classification, clear the Include documents automatically classified to this topic as conceptual matches check box.

Edit the query to search Westlaw documents in the first text box.

Edit the query to search your organization's documents in the second text box.

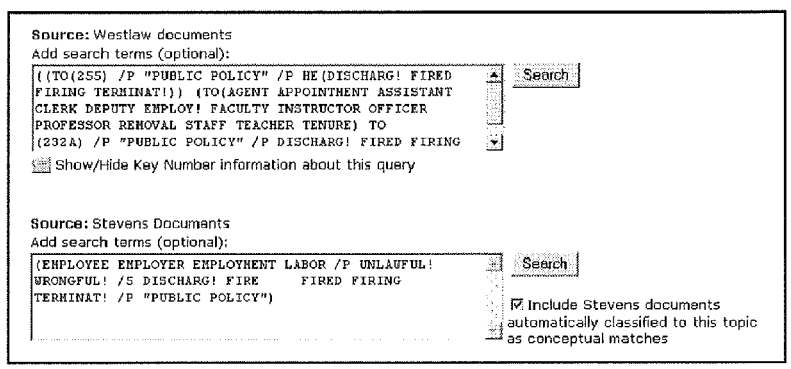

Figure 13: Viewing and editing a KeySearch query

6. Click a Search button. Retrieved Westlaw documents are listed on the Westlaw Results subtab, with the first Westlaw document in the result displayed in the right frame.

7. To access a list of your organization's retrieved documents, click your organization's Results subtab, e.g., Stevens Results. The first document in the result is displayed in the right frame (Figure 14).

Click your organization's Results subtab to access your organization's documents in a KeySearch result.

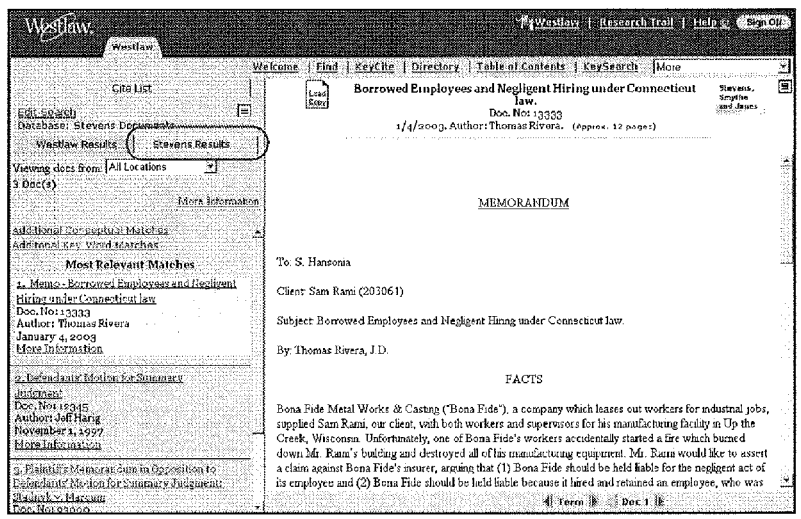

Figure 14: An organization's Results subtab with a KeySearch result

If a combination of KeySearch categorization and retrieval techniques resulted in documents, the most statistically relevant document matches are displayed to you first, with the documents that were manually assigned at the top of the list. Documents are then listed in order of relevance.

To access additional documents retrieved via automatic classification, click Additional Conceptual Matches; documents are listed in order of relevance. To access additional documents retrieved via the full-text query, click Additional Key Word Matches; documents are listed in reverse chronological order.

To restrict the list of your organization's documents in the search result, such as to an office location, select a value from the *Viewing docs from* drop-down list.

To edit the KeySearch query, click Edit Search.

Using Westlaw Search Methods

With West km, you can use Westlaw search methods, including Terms and Connectors, Natural Language, and the Search by Title template, to search both Westlaw documents and your organization's internal documents.

> Note: Because of data differences between Westlaw content and your organization's internal documents, field restrictions in your query and concepts you have specified to be included or excluded in retrieved Westlaw documents won't be used to search your organization's documents. For example, the Westlaw title restriction *TI(domtar)* will be translated to the term *domtar* in the search on your internal documents.

Searching with Terms and Connectors

With Terms and Connectors searching, you type a query consisting of key terms from your issue and connectors specifying the relationship between those terms to retrieve relevant documents (Figure 15). This method is usually most effective when you know details about a specific document that you want to retrieve or when you want to retrieve all documents that meet specific criteria.

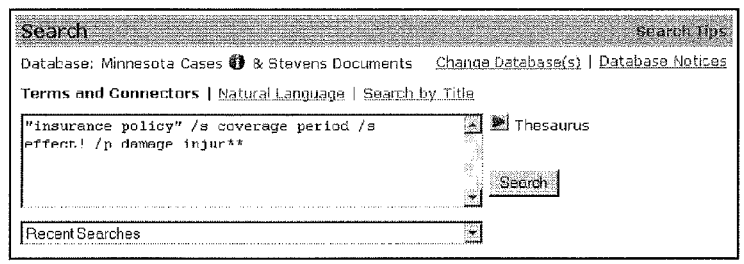

Figure 15: A Terms and Connectors query

By default, your organization's retrieved documents are listed in reverse chronological order, based on the date the document was last modified.

Using Connectors

Use connectors to specify the relationships that must exist between the terms in your retrieved documents.

| Type: | To retrieve documents that contain: | For example: |
|---|---|---|
| & (and) | Both search terms | narcotic & warrant |
| a space (or) | Either search term or both terms | car automobile |
| /p | Search terms in the same paragraph | hearsay /p utterance |
| /s | Search terms in the same sentence | design /s defect |
| +s | The first term preceding the second within the same sentence | palsgraf +s island |
| /n | Search terms within $n$ terms of each other (where $n$ is a number 1–255) | personal /3 jurisdiction |
| +n | The first search term preceding the second by $n$ terms (where $n$ is a number 1–255) | 20 +5 1080 |
| " " | Search terms appearing in the same order as in the quotation marks | "attractive nuisance" |

| Type: | To exclude documents that contain: | For example: |
|---|---|---|
| % (but not) | Search terms following the percent symbol | laminectomy % to(413) |

Using Special Characters

Type the universal character (*) to represent one variable character. Type the root expander (!) to retrieve words with variant endings. For example,

| Type: | To retrieve: |
|---|---|
| gr*w | *grew* <br> *grow* |
| contribut! | *contributed* <br> *contributor* <br> *contributing* <br> *contribution* <br> *contributory* |

Note: Plurals and possessive forms are automatically retrieved without a root expander.

Searching for Compound Words and Abbreviations

If your search term is a compound word, use its hyphenated form to retrieve all variations. If your search term is an abbreviation, enter it with periods and without spaces to retrieve all variations. For example,

| Type: | To retrieve: |
|---|---|
| whistle-blow | *whistleblow* |
| | *whistle-blow* |
| | *whistle blow* |
| h.i.v. | *H.I.V.* |
| | *H. I. V.* |
| | *HIV* |
| | *H I V* |

Searching with Natural Language

With natural language searching, you type a description of your issue in plain English to retrieve relevant documents (Figure 16). This method is usually most effective when you are researching a complex legal issue.

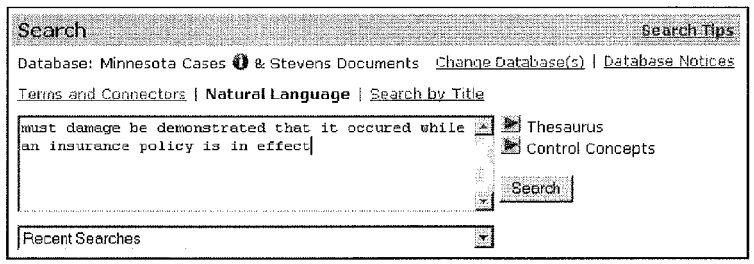

Figure 16: A Natural Language description

By default, your organization's retrieved documents are listed in order of relevance.

Searching by Title

Using the Search by Title template, you type one more party names to search for a document by its title (Figure 17). This method is a convenient way to retrieve documents pertaining to a specific case.

Search  Search Tips
Database: Minnesota Cases ⓘ & Stevens Documents   Change Database(s) | Database Notices
Terms and Connectors | Natural Language | Search by Title
Party name:
domtar                                   [Search]
Additional party name (optional):
niagara

Figure 17: The Search by Title template

By default, your organization's retrieved documents are listed in reverse chronological order, based on the date the document was last modified.

> Note: When searching only your organization's documents, the Search by Title template is not available. When searching both Westlaw content and your organization's documents, party names will be translated to general terms in the search on your organization's documents.

Browsing Your Organization's Retrieved Documents

Your organization's retrieved documents appear in the westlaw.com interface and include highlighted search terms, hypertext links to other sources, and citation information.

Viewing a Document

To view one of the documents listed on your organization's Citing Refs subtab, click its reference number (Figure 18). To view one of the documents listed on the Cite List tab or your organization's Results subtab, click its number or title.

If a Security Warning dialog box is displayed, click Yes. This installs an ActiveX control that allows you to load and edit copies of your organization's documents from westlaw.com.

If your administrator has given you the necessary access rights to the document, a copy of the document is displayed in the right frame.

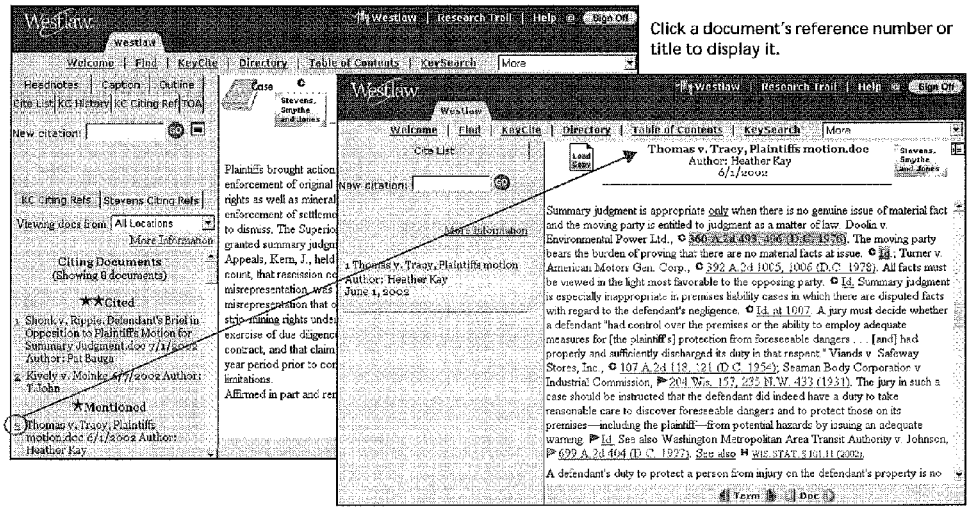

Figure 18: An organization's Citing Refs subtab and a displayed citing document

If you retrieved the document using KeyCite, references to the cited Westlaw document are highlighted, with the first occurrence automatically displayed. If you retrieved the document by searching, then search terms are highlighted.

Each citation in the document is a hypertext link to the cited document in westlaw.com. For each citation that has available KeyCite information, a KeyCite status flag is displayed next to the citation (see "Understanding KeyCite Information" on page 30).

You can browse your organization's documents as you do Westlaw documents:

- Term arrows take you to the next or previous term in your result. (In a KeySearch result, Term arrows function only for documents retrieved via the full-text query.)
- Document (Doc) arrows take you to the next or previous document in your search result.

Choosing a Page View

You can choose how your West km information is displayed—in split-page view or in full-page view.

In split-page view, all information relating to a displayed document is available on the same page. The text of the document is displayed in the right frame, and related information—such as the list of your organization's citing documents on the Citing Refs subtab—is displayed in the left frame.

In full-page view, the text of the document or the related information is displayed across the entire page.

Click the Full-Page View icon on the Information Tab or in the document frame to display the information or the document in full-page view (Figure 19).

Click the Split-Page View icon in the page's upper-right corner to return to split-page view.

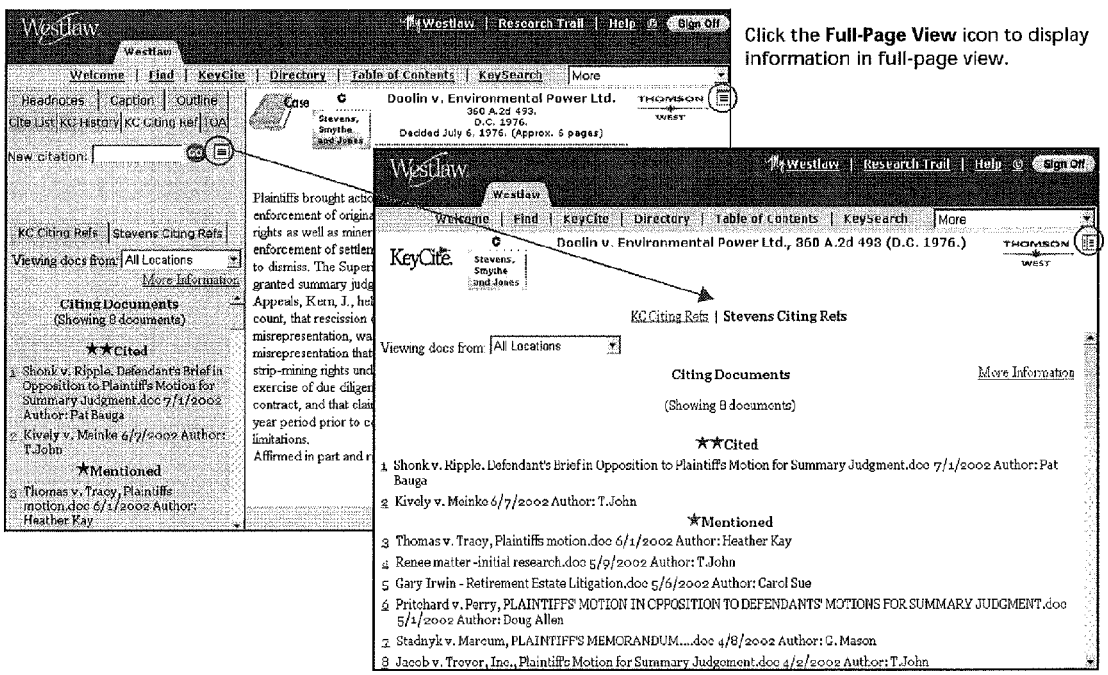

Figure 19: West km information in split-page and full-page views

Opening a Document

If you want to work with one of your organization's documents, you can open a copy of the document.

While you are viewing the document, click the Load Copy icon at the top of the document (Figure 20). A copy of the document is displayed in its original format, for example, Microsoft Word.

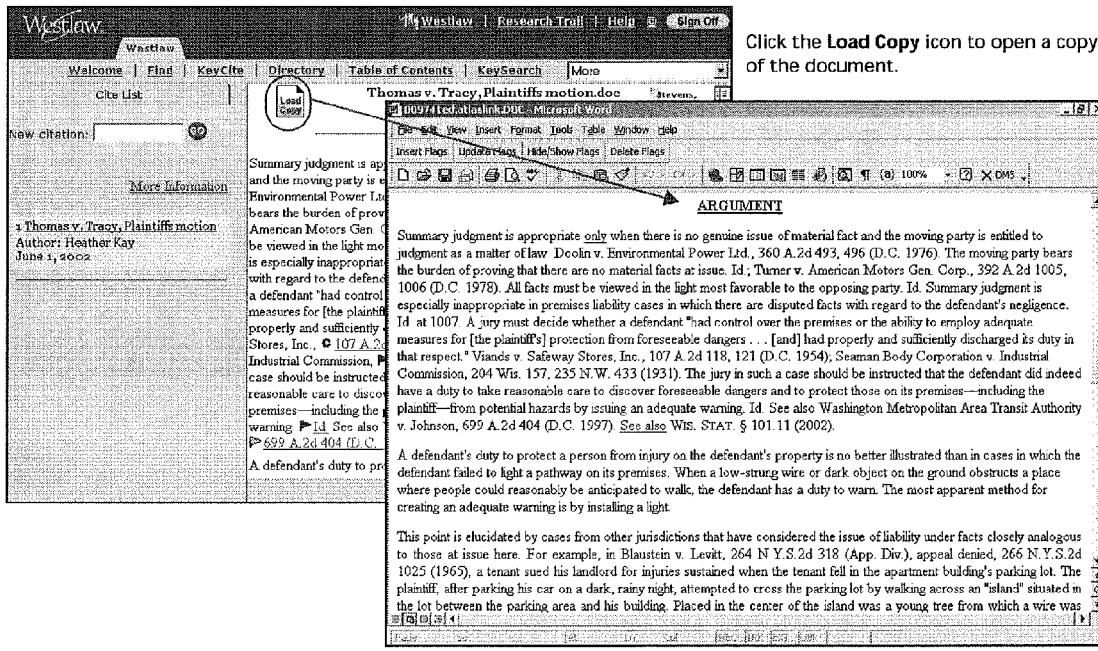

Figure 20: The Load Copy icon in an organization's document in westlaw.com and a copy of the document From here, you can edit or save the document as you normally would. If the document is displayed in Microsoft Word, you can also add KeyCite information to the document (see "Generating KeyCite Information for Your Document" on page 33).

Using Knowledge Management Features

You can access more information about your organization's documents beyond what is listed on your organization's subtabs by accessing the West km pages. From these pages, you can also

- build a citations list of your organization's West km documents
- search all your organization's West km documents
- use KeySearch to access your organization's West km documents by legal topic
- view, load, or e-mail a document To access the West km pages, click More Information on your organization's Citings Refs subtab or Results subtab (Figure 21). The Documents tab is displayed, providing information on each document at your organization that was listed in your result in westlaw.com.

Click More Information on your organization's subtab in westlaw.com to view more information about the listed documents.

Figure 21: An organization's Citing Refs subtab and more information about the citing documents By default, citing documents are listed by their depth of treatment, documents in a search result are listed in reverse chronological order (based on the date the document was last modified), and documents in a KeySearch result are listed using a combination of relevance and reverse chronological order. To change the sort order, click a column heading to sort by that category.

To return to westlaw.com, click your browser's Back button. If your Westlaw session has timed out since you first accessed the West km page, you will be prompted to sign on to westlaw.com.

Building a Citations List Using KeyCite

Using KeyCite, you can build a citations list of your organization's documents from the Documents tab on the West km pages. Citing references on this page exclude Westlaw documents.

To retrieve a list of your organization's documents that cite a particular docment, click KeyCite on the West km toolbar, type the document's citation in the *New citation* text box, and click GO (Figure 22).

To build a citations list of your organization's documents, type a citation in the *New citation* text box and click GO.

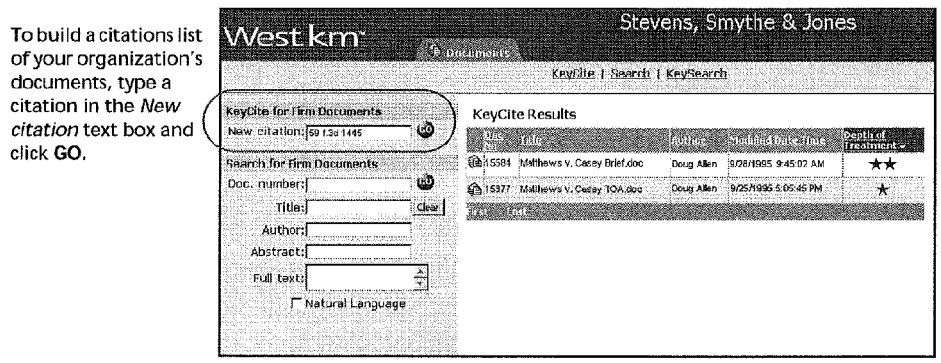

Figure 22: A list of an organization's citing documents

Your organization's citing documents are listed on the Documents tab by their depth of treatment.

Searching Documents

You can search all your organization's West km documents from the Documents tab on the West km pages. Searches from this page exclude Westlaw documents.

To search your organization's West km documents, click Search on the West km toolbar, type one or more search terms in the *Search for Firm Documents* text boxes, and click GO (Figure 23). If you type multiple search terms, all terms must be found.

- Doc. number: To retrieve documents with a specified document number in your organization's document management system (DMS), type the document number.
- Title: To retrieve documents in your organization's DMS whose title begins with specified text, type the text. (If your DMS is DOCS Open/DOCS Fusion, the Document Name field is searched; If your DMS is iManage, the Description field is searched.)
- Abstract: To retrieve documents in your organization's DMS that contain specified text anywhere in the abstract of the DMS profile, type the text. (If your DMS is DOCS Open/DOCS Fusion, the Description field is searched; If your DMS is iManage, the Comment field is searched.)
- Full text: To retrieve documents containing specific terms anywhere in the text, either (1) type a Westlaw Terms and Connectors query, or (2) type a Natural Language description and select the Natural Language check box.

The West km documents at your organization that match your search terms are listed on the Documents tab in reverse chronological order.

To search all your organization's West km documents, type your search terms under *Search for Firm Documents* and click GO.

Figure 23: An organization's documents that match specific search terms

Searching for a Document with KeySearch

Using KeySearch, you can retrieve a list of your organization's West km documents that are relevant to a particular legal topic. When accessed on the West km pages, KeySearch excludes Westlaw documents.

To retrieve documents at your organization using KeySearch,

1. On the Documents tab in the West km pages, click KeySearch on the West km toolbar. The KeySearch page is displayed (Figure 24).

Click KeySearch on the toolbar to retrieve your organization's documents by selecting from a hierarchy of legal topics.

Figure 24: The KeySearch page in the West km pages

2. Browse the list of KeySearch topics and subtopics by clicking the Browse icons or hypertext links in the right frame.

If displayed, counts after each topic show the number of documents at your organization that have been assigned to that topic via automatic classification.

To scan the available KeySearch topics and subtopics for specific terms, type the terms in the text box in the left frame and click GO.

3. When you see a topic or subtopic related to your issue, select it by clicking the Search all of ... link at the top of the page or by selecting a topic link prefaced by a search icon (Figure 25).

Select a KeySearch topic by clicking the Search all of... link or a topic link prefaced by the search icon.

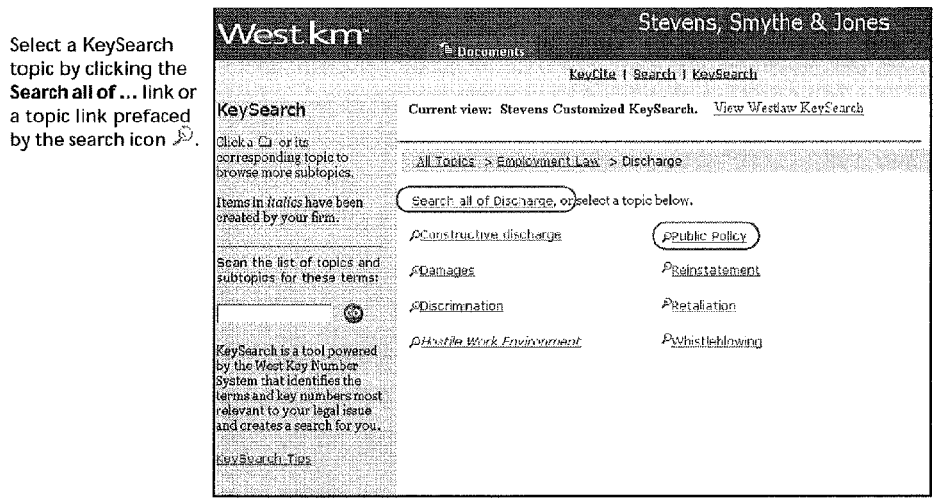

Figure 25: KeySearch topics and subtopics

4. If desired, type additional search terms in the *Add search terms* text box (Figure 26).

Type additional search terms to refine the KeySearch query.

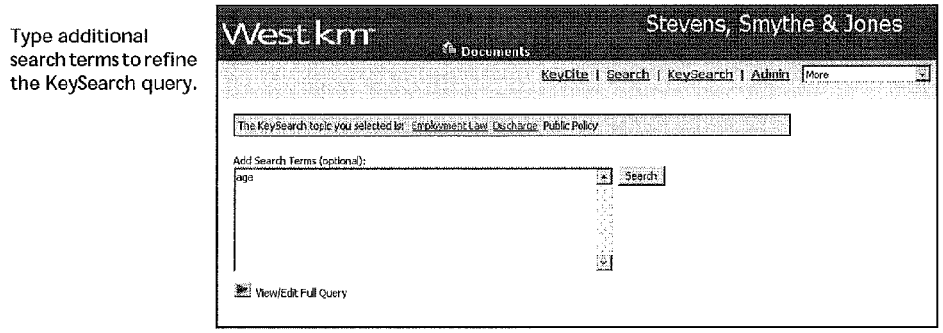

Figure 26: The KeySearch page for adding search terms

Note: If you select a KeySearch topic created by your administrator that does not have an associated query, your KeySearch results are displayed without prompting you to add search terms.

5. If you want to view or edit the query for the selected KeySearch topic, click View/Edit Full Query.

6. Click Search.

If a combination of KeySearch categorization and retrieval techniques results in documents, the most statistically relevant document matches are displayed to you first, with the documents that were manually assigned at the top of the list. Documents are then listed in order of relevance.

View your retrieved documents on the Documents tab in the West km pages.

Figure 27: A KeySearch result in the West km pages

To access additional documents retrieved via automatic classification, click Additional Conceptual Matches; documents are listed in order of relevance. To access additional documents retrieved via the full-text query, click Additional Key Word Matches; documents are listed in reverse chronological order.

Detailing a Specific Document

To access details about a particular document in a result list on the West km pages, click the document icon  next to its listing (Figure 28).

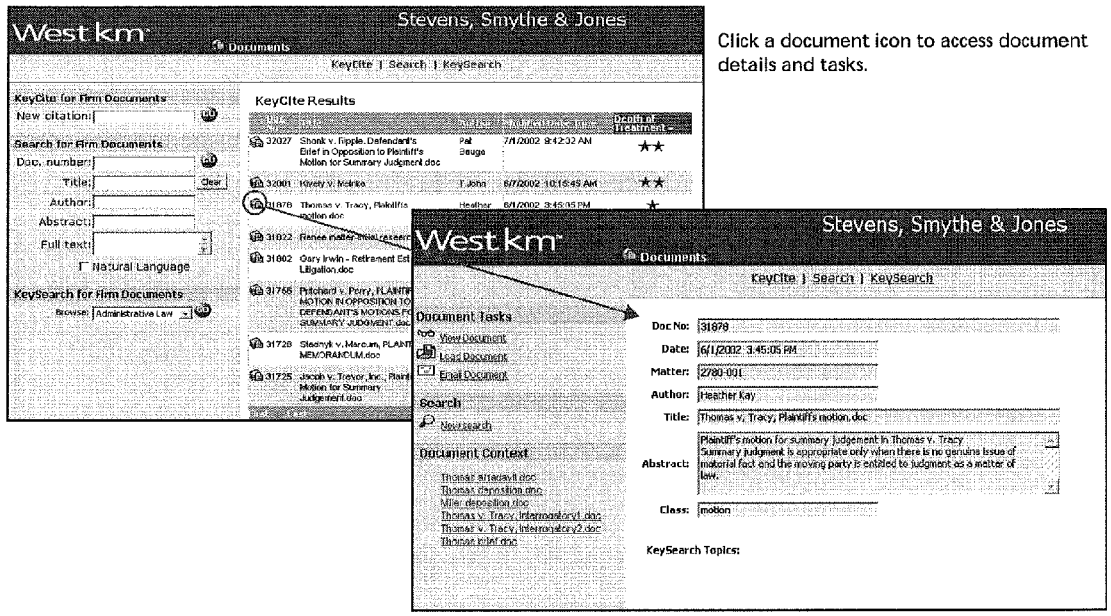

Figure 28: A list of an organization's documents and details about a specific document You can perform the following tasks from the detailed document display:

- To view the document, click View Document.
- To open a copy of the document in its original format (e.g., Microsoft Word), click Load Document.
- To e-mail the document, click Email Document. An e-mail template is displayed with the document automatically attached.
- To perform a search on your organization's West km documents, click New search.

For documents stored in a document management system, the Document Context section lists the documents created around the same time as the detailed document for the same matter. The three documents created before and after the detailed document are listed. To view details about a listed document, click its title.

Understanding KeyCite Information

KeyCite is the citation research service from West that allows you to quickly determine whether cases, statutes, or administrative materials are good law and find other sources that cite them. In West km, the power of KeyCite is integrated with your organization's internal documents.

KeyCite Status Flags

West km adds a KeyCite status flag next to each citation in your document that has available KeyCite information (Figure 29). These flags allow you to easily evaluate the validity of a case, a statute, or an administrative decision.

- ▶ In cases and administrative decisions, a red flag warns that the case or administrative decision is no longer good law for at least one of the points it contains. In statutes, a red flag indicates that a statute has been amended or repealed by a session law or that it has been declared unconstitutional or preempted.

- ▶ In cases and administrative decisions, a yellow flag warns that the case or administrative decision has some negative history but hasn't been reversed or overruled. In statutes, a yellow flag indicates that pending legislation affecting a statute is available (statutes merely referenced, i.e., mentioned, in pending legislation are marked with a green C) or that the statute was limited on constitutional grounds or preemption grounds or its validity was otherwise called into doubt.

- H A blue H indicates that the case or administrative decision has some history.

- C A green C indicates that the case or administrative decision has citing references but no direct or negative indirect history. A green C indicates that the statute has citing references.

- KC In West km, a red KC indicates that a citation could not be verified. Click this icon to display one of the following: (1) a list of documents on Westlaw that are potential matches for this citation, or (2) a Find template to assist you with the citation format.

Click a KeyCite status flag to view a citation's KeyCite information.

Figure 29: KeyCite status flags in an organization's document

Depth of Treatment Stars

KeyCite depth of treatment stars indicate the extent to which a citing document discusses a cited case. When viewing a list of your organization's citing documents with West km, these stars indicate the extent to which each document discusses the displayed Westlaw document (Figure 30).

Following is a description of the depth of treatment stars that West km applies to your organization's documents. The number of citing references in the descriptions below are West km defaults; your administrator may have customized these numbers for your organization.

| Symbol | Definition | Description |
| --- | --- | --- |
| ★★★★ | Examined | Your organization's document cites the displayed Westlaw document 10 or more times. |
| ★★★ | Discussed | Your organization's document cites the displayed Westlaw document 6-9 times. |
| ★★ | Cited | Your organization's document cites the displayed Westlaw document 2-5 times. |
| ★ | Mentioned | Your organization's document cites the displayed Westlaw document 1 time. |

Use KeyCite depth of treatment starts to determine the extent to which a document at your organization discusses the displayed Westlaw document.

Figure 30: KeyCite depth of treatment stars for an organization's citing documents

Generating KeyCite Information for Your Document

When you are working with a document in Microsoft Word, you can do the following with West km:

- Create links from each citation to cases, statutes, and administrative materials on Westlaw.
- Add KeyCite status flags to each citation, so you can quickly and easily evaluate the validity of the source.
- Update the KeyCite status flags to take advantage of the currentness and accuracy of KeyCite in your own document and quickly identify the citations whose KeyCite status has changed.
- Link from your word-processing document directly to documents and KeyCite information on Westlaw.

Adding Citation Links and KeyCite Status Flags

West km will find the citations in your document, create links to the sources on Westlaw, and add KeyCite status flags.

To add citation links and KeyCite status flags to your document, complete the following steps:

1. While your document is displayed in Microsoft Word, click Insert Flags on the toolbar (Figure 31).

Click Insert Flags to add citation links and KeyCite status flags to your document.

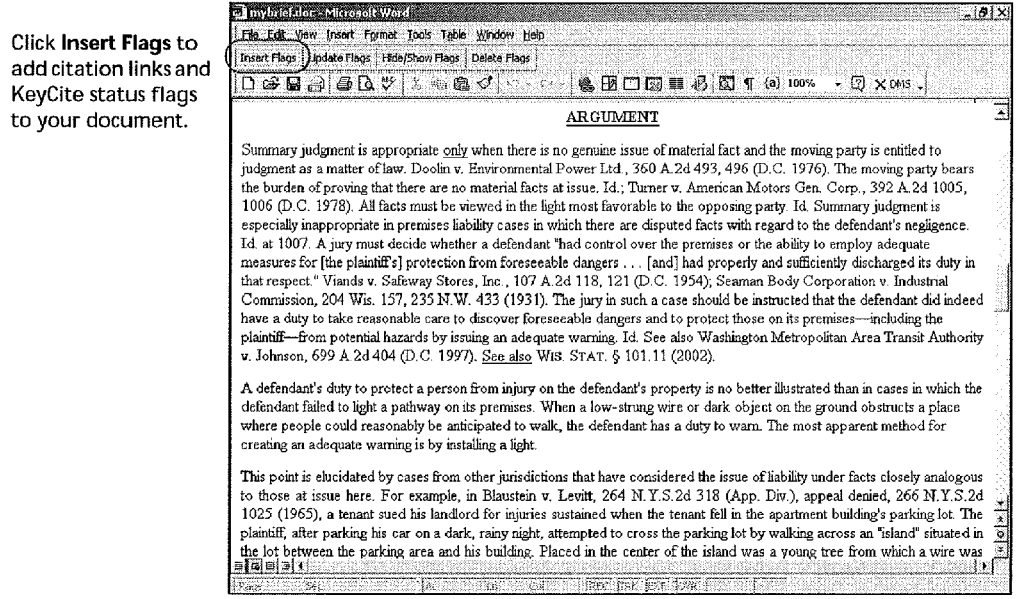

Figure 31: A word-processing document in Microsoft Word

2. If you are prompted, enter the Matter ID for the matter to which the document pertains.

Note: This Matter ID is saved with the document as part of its custom properties. To access the Matter ID in order to delete or modify it, click the Word File menu, click Properties, and then click the Custom tab.

While West km is running, a dialog box is displayed showing how many citations were found in your document.

When West km is finished running,

- a hypertext link to Westlaw is created for each citation in your document.
- a KeyCite status flag is added next to each citation in your document that has available KeyCite information (Figure 32).

View the KeyCite status flags in your document to verify the status of your citing references.

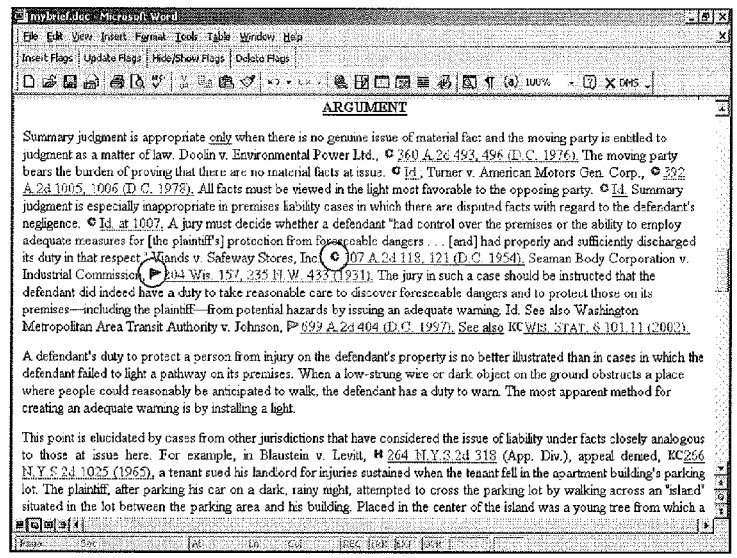

Figure 32: Citation links and KeyCite status flags added to a word-processing document

Note: In Microsoft Word, KeyCite status flags will not display if you have set picture placeholders to display for graphics in your document. Open the Tools menu, click Options, click the View tab, and clear the Picture placeholders check box to turn off this option.

Updating KeyCite Status Flags

You can update the KeyCite status flags in your document so changes in status are easy to identify.

To update the KeyCite status flags in your document, click Update Flags on the toolbar (Figure 33). The KeyCite status flag is updated for every citation in your document that West km had previously converted to a hypertext link. Citations whose KeyCite status has changed are highlighted.

Click Update Flags to update the KeyCite status flags in your document.

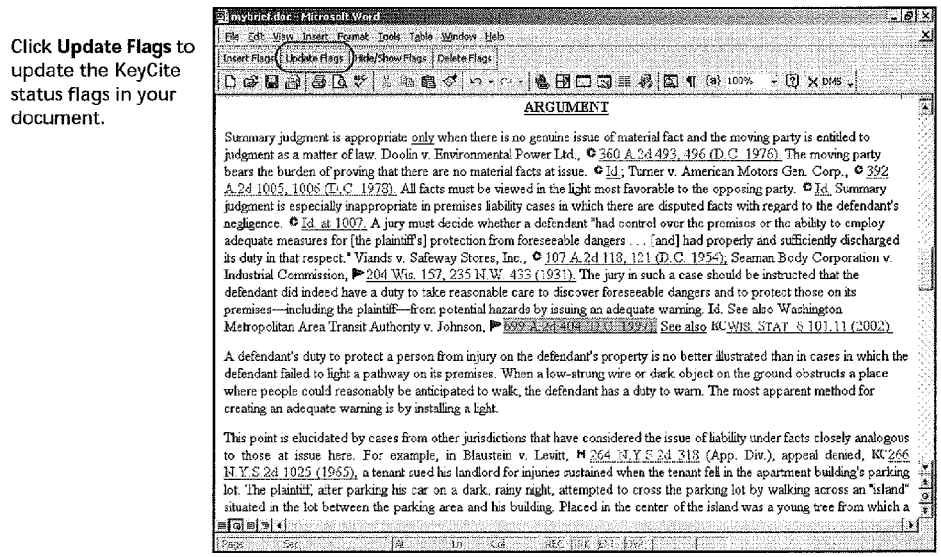

Figure 33: Updated KeyCite status flags in a word-processing document

Hiding and Showing Citation Links and KeyCite Status Flags

After inserting and reviewing citation links and KeyCite status flags in your document, you may no longer want them to be displayed in your document.

To hide citation links and KeyCite status flags in your document, click Hide/Show Flags on the toolbar (Figure 34).

Click Hide/Show Flags to either hide or show citation links and KeyCite status flags.

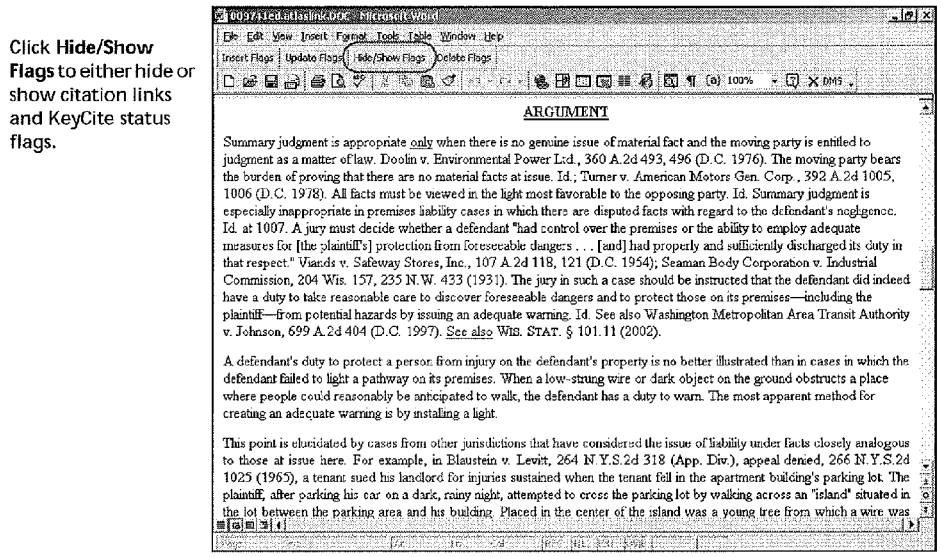

Figure 34: A word-processing document without citation links or KeyCite status flags To display the citation links and KeyCite status flags in your document, click Hide/Show Flags again.

The current view (hidden or shown) is in effect when you print your document.

Once you insert flags, it is best to edit your document while the citation links and flags are shown. If you prefer to edit your document without citation links and KeyCite status flags, first delete them by clicking Delete Flags. Then edit the document and reinsert the citation links and KeyCite status flags by clicking Insert Flags (see "Deleting Citation Links and KeyCite Status Flags" below).

Deleting Citation Links and KeyCite Status Flags

To delete citation links and KeyCite status flags from your document, click Delete Flags on the toolbar. This action permanently removes all West km information from your document. If you want to show citation links and KeyCite status flags in your document after deleting them, click Insert Flags again.

US 10,832,212 B2

Linking to Documents on Westlaw

Once you add citation links to a document with West km, you can link directly to documents on Westlaw.

To open a document in westlaw.com, click the hypertext link of the citation in your document (Figure 35).

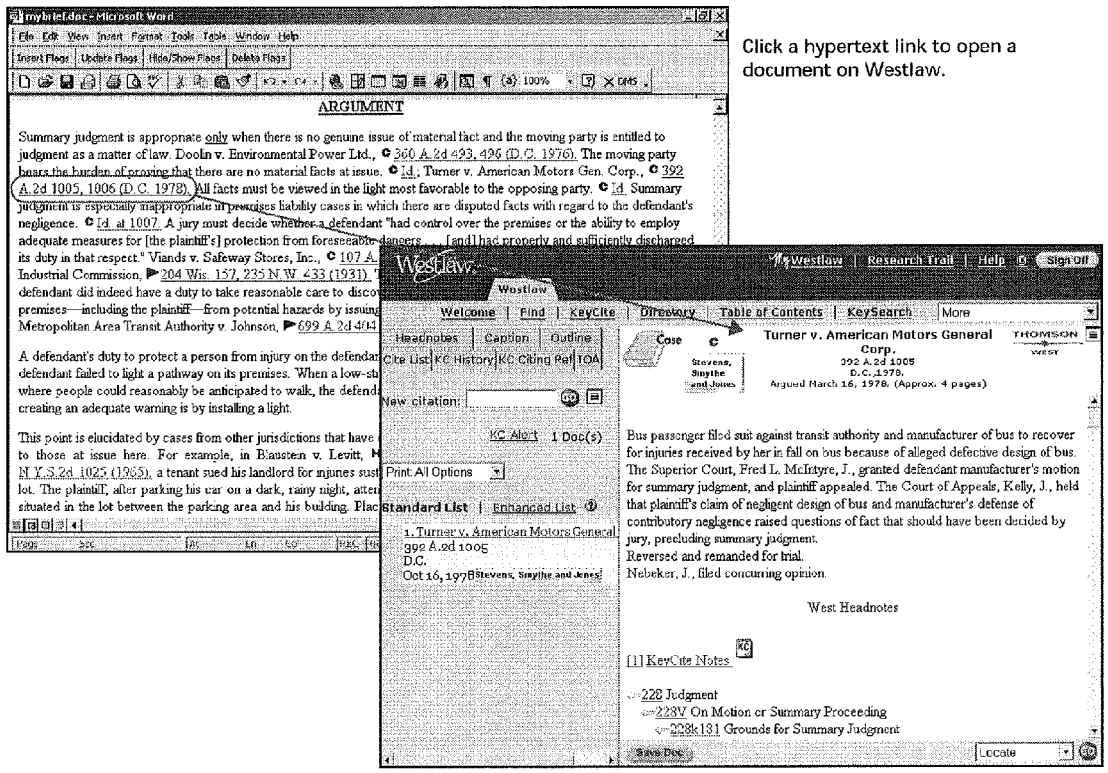

Click a hypertext link to open a document on Westlaw.

Figure 35: A citation's hypertext link in a word-processing document and the citation's full-text document on Westlaw.

Accessing KeyCite Information on Westlaw

Once you add KeyCite status flags to a document with West km, you can link directly to KeyCite information on Westlaw.

To view KeyCite information for a citation in westlaw.com, click the KeyCite status flag for the citation (Figure 36).

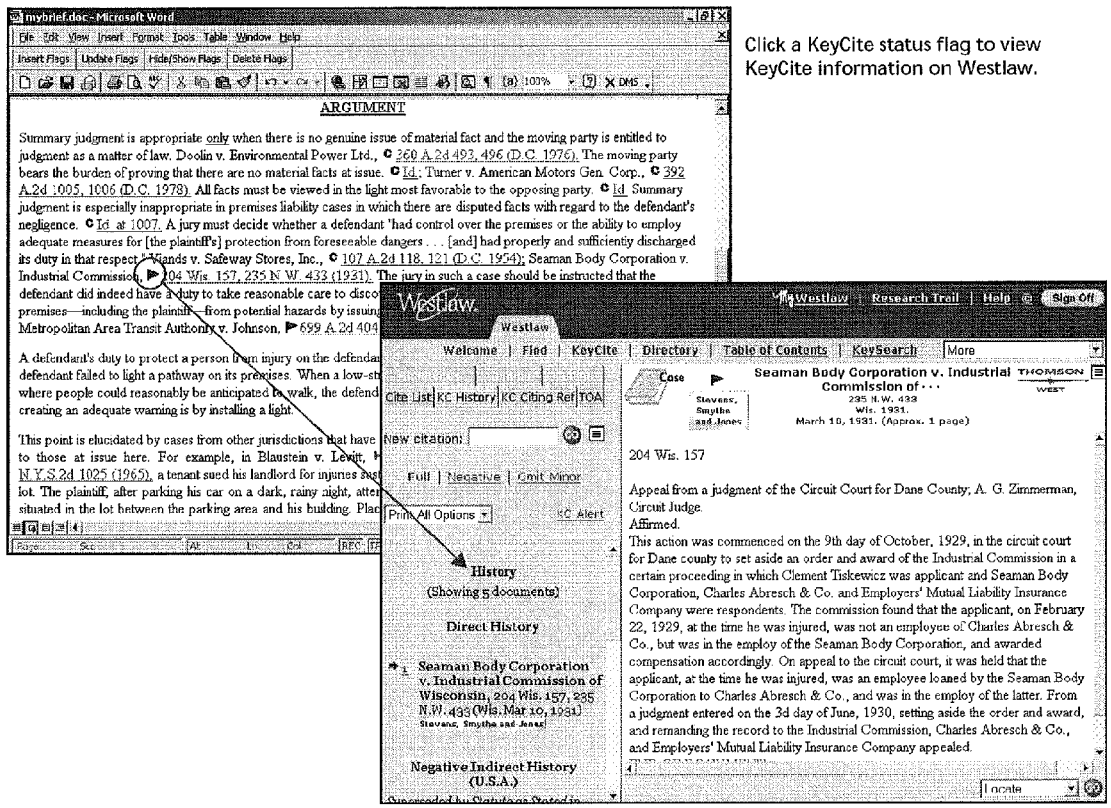

Click a KeyCite status flag to view KeyCite information on Westlaw.

Figure 36: A KeyCite status flag in a word-processing document and KeyCite information on Westlaw

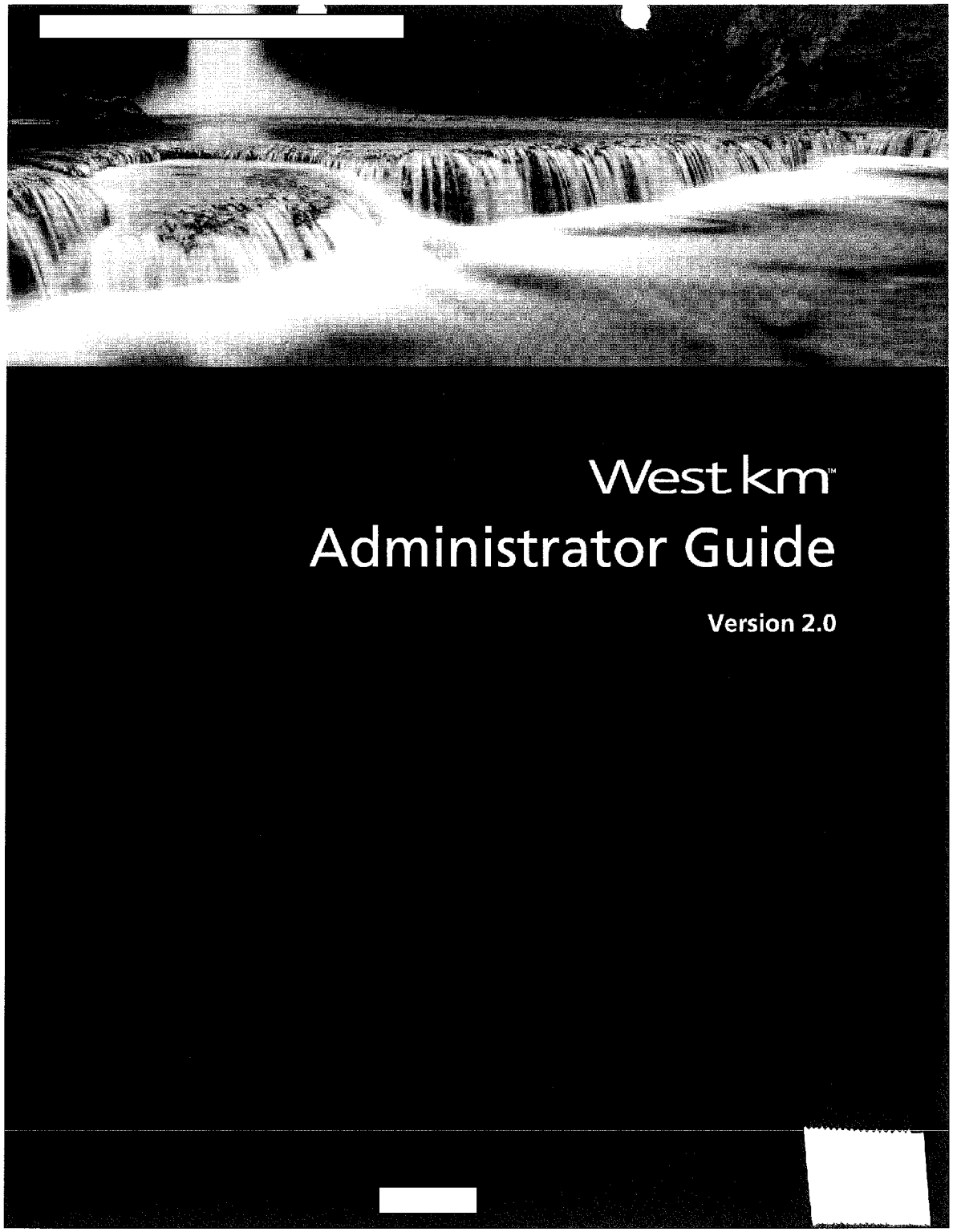

Customer Service

If you have questions about West km, please contact us:

| For help with: | Call or e-mail: |
|---|---|
| General or technical questions | West km Technical Support<br>1-888-877-6529 (option 8)<br>kmsupport@prolaw.com |
| Search questions about Westlaw or West km | West Reference Attorneys<br>1-800-REF-ATTY<br>1-800-733-2889<br>west.referenceattorneys@thomson.com |
| Billing and account assistance | West Customer Service<br>1-800-328-4880<br>west.customer.service@thomson.com |

Notice About This Guide

West continues to develop new features and improve existing features for this product. Because of these improvements and the evolving nature of Internet technology, some screen displays and features may have changed since publication.

Information in this guide is current through June 9, 2003.

Authors: Jana Otto Hiller, John Cavalieri, Alan Redding, John Richmond, Bob Sturm, and Brett Truhler KeyCite, KeySearch, Westlaw, and westlaw.com are registered trademarks and West km is a trademark of West Publishing Corporation.
Internet Explorer, Microsoft, and Windows are registered trademarks of Microsoft Corporation.
Corel and WordPerfect are registered trademarks of Corel Corporation.
Lotus Notes is a registered trademark of Lotus Development Corporation.

© 2003 West Group. All rights reserved. No part of this publication may be reproduced, stored in a retrieval system, or transmitted, in any form or by any means, electronic or mechanical, including photocopying, recording, or otherwise, without the prior written permission of the publisher.

West
610 Opperman Drive
Eagan, MN 55123-1396

Printed in the United States of America

Contents

1 West km Overview ........................................... 1
    1.1 West km Features .............................................. 1
    1.2 West km Server Components .................................... 1

2 Installing the West km Application ........................ 5
    2.1 What You Need ................................................ 6
    2.2 Run the West km Setup Program ................................ 7
    2.3 Enable ActiveX Controls and the West km Client Application .... 14
    2.4 Disable Anonymous Access for Full-Text Searching ............. 15
    2.5 Create the West km Database .................................. 16
        2.5.1 Create the West km Database ........................... 16
        2.5.2 Import KeySearch Data into the West km Database ....... 20
    2.6 Create the West km RID Database .............................. 22
    2.7 Configure CaRE ............................................... 25
        2.7.1 Install the CaRE Flat-File Database .................... 25
        2.7.2 Modify CaRE Memory Settings ............................ 26
        2.7.3 Set Number of KeySearch Topic Assignments per Document . 27
        2.7.4 Install Simple CaRE Driver ............................. 27
    2.8 Start West km Services ....................................... 29
    2.9 Verify Properties for the Event Log .......................... 29
    2.10 Set Security ................................................ 30
        2.10.1 Integrated Windows Authentication .................... 34
        2.10.2 West km Custom Authentication ........................ 36
        2.10.3 No Authentication .................................... 38
        2.10.4 Minimum Security Requirements for West km ............ 39
    2.11 Configure DMS Services ..................................... 44
        2.11.1 Configuration for DOCSFusion 5.0 ..................... 44
        2.11.2 Configuration for iManage ............................ 45
        2.11.3 DMS Properties in Configuration Files ................ 46

3 Administering the KeySearch Hierarchy .......................... 49

3.1 Customizing the KeySearch Hierarchy ........................................ 50

3.1.1 Adding a KeySearch Topic ........................................... 51

3.1.2 Editing a KeySearch Topic ........................................... 52

3.1.3 Copying a KeySearch Topic .......................................... 52

3.1.4 Hiding and Showing a KeySearch Topic ............................... 52

3.1.5 Deleting a KeySearch Topic .......................................... 53

3.2 Assigning Documents to a KeySearch Topic ................................... 53

3.3 Removing Documents from a KeySearch Topic ................................ 54

3.4 Deleting Documents from West km ........................................... 55

4 Indexing Your Organization's Documents ........................ 57

4.1 What You Need ........................................................... 59

4.2 Access the Administrative Tool in West km .................................... 59

4.3 Designate Administrator Accounts ........................................... 60

4.4 Designate Databases Containing Document Collections ......................... 61

4.4.1 Designating Databases with iManage, DOCS Open/PCDocs, DOCSFusion, and Lotus Notes ............................................................. 61

4.4.2 Designating Databases with ProLaw Version 9 ........................... 62

4.4.3 Designating Databases with the NT File System ......................... 63

4.4.4 Editing Databases ................................................... 64

4.5 Define and Index Document Collections ....................................... 65

4.5.1 Define Document Collections ......................................... 65

4.5.2 Add Document Collections with ProLaw Version 9 ....................... 68

4.5.3 Index Document Collections .......................................... 69

4.5.4 Removing Document Collections ...................................... 70

4.5.5 Monitoring Indexing of Document Collections .......................... 70

4.5.6 Stopping Indexing ................................................... 73

4.6 Synchronize Document Collections ........................................... 73

4.7 Create and Update Full-Text Indexes ......................................... 74

4.8 Set a Document Security Level ............................................... 75

4.9 Administer West km Members ............................................... 76

4.9.1 Finding a Member ................................................... 77

4.9.2 Adding a Member ................................................... 78

4.9.3 Editing a Member ................................................... 78

4.9.4 Adjusting the Professionals Table Configuration for iManage ................. 78
4.9.5 Using the Professionals Table with West km Custom Authentication .......... 80

5 Tracking Program Activity ..... 81

5.1 Monitoring Events ................................................. 81
    5.1.1 Information Events ......................................... 81
    5.1.2 Warning Events ............................................ 82
    5.1.3 Error Events ............................................... 82
5.2 Using Trace Logs .................................................. 82
    5.2.1 Configuring West km Trace Logs ............................. 84
    5.2.2 Configuring CaRE Trace Logs ................................ 85
    5.2.3 Viewing Trace Logs ......................................... 86
5.3 Tracking Usage .................................................... 86
    5.3.1 Turning Usage Tracking On and Off .......................... 88
    5.3.2 Querying and Exporting Usage Data .......................... 88

6 Setting Properties in Configuration Files ..... 89

6.1 Setting Properties in a Distributed Architecture ..................... 90
6.2 Changing Your West km Images ...................................... 92
6.3 Changing the Display of Your Citing Documents ...................... 92
6.4 Configuring Document Counts in the KeySearch Hierarchy ............. 94

7 Backing Up and Removing the West km Application ..... 97

7.1 Backing Up West km ............................................... 97
7.2 Removing the West km Application ................................. 97
7.3 Removing West km Databases ....................................... 99
7.4 Removing the Web Share Virtual Directory ......................... 100

8 Installing the West km Client Application ..... 101

8.1 Installing the West km Client at a Desktop ....................... 101
    8.1.1 Configuring the West km Client ............................ 103
8.2 Silently Installing the West km Client over a Network ............ 104
8.3 Modifying or Removing the West km Client ......................... 105

Appendix A: Installed West km Databases, Folders, and .dll Files....... 107

Appendix B: More about the West km Automated Setup ............. 109

Appendix C: West km Ports.................................... 119

Appendix D: List of Properties in Configuration Files................. 121

Index.........................................................149

Chapter 1

West km Overview 1.1 West km Features 1

1.2 West km Server Components 1

---

Welcome to West km (West knowledge management), a legal research product that integrates KeyCite and full-text search technology with your organization's internal documents, such as briefs and memoranda.

1.1 West km Features

With West km, members of your organization can easily find and reuse your organization's best work. In westlaw.com, members can build a citations list of your organization's documents that cite a Westlaw document. They can also access your organization's internal documents and Westlaw content simultaneously using full-text search methods and the KeySearch hierarchy of legal topics.

West km also embeds citation links and KeyCite status flags in word-processing documents, providing instantaneous views of the validity of legal citations in the document.

This administrator guide explains how to

- install, back up, and remove the West km application
- administer the KeySearch hierarchy
- index document collections at your organization
- track West km program activity
- set properties in West km configuration files
- install the West km client plug-in This guide assumes you are familiar with your organization's document management system (DMS), saving searches in your DMS, and network administration.

For more information about West km end-user functionality, refer to the *West km User Guide*.

1.2 West km Server Components

West km comprises several server components, as shown in the following West km Systems Diagram.

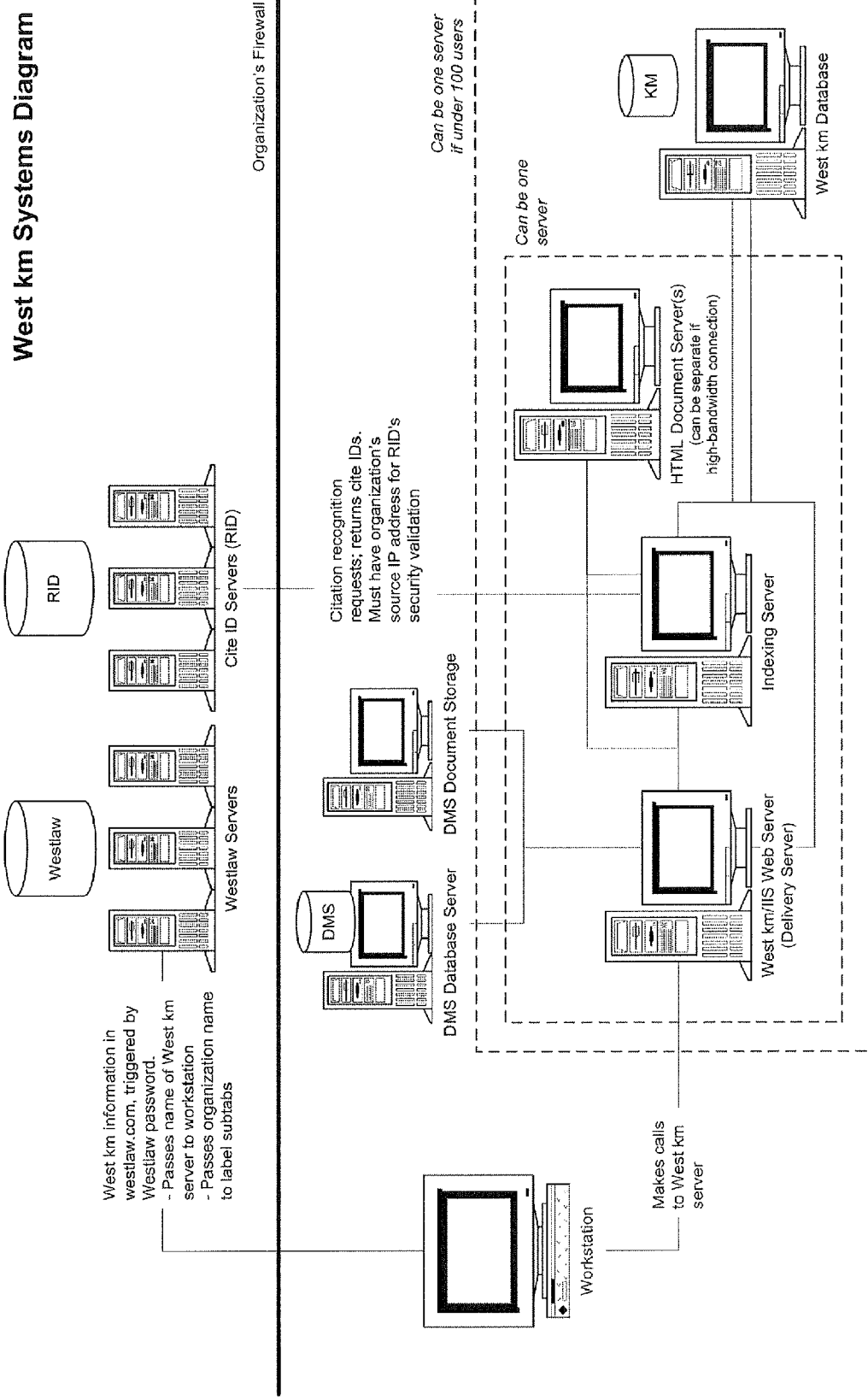

Following is a description of each server component:

West km server: Operates as the center of West km operations. It provides the front-end administration and also schedules indexing. (The West km server resides on the same machine as the IIS Web server; together they are referred to as the delivery server.)

IIS Web server: Supplies the ASP.NET environment for the West km administration front end and uses the Internet to access and display indexed documents in westlaw.com. (The IIS Web server resides on the same machine as the West km server; together they are referred to as the delivery server.)

Indexing server: Converts documents to HTML, finds citations in documents, assigns documents to KeySearch topics, and records citation locations and KeySearch assignments to the West km database. RID (reference identifier) engine software on the indexing server identifies citations, and West's classification and routing engine (CaRE) software on the indexing server assigns documents to KeySearch topics.

West km database: The West km database stores metadata about documents (e.g., KeyCite data about document citations, KeySearch topic assignments), document profile information, data for indexing scheduling, and KeySearch data. The West km RID database stores Westlaw document references for citation identification.

HTML document server(s): One or more HTML document servers store HTML renderings of indexed documents and full-text indexes of document collections. Each DMS database or library is mapped to an HTML folder with several levels of subfolders. At the bottom of the hierarchy, each HTML document is stored in a unique subfolder containing an HTML conversion of the original document (with no citation markup) and a style sheet file.

DMS server: Houses your organization's document management system and managed documents.

Cite ID servers (RID): If citations cannot be identified locally, Cite ID servers at West analyze documents to determine KeyCite information for citations and retrieve reference IDs to link the documents to Westlaw.

Westlaw servers: Hosts Westlaw services.

KeyCite flags server (not shown): Determines the current status of a KeyCite citation.

One dedicated server can be used for all West km server components (excluding your organization's DMS, which should reside on a separate server). Or, components can be distributed among several servers. Your ideal configuration will depend upon the number of users at your organization, the number of documents you are indexing with West km, the size of the documents, and the number of citations in the documents.

Following is a diagram of a typical server configuration. The West km database can reside on its own server or on the indexing server; likewise, the HTML document server can reside on the delivery server or on one or more separate servers.

Typical Server Configuration for West km
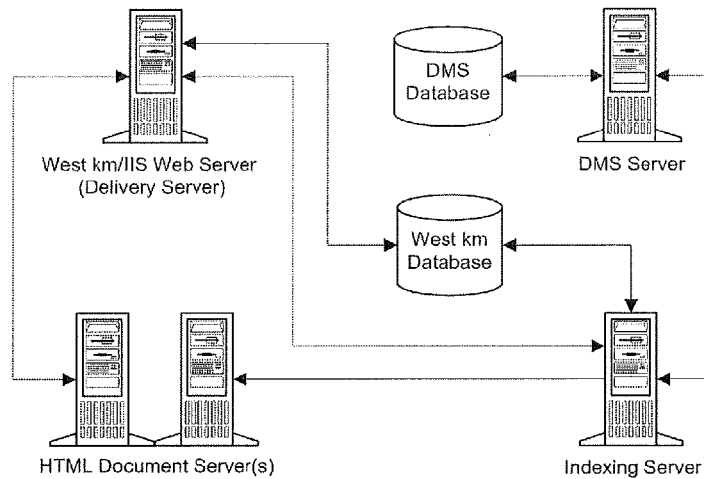
For detailed hardware and software requirements for West km, visit www.westkm.com/sysreq.html. For details about the configuration properties related to a distributed architecture, see "6.1 Setting Properties in a Distributed Architecture" on page 90.

Chapter 2

Installing the West km Application 2.1 What You Need  6

2.2 Run the West km Setup Program  7

2.3 Enable ActiveX Controls and the West km Client Application  14

2.4 Disable Anonymous Access for Full-Text Searching  15

2.5 Create the West km Database  16

2.6 Create the West km RID Database  22

2.7 Configure CaRE  25

2.8 Start West km Services  29

2.9 Verify Properties for the Event Log  29

2.10 Set Security  30

2.11 Configure DMS Services  44

---

The following table summarizes the software and databases that are installed with West km:

| Software Installed | Delivery Server | West km Database Server[1] | Indexing Server | HTML Document Servers |
|---|---|---|---|---|
| Full-text searching (FTS) software (NextPage NXT 3) | X | | | X |
| West km server application | X | | | |
| West km database | | X | | |
| West km RID database | | X | | |
| West km indexing service | | | X | |

| Software Installed | Delivery Server | West km Database Server[1] | Indexing Server | HTML Document Servers |
|---|---|---|---|---|
| West km HTML search service | | | | X |
| RID engine | | | X | |
| West's classification and routing engine (CaRE) | | | X | |

1. Databases on the West km database server are installed manually.

To install West km, complete the steps in the following subsections.

2.1 What You Need

Prior to installing West km, visit www.westkm.com/sysreq.html to make sure you meet the hardware requirements and that the necessary server software (and software versions) are installed. If you are distributing the West km server components among several machines, the following table summarizes the required software on the West km server components prior to the West km application installation:

| Software Requirement | Delivery Server | West km Database Server | Indexing Server | HTML Document Servers |
|---|---|---|---|---|
| Windows 2000 Server | X | X | X | X |
| Internet Information Server (IIS) | X | | | |
| Microsoft SQL Server | | X | | |
| Internet Explorer | X | | | |
| Microsoft .NET Framework[1] | X | | X | X |
| Sun Java Runtime Environment[1] | | | X | |

1. Microsoft .NET Framework and Sun Java Runtime Environment can be installed as part of the West km installation.

Note: If your organization uses a Sybase database server for ProLaw Version 9, and you want to take advantage of the West km integration with ProLaw, you will need to install OLE DB Provider on the delivery server and the indexing server to enable a connection with the Sybase database. Please contact your ProLaw support representative for details.

Prior to installing West km, you will also need the following:

- Access to all West km server components and the names of the servers
- The West km CD-ROMs
- A folder where you want the West km database to be installed

- Information to set up your initial West km administrative user, including name, network ID, and Westlaw password
- The password for the kmuser account to enable ActiveX controls and the West km client application (you will receive this password from West km Technical Support)
- The username and password for your system administrator account in SQL Server (on the server containing the West km database)
- If indexing documents stored in DOCSFusion 5.0 or iManage, your installation disks for these programs

2.2 Run the West km Setup Program

This series of steps installs the West km software. If you have one dedicated server for all West km server components (excluding your organization's DMS), you can complete these steps only once. If you have a distributed architecture, complete these steps for each of the following West km server components that resides on a separate machine:

- Delivery server
- Indexing server
- HTML document servers

1. Close all open applications.

2. Insert the West km CD-ROM 1 (Setup) into your CD-ROM drive. At the root folder, double-click setup.exe.

3. If Microsoft .NET Framework is not detected, you will be prompted to install it. To do so, click Yes at the Microsoft .NET Framework license agreement. West km will then install and configure Microsoft .NET Framework.

Microsoft .NET Framework is required on the delivery server, indexing server, and HTML document servers.

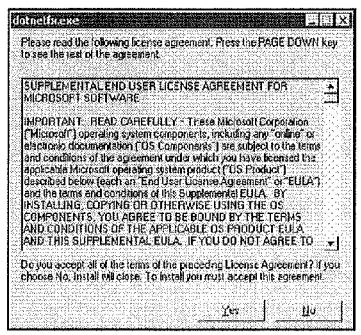

4. If Sun Java Runtime Environment is not detected, you will be prompted to install it. To do so, complete the steps below. Java Runtime Environment is required on the indexing server.

a. At the Java Runtime Environment License Agreement screen, click Yes.

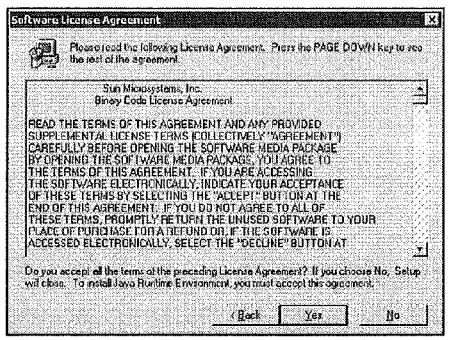

b. At the Choose Destination Location screen, accept the default location and click Next.

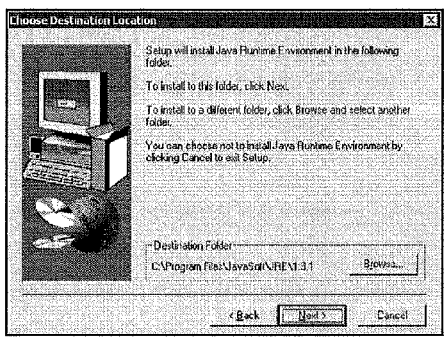

5. If Internet Explorer 5.5 or later is not detected, a warning dialog box will display. Click OK to continue with the installation. You need to install Internet Explorer 5.5 or later on the delivery server when the installation completes in order to have access to all features.

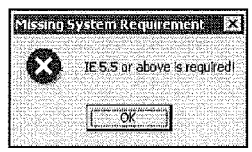

6. Do the following when you are prompted by the West km installation wizard:

a. At the Welcome screen, click Next to continue.

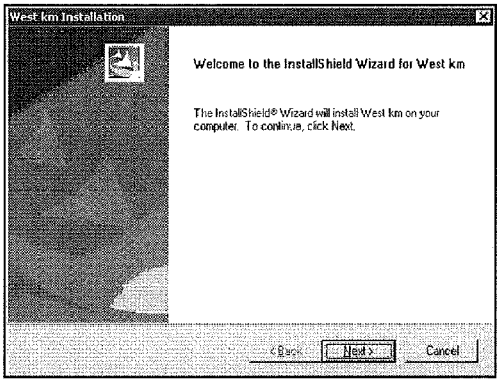

b. At the Important Information screen, review the list of prerequisite software. If all necessary prerequisite software has been installed, click Next. (Otherwise, click Cancel to exit setup, install the prerequisite software, and rerun the setup program.)

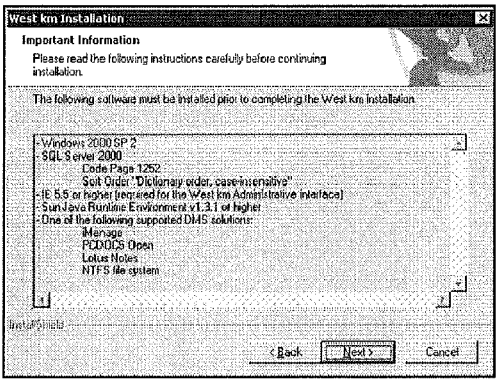

c. At the Choose Destination Location screen, select the folder where you want West km installed:
   - To install to the default destination folder, click Next.
   - To install to a different destination folder, click Browse, double-click the folder for installation, click OK, and then click Next to continue.

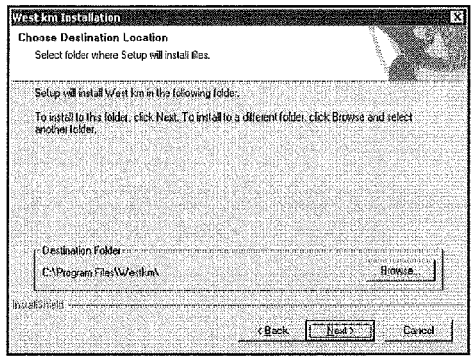

d. At the Select Features screen, select the features you want to install on this server and click Next. For example, if you are installing all West km components on one server, select all the features. If you are using separate servers for West km components (e.g., a dedicated server for just the West km server), select only the feature(s) you want installed on this server and clear the others:

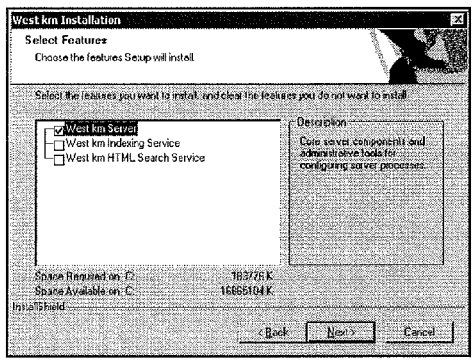

The following software is installed for each selected component:

| | |
|---|---|
| West km Server | West km server application |
| | Full-text searching (FTS) software (NextPage NXT 3) |
| | West km documentation files |
| West km Indexing Service | West km indexing service |
| | RID engine |
| | CaRE |
| | West km documentation files |
| West km HTML Search Service | West km HTML search service |
| | Full-text searching (FTS) software (NextPage NXT 3) |

Depending on the components you select, some or all of the remaining screens in the installation wizard will display.

Note: If you opt not to install some features, you can install them later by rerunning the West km setup program and selecting Modify.

e. At the Server and Document Locations screen, complete the following and click Next:

- In the *Delivery Server* text box, type the name of the server where you are installing the delivery server component.
- In the *Domain Name* text box, either retype the delivery server name or type the domain name for the delivery server (e.g., *yourdomain*.com).
- In the *Indexing Server* text box, type the name of the server where you are installing the indexing server component.
- In the *Database Server* text box, type the name of the server where you will install the West km database and the West km RID database.
- If you want to enable full-text indexing to run on your organization's documents, select Enable Full Text Indexing.
- If you want to enable CaRE to automatically assign your organization's documents to KeySearch legal topics during indexing, select Enable Categorization.

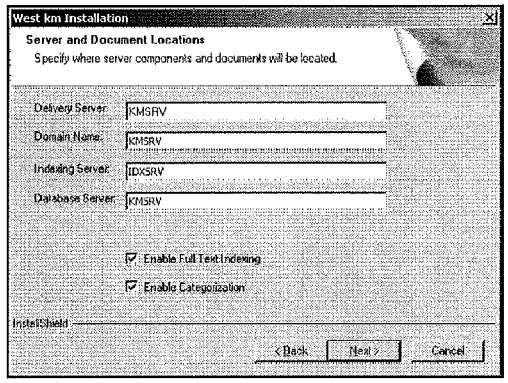

f. At the Proxy Server Settings screen, depending on the configuration of your organization's network and if you have a proxy server, select Use a proxy server for your LAN and enter your proxy server settings. Then click Next.

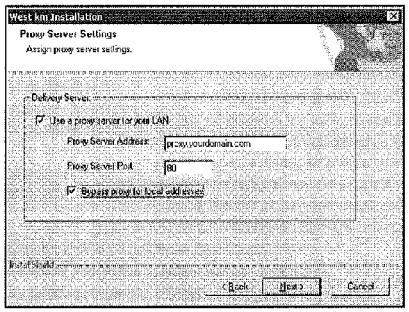

g. At the Professionals Administrator Account screen, enter the information to set up the initial West km administrative user and click Next.
   - First Name: the administrator's first name
   - Last Name: the administrator's last name
   - Account: the administrator's ID to log on to your organization's network
   - Westlaw Password: the administrator's password to sign on to Westlaw
   - West km Username: a username for the administrator to log on to West km
   - West km Password and Verify: a password for the administrator to log on to West km Note: The West km username and password are used only if you select the West km authentication security model; see "2.10.2 West km Custom Authentication" on page 36 for details.

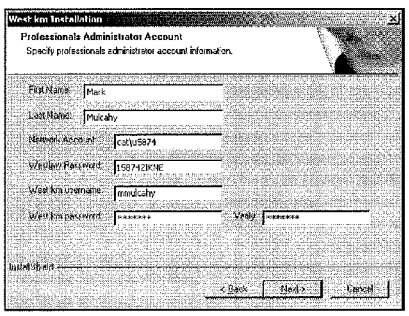

h. At the Start Copying Files screen, review your installation selections. If the selections are correct, click Next. (Otherwise, click Back to navigate back through the wizard screens and change your selections.)

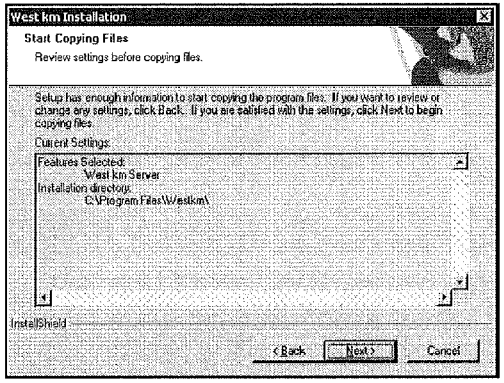

i. At the Setup Status screen, wait for the progress bar to complete.
j. At the Wizard Complete screen, select the option to restart your computer (if it's provided) and click Finish.

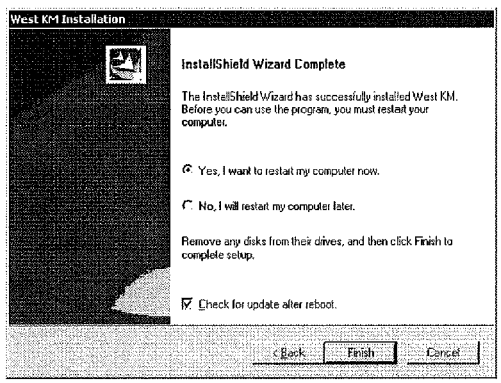

7. If you were not prompted to do so in the previous step, restart your computer to complete the setup of the West km application.

The West km setup program automatically installs NextPage NXT 3 for full-text indexing and searching. For more information about the manual steps behind this process, see "Appendix B: More about the West km Automated Setup" on page 109.

For a list of databases, folders, and .dll files that are installed, see "Appendix A: Installed West km Databases, Folders, and .dll Files" on page 107. For a list of the ports that are used by West km, see "Appendix C: West km Ports" on page 119.

2.3 Enable ActiveX Controls and the West km Client Application

On the delivery server, complete these steps to enable the ActiveX controls that allow members at your organization to load your organization's documents from West km and to use the West km client application.

1. Go to Start | Programs | Administrative Tools | Computer Management.

2. In the Computer Management window, expand the System Tools item in the navigation tree in the left frame, and then expand Local Users and Groups.

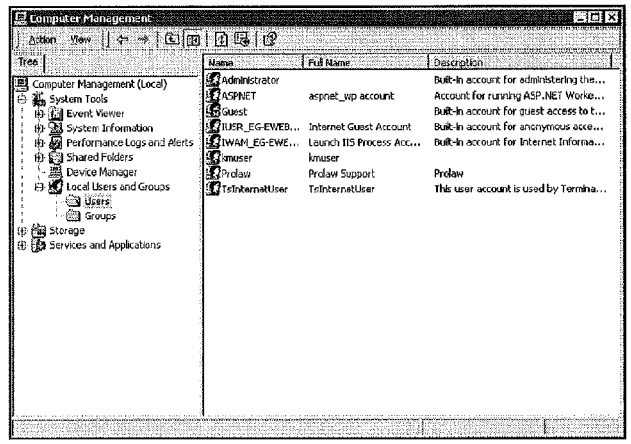

3. Right-click Users under *Local Users and Groups* and click New User.

4. In the New User dialog box, do the following:

a. Type kmuser in the *User name* text box.

b. Type the password for the kmuser in the *Password* and *Confirm password* text boxes. You will receive this password from West km Technical Support, available at 1-888-877-6529, option 8.

c. Clear the User must change password at next logon check box.

d. Select the User cannot change password check box.

e. Select the Password never expires check box.

f. Click Create.

g. Click Close.

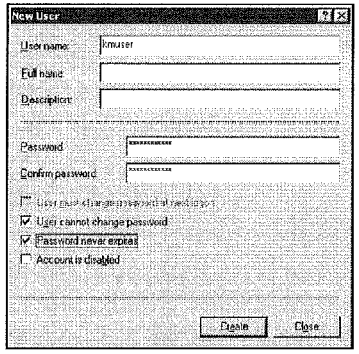

5. Close the Computer Management window.

2.4 Disable Anonymous Access for Full-Text Searching

Full-text searching (FTS) software is provided with the purchase of West km. Complete these steps on the delivery server and any HTML document server components that reside on a separate machine to disable anonymous access for full-text searching.

If you are using integrated Windows authentication as a security model, these steps are required to ensure that users are authenticated. If you are using West km custom authentication, these steps are optional. See "2.10 Set Security" on page 30 for more information about West km security models.

1. Go to Start | Programs | West km | FTS Content Network Manager.

2. At the Server Connection dialog box, type the name and password of your FTS administrator account in the *User name* and *Password* text boxes and click OK. (By default, the name of the FTS administrator account is *Administrator*. The password you will receive from West km Technical Support, available at 1-888-877-6529, option 8.)

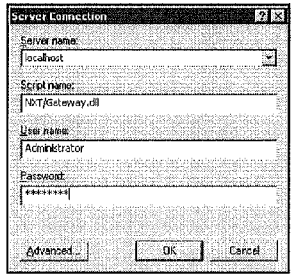

3. In the Content Network Manager window, right-click the root node (i.e., *localhost* or the server name) in the navigation tree and click Properties.

4. In the Server Properties dialog box on the General tab, click Properties under *Access control module*.

5. In the Access Control Properties dialog box, clear the Allow anonymous access check box and click OK.

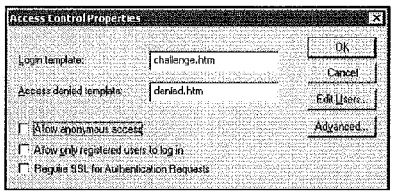

6. At the Server Properties dialog box, click OK.
7. At the Content Network Manager, click the Apply All Changes button .
8. Close the Content Network Manager window.

2.5 Create the West km Database

Complete the following steps to create the West km database and import KeySearch data into the West km database.

2.5.1 Create the West km Database

1. On the West km database server, go to Start | Programs | Microsoft SQL Server | Enterprise Manager. The SQL Server Enterprise Manager window is displayed.

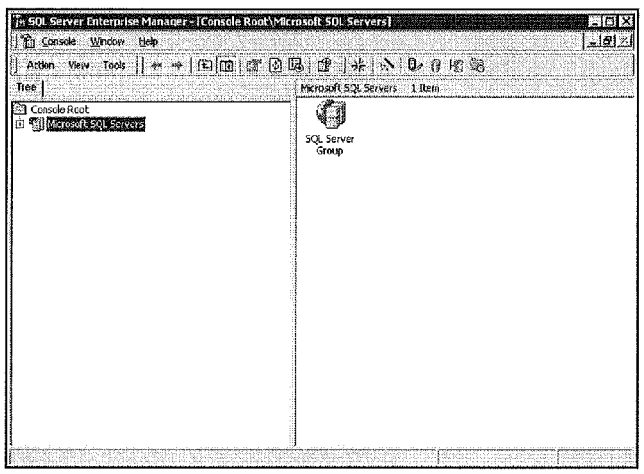

2. If the West km database will reside on a separate server, register that server:

a. Expand the *Microsoft SQL Servers* item in the navigation tree in the left frame to display the list of servers.

b. Right-click SQL Server Group in the navigation tree, select New SQL Server Registration, and then click Next at the Register SQL Server wizard.

c. Select the server to register from the list at left, click Add, and then click Next.

d. Select the SQL Server Authentication connection option, then click Next.

e. Enter the login name and password for the SQL server, then click Next.

f. Add the server to an existing server group by selecting a group from the *Group name* drop-down list, then click Next.

g. Click Finish and then click Close.

3. In the SQL Server Enterprise Manager window, do the following to create the database:

a. Right-click the Databases folder below the SQL server that will contain the West km database and select New Database.

b. In the Database Properties dialog box, type km in the *Name* text box.

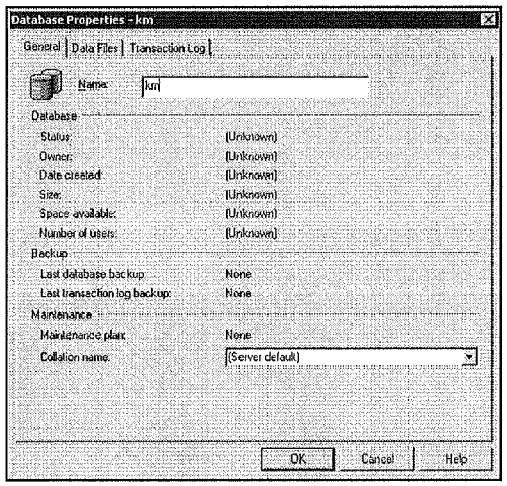

c. Click the Data Files tab. Under *Location*, click and edit the path to the desired location for the database.

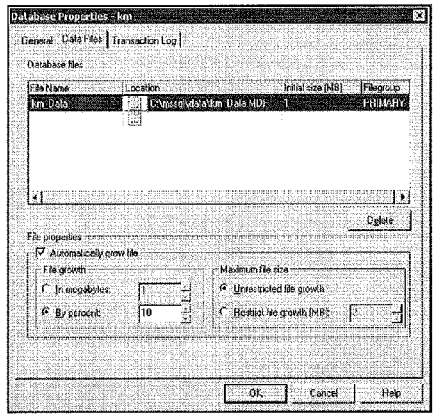
d. Click the Transaction Log tab. Under *Location*, click and edit the path to the desired location for the database log file and click OK.
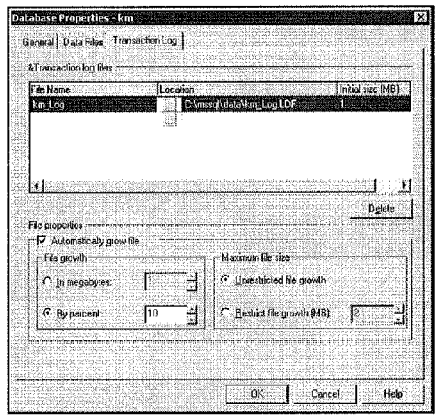
e. Close the SQL Server Enterprise Manager window.
4. Go to Start | Programs | Microsoft SQL Server | Query Analyzer.

5. At the Connect to SQL Server dialog box, type the name of your SQL server, select SQL Server authentication, type your name and password of your system administrator account in SQL Server, and click OK.

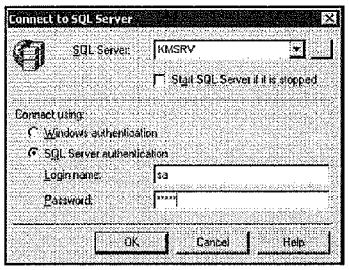

6. In the SQL Query Analyzer window, click the File menu and click Open. In the Open Query File dialog box, navigate to the DB subfolder in the West km installation folder (e.g., C:\Program Files\Westkm\DB), select km.sql, and click Open.

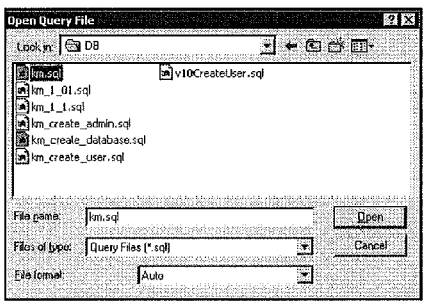

7. Click the Execute Query button  on the toolbar. This step populates the West km database.

8. Repeat steps 6–7 for the following query files in the order listed:
   - km_1_01.sql (update the database schema from version 1 to 1.01)
   - km_1_1.sql (update the database schema from version 1.01 to 1.1)
   - km_1_2.sql (update the database schema from version 1.1 to 1.2)
   - km_2_0.sql (update the database schema from version 1.2 to 2.0)
   - km_create_admin.sql (create an administrative user for West)
   - km_create_user.sql (create a generic West km user)
   - km_v10CreateUser.sql (set up the initial West km administrative user)

9. Close the SQL Query Analyzer window.

2.5.2 Import KeySearch Data into the West km Database

After creating the West km database, you must import KeySearch data. This process will add approximately 30 MB of data to the West km database.

Note: Even if you don't enable CaRE, KeySearch data is needed to manually classify your organization's documents to KeySearch legal topics.

1. On the West km database server, insert the West km CD-ROM 2 (RID/ KeySearch) into your CD-ROM drive. Navigate to the KeySearch subfolder and double-click setup.exe.

2. At the Wizard Welcome screen, click Next.

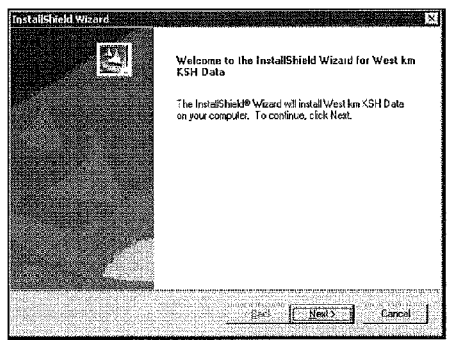

3. At the Features screen, select a temporary location for the import batch file, data files, and SQL scripts that will import the KeySearch data (this location requires approximately 4 MB of disk storage space):

- To select the default destination folder, click Next.
- To select a different destination folder, click Browse, double-click the folder you want, click OK, and then click Next to continue.

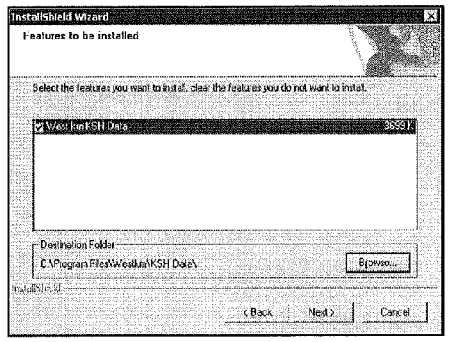

4. At the Enter Database Information screen, enter or select the following information and click Next:

- Server Name: Type the name of the server where you installed the West km database.
- Database Name: Type km.
- Database Administrator and Password: Type the name and password of your system administrator account in SQL Server. This account is needed to log in and run the import scripts.
- If you want the import scripts to run as part of this install process, select the Run osql and import KSH data check box. The scripts take approximately one minute to run.

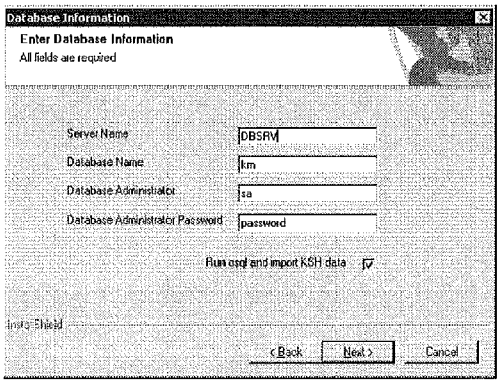

5. At the Check Setup Information screen, review your selections and click Next.

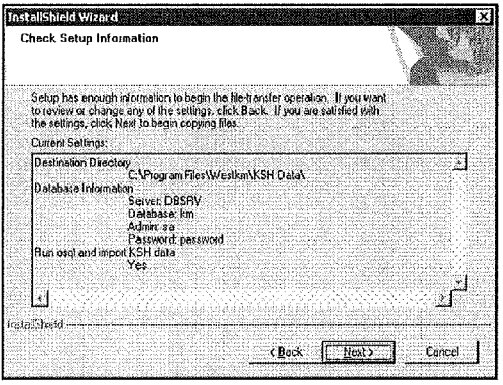

6. If you selected to run the import scripts as part of this install process, the ImportKSH.bat file automatically runs, importing the data and verifying that the correct number of rows have been imported. When prompted, press X.

7. At the Wizard Complete screen, click Finish.

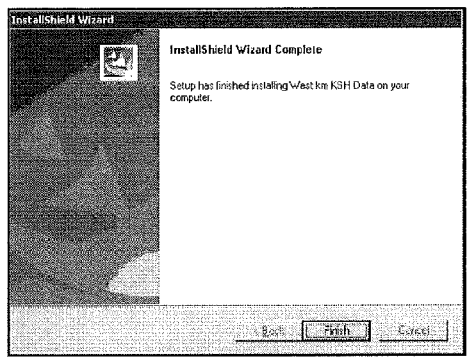

8. If you elected not to run the import scripts as part of this install process, navigate to the destination folder you selected (e.g., C:\Program Files\Westkm\KSH Data) and double-click ImportKSH.bat to import the KeySearch data. When prompted, press X.

9. Once the KeySearch data is imported, remove the import batch file, data files, and SQL scripts:

a. Go to Start | Settings | Control Panel | Add/Remove Programs.
   b. Select West km KSH Data and click Change/Remove.
   c. Click OK at both confirmation prompts.
   d. Click Finish.

2.6 Create the West km RID Database

Complete the following steps to create the West km RID database for storing Westlaw document references and for identifying citations. The West km RID database takes approximately 220 MB of storage space.

1. On the West km database server, insert the West km CD-ROM 2 (RID/KeySearch) into your CD-ROM drive.

2. Copy the RID\kmRID.bak file on the CD-ROM to a location on your hard drive.

3. Go to Start | Programs | Microsoft SQL Server | Enterprise Manager. The SQL Server Enterprise Manager window is displayed.

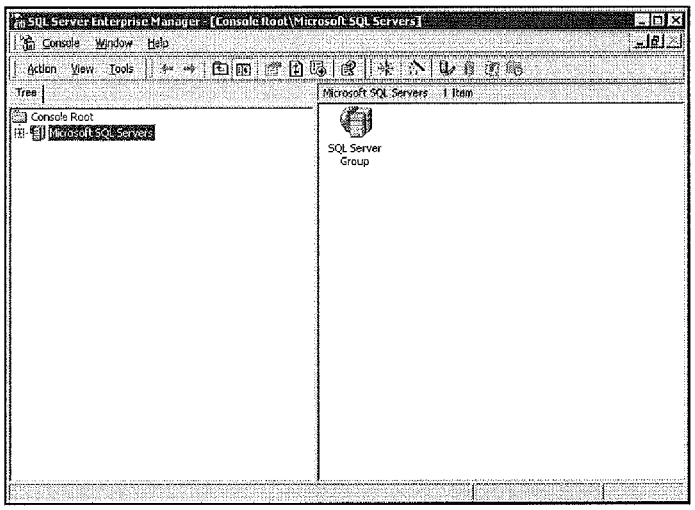

4. It is recommended that the West km RID database reside on the same server and in the same folder as the West km database. If the West km RID database will reside on a separate server, however, register that server:

a. Expand the *Microsoft SQL Servers* item in the navigation tree in the left frame to display the list of servers.

b. Right-click SQL Server Group in the navigation tree, select New SQL Server Registration, and then click Next at the Register SQL Server wizard.

c. Select the server to register from the list at left, click Add, and then click Next.

d. Select the SQL Server Authentication connection option, then click Next.

e. Enter the login name and password for the SQL server, then click Next.

f. Add the server to an existing server group by selecting a group from the *Group name* drop-down list, then click Next.

g. Click Finish and then click Close.

5. In the SQL Server Enterprise Manager window, right-click the Databases folder below the SQL server that will contain the West km RID database and select All Tasks. Then select Restore Database.

6. On the General tab in the Restore database dialog box, type kmRID in the *Restore as database* text box and select From Device.
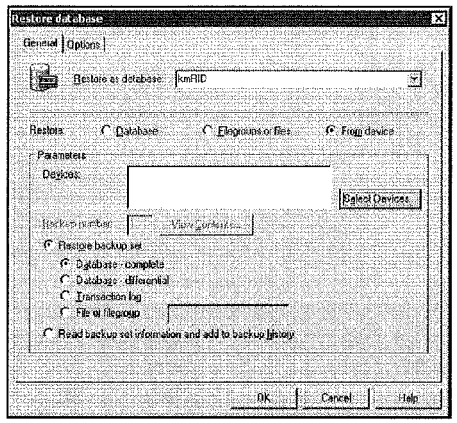
7. Click Select Devices.
8. In the Choose Restore Devices dialog box, click Add.
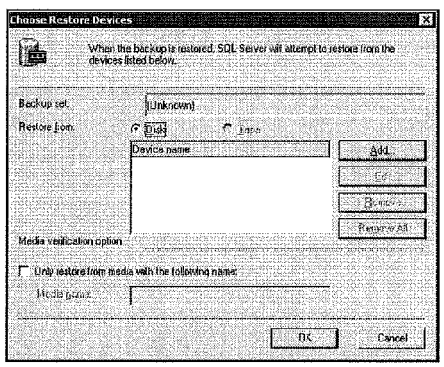
9. In the Choose Restore Destination dialog box, select File name. Then type the full path name to the file kmRID.bak, which you copied to your hard drive in step 2. Click OK.
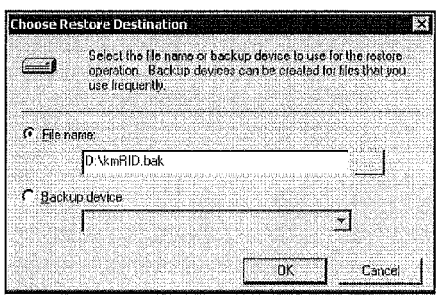

10. In the Choose Restore Devices dialog box, click the Options tab. Under *Move to physical file name*, click and edit the database file pathnames to the desired location for the database (do not edit the logical file names). Then click OK.

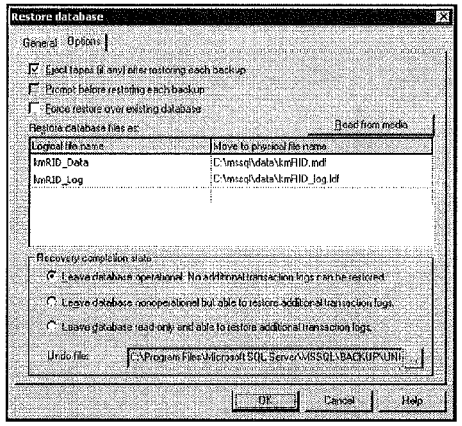

11. In the Restore database dialog box on the General tab, select Restore backup set and Database – complete and click OK.

12. When the database has been restored, delete the kmRID.back file from your hard drive.

2.7 Configure CaRE

CaRE is West's proprietary software for document classification. When enabled to run, CaRE assigns documents with at least one case law citation to KeySearch legal topics during indexing.

CaRE includes a software component, which is installed on the indexing server during the West km setup, and a flat file database component, which is installed manually on the indexing server.

As necessary, complete the steps in the following subsections to configure CaRE.

2.7.1 Install the CaRE Flat-File Database

If you want CaRE to run on your organization's documents during indexing, you must install CaRE database files to the indexing server. These files take approximately 1 GB of storage space.

1. On the indexing server, insert the West km CD-ROM 3 (CaRE) into your CD-ROM drive. At the root folder, double-click West km 2.0 CaRE Data.exe and follow the on-screen prompts.

2. Select the following location for the CaRE flat-file database: *West km installation folder*\CaRE\data\filedb folder. The default location is C:\Program Files\Westkm\CaRE\data\filedb.

2.7.2 Modify CaRE Memory Settings

Depending on the resources of your indexing server, you may want to modify the amount of memory used by CaRE processes. By default, CaRE is configured to use 1 GB of dedicated RAM.

To decrease or increase the amount of RAM that CaRE reserves, adjust the following side array property in the ksh.classify.server.conf file (located at *West km installation folder*\CaRE\Psetup\etc) on the indexing server:

```
param.sideArray.memoryLimit    :350000000
```

(See "6 Setting Properties in Configuration Files" on page 89 for instructions on setting properties in configuration files.)

The total memory used by CaRE is 650 MB plus the size of the side array, which determines how much statistical data is cached by CaRE. For example, if you want CaRE to use no more than 1 GB total memory, the memory limit should be 350 MB, which translates to a value of 350000000 for the side array property.

| Memory limit desired | Size of side array | Value for side array property |
|---|---|---|
| 800 MB | 150 MB | 150000000 |
| 900 MB | 250 MB | 250000000 |
| 1 GB | 350 MB | 350000000 |
| 1.1 GB | 450 MB | 450000000 |
| 1.2 GB | 550 MB | 550000000 |
| 1.3 GB | 650 MB | 650000000 |
| 1.4 GB | 750 MB | 750000000 |
| 1.5 GB | 850 MB | 850000000 |

Increasing or decreasing the value of the side array property translates directly into an equivalent increase or decrease in CaRE memory usage. CaRE performance is improved with increased values and can worsen with decreased values.

CaRE performance is ultimately a function of the size and current content of the size arrays (cache), activity on the indexing server, other processes on the indexing server, and SQL Server's cache.

2.7.3 Set Number of KeySearch Topic Assignments per Document

By default, CaRE categorizes each document into the five most relevant topics in the KeySearch hierarchy. You can change the number of topic assignments by adjusting the following property in the AtlasIndexingService.exe.config file on the indexing server:

```
<add key="care_NumScores" value="5" />
```

(See "6 Setting Properties in Configuration Files" on page 89 for instructions on setting properties in configuration files.)

It is recommended that you not exceed *10* for this value.

2.7.4 Install Simple CaRE Driver

If desired, you can install a driver to test and troubleshoot CaRE.

To install Simple CaRE Driver, complete the following:

1. On the indexing server, navigate to the *West km installation folder*\CaRE\SimpleDriver folder (e.g., C:\Program Files\Westkm\CaRE\SimpleDriver).

2. Double-click Setup.exe.

3. At the Welcome screen, click Next to continue.

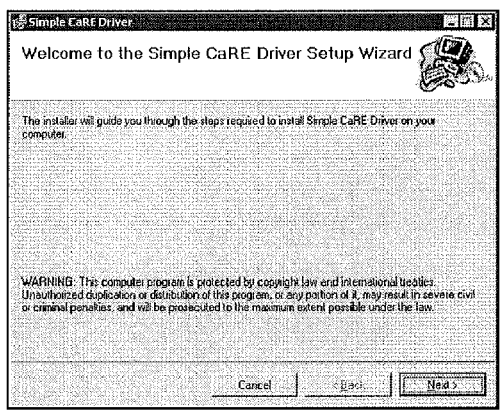

4. At the Select Installation Folder screen, do the following:

a. Enter the following path in the *Folder* text box: *West km installation folder*\CaRE\Simple CaRE Driver\. For example, type C:\Program Files\Westkm\CaRE\Simple CaRE Driver\.

b. Select Everyone.

c. Click Next.

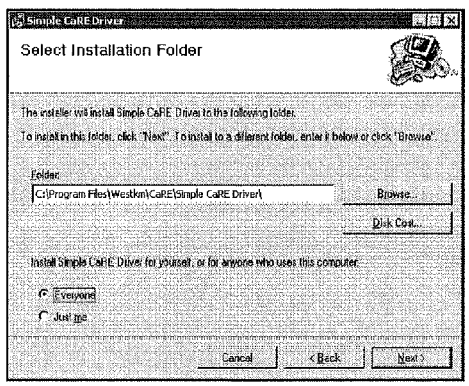

5. At the Confirm Installation screen, click Next.

6. At the Installation Complete screen, click Close.

To test CaRE using Simple CaRE Driver, do the following:

1. On the indexing server, navigate to the *West km installation folder*\CaRE\Simple CaRE Driver folder and double-click SimpleCareDriver.exe.

2. In the Simple CaRE Driver Form, enter the text that you want CaRE to classify in the *Enter text to be classified* text box and click Send Request.

The *Results* text box displays the categories to which the entered text was classified by CaRE.

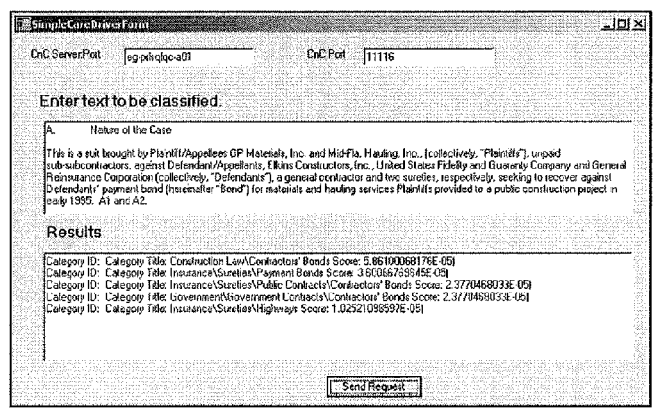

2.8 Start West km Services

To start West km services, for each service in the order listed below, complete these steps on the service's associated server:

| West km Service | Associated Server |
| --- | --- |
| West km Indexing Service[1] | Indexing server |
| West km HTML Search Service | HTML document server |

1. When the West km Indexing Service is started, it will start the West km indexing helper service, the West km CaRE service, and the West km CaRE CNC service.

1. Go to Start | Programs | Administrative Tools | Services.

2. In the Services window, if the *Status* column does not say *Started* for the service, right-click the name of the service (e.g., West km Indexing Service) and click Start.

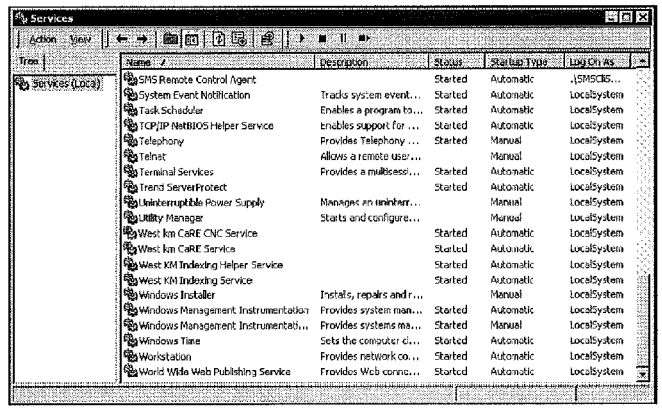

3. After starting the service on the server, close the Services window.

2.9 Verify Properties for the Event Log

The event log is created when the West km services are started. You may need to adjust the log properties to ensure that the log won't become full. (If you have a distributed architecture, complete these steps on the indexing server and delivery server.)

1. Go to Start | Programs | Administrative Tools | Event Viewer.

2. Right-click ProLaw in the navigation tree of the Event Viewer window and select Properties.

3. The *Maximum log size* should be 32768; change it if necessary.

4. Select Overwrite events as needed.

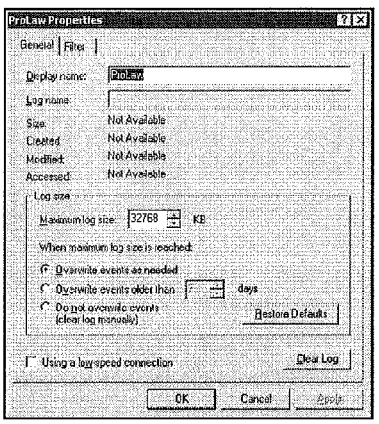

5. Click OK.
6. Close the Event Viewer window.

2.10 Set Security

You can select one of three security models in West km to control access to West km resources at your organization. For more information about using these models, refer to the following subsections.

- Integrated Windows authentication (IWA): If your organization administers computer users in an NT domain, you can use defined groups to administer your West km members. See "2.10.1 Integrated Windows Authentication" on page 34 for details. Integrated Windows authentication is the default security model.

- West km custom authentication: If your organization does not administer computer users in an NT domain, you can control your members' access to West km via usernames and passwords administered in West km.

- No authentication: If you don't want to set document security at your organization (not recommended), anyone at your organization can access West km.

Depending on your DMS, authentication model, and authenticating network, the following table lists the configuration that is required for West km document security and authentication to function properly.

| DMS | West km Authentication Model | Authenticating Network[1] | Configuration Details |
| --- | --- | --- | --- |
| DOCS Open/ PCDocs | IWA | Windows | The Network ID in the Professionals table must match the Windows network ID (qualified by domain) for each member. |
| DOCS Open/ PCDocs | Custom | Windows | The Network ID in the Professionals table must match the Windows network ID (qualified by domain) for each member. |
| | | | Each member must have a Custom User Name and Custom User Password in the Professionals table. |
| DOCS Open/ PCDocs | Custom | Novell | The Network ID in the Professionals table must match the Novell network ID for each member. |
| | | | Each member must have a Custom User Name and Custom User Password in the Professionals table. |
| iManage | IWA | Windows | The DMS library information in Database Management must contain an Admin username and password. |
| | | | The Network ID in the Professionals table must match the Windows network ID (qualified by domain) for each member. |
| | | | If iManage is configured to use virtual usernames, one of the following must be configured: |
| | | | • All members must have their iManage virtual usernames entered into the Professionals table. The web.config file must have DmsUserIdsRequired set to y to enable this field. This configuration relies on West km logic to apply document level security. |
| | | | • All members must have their iManage virtual usernames and passwords entered into the Professionals table. The web.config file must have DmsUserIdsRequired set to y and DmsUserPasswordsRequired set to y to enable these fields. This configuration relies on iManage to apply security. Note that if a user changes his or her iManage password, it must also be changed in the Professionals table. |

| DMS | West km Authentication Model | Authenticating Network[1] | Configuration Details |
|---|---|---|---|
| iManage | Custom | Windows or Novell | The DMS Library information in Database Management must contain an Admin username and password. |
| | | | Each member must have a Custom User Name and Custom User Password in the Professionals table. |
| | | | If iManage is configured to use virtual usernames, one of the following must be configured: |
| | | | • All members must have their iManage virtual usernames entered into the Professionals table. The web.config file must have DmsUserIdsRequired set to $y$ to enable this field. This configuration relies on West km logic to apply document level security. |
| | | | • All members must have their iManage virtual usernames and passwords entered into the Professionals table. The web.config file must have DmsUserIdsRequired set to $y$ and DmsUserPasswordsRequired set to $y$ to enable these fields. This configuration relies on iManage to apply security. Note that if a member changes his or her iManage password, it must also be changed in the Professionals table. |
| | | | If iManage is configured to use network usernames: |
| | | | • The Network ID in the Professionals table must match the network ID (Windows or Novell, whichever applies) for each member. |
| DOCSFusion | IWA | Windows | The Network ID in the Professionals table must match the Windows network ID (qualified by domain) for each member. |
| | | | One of the following must be configured: |
| | | | • The DMS library information in Database Management must contain an Admin username and password. This option does not require password management like the option below. However, it does not allow user-based access records to be logged when users pull documents from the DMS during Load Copy. |
| | | | • All members must have their DOCSFusion usernames and network passwords (either Windows or Novell, whichever applies) entered into the Professionals table. The web.config file must have FusionUseIndividualLogins set to *true* to enable these fields. Note that if a member changes his or her network password, it must also be changed in the Professionals table. This option allows DOCSFusion to log user-based access records when members pull documents from the DMS during Load Copy. |

| DMS | West km Authentication Model | Authenticating Network[1] | Configuration Details |
| --- | --- | --- | --- |
| DOCSFusion | Custom | Windows or Novell | Each member must have a Custom User Name and Custom User Password in the Professionals table. |
| | | | The Network ID in Professionals must match the network ID (either Windows or Novell, whichever applies) for each member. |
| | | | One of the following must be configured: |
| | | | • The DMS library information in Database Management must contain an Admin username and password. This option does not require password management like the option below. However, it does not allow user-based access records to be logged when members pull documents from the DMS during Load Copy. |
| | | | • All members must have their DOCSFusion usernames and network passwords (either Windows or Novell, whichever applies) entered into the Professionals table. The web.config file must have FusionUseIndividualLogins set to *true* to enable these fields. Note that if a member changes his or her network password, it must also be changed in the Professionals table. This option allows DOCSFusion to log user-based access records when members pull documents from the DMS during Load Copy. |
| Lotus Notes[2] | IWA | Windows | The Network ID in the Professionals table must match the Windows network ID (qualified by domain) for each member. |
| Lotus Notes[2] | Custom | Windows or Novell | Each member must have a Custom User Name and Custom User Password in the Professionals table. |
| NTFS[3] | IWA | Windows | The Network ID in the Professionals table must match the Windows network ID (qualified by domain) for each member. |
| NTFS[3] | Custom | Windows or Novell | Each member must have a Custom User Name and Custom User Password in the Professionals table. |
| ProLaw 9 | IWA | Windows | The Network ID in the Professionals table must match the Windows network ID (qualified by domain) for each member. |
| ProLaw 9 | Custom | Windows or Novell | The Network ID in the Professionals table must match the network ID (either Windows or Novell, whichever applies) for each member. |
| | | | Each member must have a Custom User Name and Custom User Password in the Professionals table. |

1. This network is the network to which users authenticate when signing on to the organization's network and with which the organizations DMS is configured to interoperate.
2. All Lotus Notes documents are treated as public in West km.
3. All NTFS documents are treated as public in West km.

For more information about

- administering West km members in the Professionals table, see "4.9 Administer West km Members" on page 76.
- using virtual logins if your organization uses iManage as its DMS, see "4.9.4 Adjusting the Professionals Table Configuration for iManage" on page 78.
- controlling access to your West km documents via the document security implemented in your DMS, see "4.8 Set a Document Security Level" on page 75.

To index documents with West km, a Windows domain administrator account is required. This account must have access to all NTFS and DOCS Open/PCDocs documents you are indexing and to all West km server components. In the West km NT Security Diagram on page 35, this account is represented by the West km Admin on the resource domain. If you are not using an NT networking environment, the Windows domain administrator account needs to be created locally with the same password on all West km server components.

2.10.1 Integrated Windows Authentication

In a Windows NT networking environment, you can use defined groups to administer your West km members and to grant them the rights and resource permissions necessary to use West km.

In the West km NT Security Diagram on the following page, the Windows domain administrator account is represented by the West km Admin account, which you create and then add to the West km admin local groups on the indexing, delivery, and HTML document servers. (If you have multiple resource domains, you must create the West km Admin account at the user domain level.)

Users of West km can be added to West km user global groups, which in turn are added to West km user local groups on the delivery and HTML document servers (or users can be added directly to the local groups). The groups labeled optional in the diagram are not necessary if the Everyone group is set to Read/Execute.

In the diagram, the necessary NT permissions on application directories, IIS configuration settings, and defaults for NT services are listed underneath each server component. See also "2.10.4 Minimum Security Requirements for West km" on page 39.

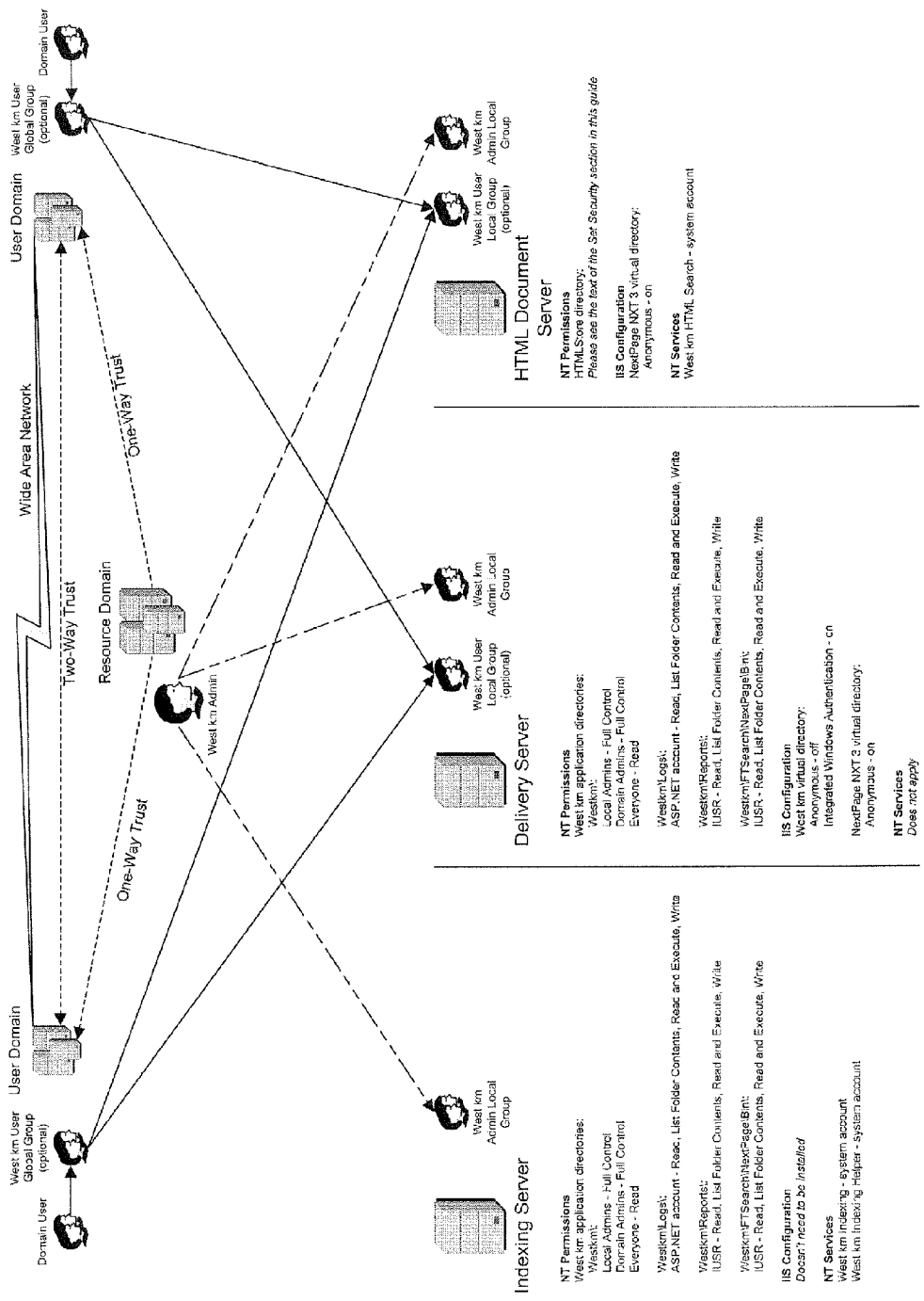

2.10.2 West km Custom Authentication

If you are not using an NT networking environment, you control your members' access to West km via usernames and passwords administered in West km.

To use West km custom authentication as a security model, set the authentication property in Web.config to *kmAuthentication* and IIS permissions to anonymous, as described in the following subsections.

2.10.2.1 Set the Authentication Property

To use West km custom authentication, change the following property in the Web.config file to *kmAuthentication*. (The default value is *IWA*.)

```
<add key="atlas_AuthenticationMode" value="kmAuthentication" />
```

(See "6 Setting Properties in Configuration Files" on page 89 for instructions on setting properties in configuration files.)

The *kmAuthentication* setting will add columns for Custom User Name and Custom User Password to the Professionals table, where you can administer your West km members' login information.

Your members will then be prompted to enter the West km username and password you designate for them when they access West km content from their Web browser or word processor.

For more information about administering your West km members with this security model, see "4.9.5 Using the Professionals Table with West km Custom Authentication" on page 80.

2.10.2.2 Set IIS Permissions to Anonymous

For West km custom authentication, it is recommended that IIS permissions be set to anonymous:

1. On the delivery server, go to Start | Programs | Administrative Tools | Computer Management.

2. In the Computer Management window, expand the Services and Applications item in the navigation tree in the left frame, and then expand Internet Information Services and Default Web Site.

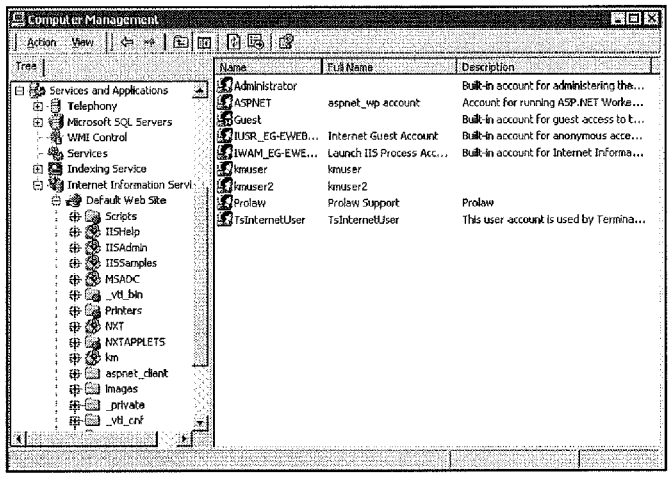

3. Right-click km under *Default Web Site* and click Properties.

4. In the km Properties dialog box, click the Directory Security tab and then click Edit under *Anonymous access and authentication control*.

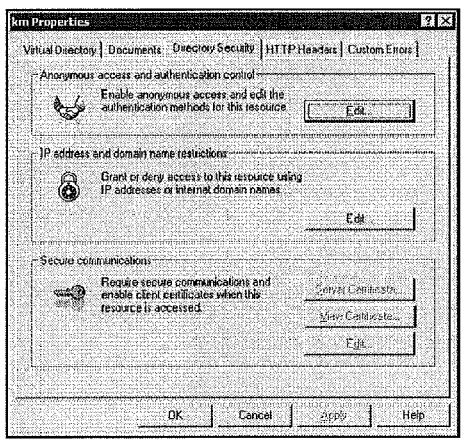

5. In the Authentication Methods dialog box, do the following:

a. Select the Anonymous access check box.

b. Clear the Basic authentication and Integrated Windows authentication check boxes.

c. Click OK.

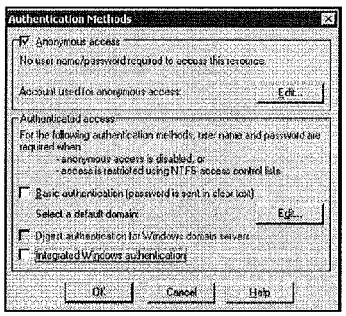

6. Click OK to close the km Properties dialog box.

7. In the Computer Management window, click Services under *Services and Applications* in the left frame.

8. Right-click World Wide Web Publishing Service in the right frame and click Restart.

9. Close the Computer Management window.

2.10.3 No Authentication

To use no authentication, do the following:

- Change the following property in the Web.config file to *None*. (The default value is *IWA*.)

```
  <add key="atlas_AuthenticationMode" value="None" />
  ```

(See "6 Setting Properties in Configuration Files" on page 89 for instructions on setting properties in configuration files.)

- In the Professionals table, add a member with a network ID of *km_test_user* (not tied to a network account) and select the Westkm Admin check box. Do not enter values for the other fields. (See "4.9 Administer West km Members" on page 76 for instructions on adding West km members.)

- Set IIS permissions to anonymous access, as described in "2.10.2.2 Set IIS Permissions to Anonymous" on page 36.

2.10.4 Minimum Security Requirements for West km

This section describes how to set minimum security rights for West km. Configuring your West km servers according to these guidelines will ensure that your West km environment is as secure as possible.

West km provides a utility (West km IIS Lockdown) that will install the Microsoft IIS Lockdown 2.1 and URLScan 2.5 utilities and configure NTFS permissions in a way that allows West km to function, yet still be secure. You can also set permissions manually.

> Important: The West km IIS Lockdown utility replaces—not modifies or adds—any existing permissions for the locations listed under *The following rights are set* in "2.10.4.5 Changes Made by the West km IIS Lockdown Utility" on page 43.

Refer to the following articles on the Microsoft Web site for more information on IIS Lockdown and URLScan:

- Windows 2000 Server Baseline Security Checklist: www.microsoft.com/technet/treeview/default.asp?url=/technet/security/tools/chklist/w2ksvrcl.asp
- IIS Lockdown Tool: www.microsoft.com/technet/treeview/default.asp?ulr=/technet/security/tools/tools/locktool.asp
- URLScan Security Tool: www.microsoft.com/technet/treeview/default.asp?url=/technet/security/tools/tools/urlscan.asp

2.10.4.1 Installing the West km IIS Lockdown Utility

1. On the delivery server, insert the West km CD-ROM 1 (Setup) into your CD-ROM drive.

2. Navigate to the Install Utilities\WestkmIISLockDown folder on the CD-ROM and double-click WestkmIISLockDown.exe to launch the installation.

Note: Do not press any keys during the installation.

3. When the installation completes, restart your computer.

4. In Windows Explorer, navigate to C:\Logs and double-click WestkmIISLockDown.log.

5. In the log file, scroll to the bottom and verify the display of this message: *The installation of the WestkmIISLockDown Utility was successful.*

If you do not see this message, a problem occurred during the installation. Read through the log file and look for any errors or failed operations. If no errors are present, try removing and reinstalling the utility.

6. If you have any problems with installing the utility or with West km after installation of the utility, call West km Technical Support at 1-888-877-6529 (option 8) for assistance.

2.10.4.2 Removing the West km IIS Lockdown Utility

1. On the delivery server, insert the West km CD-ROM 1 (Setup) into your CD-ROM drive.

2. Navigate to the Install Utilities\WestkmIISLockDown folder on the CD-ROM and double-click WestkmIISLockDown.exe. The utility will detect that it was installed previously and begin the removal process.

Note: No user intervention is required during removal.

3. When the removal process completes, restart your computer.

4. In Windows Explorer, navigate to C:\Logs and double-click WestkmIISLockDown.log.

5. In the log file, scroll to the bottom and verify the display of this message: *You have successfully removed the WestkmIISLockDown Utility.*

If you see *The removal of the WestkmIISLockDown utility was not successful. Check the Uninstall Section of the log file to see what failed*, then a problem occurred during the removal process. Refer to the "Verifying the uninstall worked properly" section in the log file to see what failed.

If no information in this section tells you what failed, call West km Technical Support at 1-888-877-6529 (option 8) for assistance.

6. If you have any problems with installing the utility or with West km after installation of the utility, call West km Technical Support at 1-888-877-6529 (option 8).

2.10.4.3 Setting Rights with Lockdown Applied

The West km IIS Lockdown utility creates a local Web Anonymous Group and sets the rights for it, as well as the local ASP.NET account. For details, see *The following rights are set* in "2.10.4.5 Changes Made by the West km IIS Lockdown Utility" on page 43.

Note: By default, the Lockdown utility will deny Write access to all Web Content directories (i.e., Westkm) for the Web Anonymous Group. You need to ensure that you clear the Deny check box in order for Write access to work.

In addition, set rights as follows:

Document locations (local machine):

- The local ASP.NET account needs the following rights on any document location that you want to index:
  - Share permissions: Read, Change
  - NTFS: Read, Read and Execute, List Folder Contents, Write Document locations (remote machine):

- The local ASP.NET account needs the following rights on any document location that you want to index:
  - Share permissions: Read, Change
  - NTFS: Read, Read and Execute, List Folder Contents, Write
- Your West km domain administrator account needs the following rights on the remote document directories:
  - Share permissions: Read, Change
  - NTFS: Read, Read and Execute, List Folder Contents, Write HTML storage locations (local machine):

- The local ASP.NET account needs the following rights on any HTML storage location that you create:
  - Share permissions: Read, Change
  - NTFS: Read, Read and Execute, List Folder Contents, Write HTML storage locations (remote machines):

- The local ASP.NET account needs the following rights on any HTML storage location that you create:
  - Share permissions: Read, Change
  - NTFS: Read, Read and Execute, List Folder Contents, Write
- Your West km domain administrator account needs the following rights on the remote HTMLStore folder:
  - Share permissions: Read, Change
  - NTFS: Read, Read and Execute, List Folder Contents, Write After changing folder permissions for West km, restart IIS and the West km services.

2.10.4.4  Setting Rights without Lockdown Applied

If you don't install the West km IIS Lockdown utility, set rights as follows:

Local ASP.NET account:
The local ASP.NET account needs the following rights in order for application logging to function. If you do not grant these rights, you will be unable to create HTML storage locations and index your documents.

- Location: *West km installation folder*\Logs
  Assigned rights: Read, Read and Execute, List Folder Contents, Write Local IUSR:
The local IUSR_*ServerName* needs the following rights in order for the application to modify INI files, as well as report. The IUSR_*ServerName* account is used for anonymous access.

- Location: *West km installation folder*\Reports
  Assigned rights: Read, Read and Execute, List Folder Contents, Write
- Location: *West km installation folder*\FTSearch\NextPage\Bin
  Assigned rights: Read, Read and Execute, List Folder Contents, Write
- Location: West km installation folder\FTSearch\NextPage\Ext
  Assigned rights: Read, Read and Execute, List Folder Contents, Write

Document locations (local machine):

- The local ASP.NET account needs the following rights on any document location that you want to index:
  - Share permissions: Read, Change
  - NTFS: Read, Read and Execute, List Folder Contents, Write

Document locations (remote machine):

- The local ASP.NET account needs the following rights on any document location that you want to index:
  - Share permissions: Read, Change
  - NTFS: Read, Read and Execute, List Folder Contents, Write
- Your West km domain administrator account needs the following rights on the remote document directories:
  - Share permissions: Read, Change
  - NTFS: Read, Read and Execute, List Folder Contents, Write

HTML storage locations (local machine):

- The local ASP.NET account needs the following rights on any HTML storage location that you create:
  - Share permissions: Read, Change
  - NTFS: Read, Read and Execute, List Folder Contents, Write

HTML storage locations (remote machines):

- The local ASP.NET account needs the following rights on any HTML storage location that you create:
  - Share permissions: Read, Change
  - NTFS: Read, Read and Execute, List Folder Contents, Write
- Your West km domain administrator account needs the following rights on the remote HTMLStore folder:
  - Share permissions: Read, Change
  - NTFS: Read, Read and Execute, List Folder Contents, Write After changing folder permissions for West km, restart IIS and the West km services.

2.10.4.5 Changes Made by the West km IIS Lockdown Utility

Changes service smtpsvc startup type from Automatic to Disabled.
Backed up metabase
Locked httpext.dll
Locked idq.dll
Disabled Internet Printing
Installed URLScan
Removed script map: .htw, C:\WINNT\System32\webhits.dll
Removed script map: .ida, C:\WINNT\System32\idq.dll
Removed script map: .idq, C:\WINNT\System32\idq.dll
Removed script map: .htr, C:\WINNT\System32\inetsrv\ism.dll
Removed script map: .idc, C:\WINNT\System32\inetsrv\httpodbc.dll
Removed script map: .shtm, C:\WINNT\System32\inetsrv\ssinc.dll
Removed script map: .shtml, C:\WINNT\System32\inetsrv\ssinc.dll
Removed script map: .stm, C:\WINNT\System32\inetsrv\ssinc.dll
Removed script map: .printer, C:\WINNT\System32\msw3prt.dll
Removed script map: .htw, C:\WINNT\System32\webhits.dll
Removed script map: .ida, C:\WINNT\System32\idq.dll
Removed script map: .idq, C:\WINNT\System32\idq.dll
Removed script map: .htr, C:\WINNT\System32\inetsrv\ism.dll
Removed script map: .idc, C:\WINNT\System32\inetsrv\httpodbc.dll
Removed script map: .shtm, C:\WINNT\System32\inetsrv\ssinc.dll
Removed script map: .shtml, C:\WINNT\System32\inetsrv\ssinc.dll
Removed script map: .stm, C:\WINNT\System32\inetsrv\ssinc.dll
Removed script map: .printer, C:\WINNT\System32\msw3prt.dll
Installed 404.dll to system32\inetsrv
Removed printer virtual dir (/LM/W3SVC/1/ROOT/Printers)
Removed samples (/LM/W3SVC/1/ROOT/IISSamples)
Removed MSADC virtual dir (/LM/W3SVC/1/ROOT/MSADC)
Removed scripts virtual dir (/LM/W3SVC/1/ROOT/Scripts)
Removed IISAdmin virtual dir (/LM/W3SVC/1/ROOT/IISAdmin)
Removed IISAdmin web site (/LM/W3SVC/2)
Removed IISAdmin virtual dir (/LM/W3SVC/1/ROOT/IISHelp)
Set Deny All ACE for anonymous Web users on system utilities under C:\WINNT
Set Deny Write ACE for anonymous Web users under C:\inetpub\wwwroot
Set Deny Write ACE for anonymous Web users under C:\Program Files\Common Files\Microsoft Shared\Web Server Extensions\40\isapi
Set Deny Write ACE for anonymous Web users under C:\Program Files\Westkm The following rights are set:

The local ASP.NET account is set to the following:

- Location: *West km installation folder*\Logs
  Assigned rights: Read, Read and Execute, List Folder Contents, Write The local Web Anonymous Group is set to the following:

- Location: *West km installation folder*\Reports
  Assigned rights: Read, Read and Execute, List Folder Contents, Write

- Location: *West km installation folder*\FTSearch\NextPage\Bin
  Assigned rights: Rights: Read, Read and Execute, List Folder Contents, Write Permissions are replaced on the West km installation folder (e.g., C:\Program Files\Westkm) with the following:

- Everyone
  Assigned rights: Read, Read and Execute, List Folder Contents

- Administrators
  Assigned rights: Full Control

- Web Anonymous Users
  Assigned rights: Deny All

- Web Applications Group
  Assigned rights: Deny All

Note: The West km IIS Lockdown utility replaces—not modifies or adds—any existing permissions on the above locations.

The following files are created:

- C:\Logs\WestkmIISLockDown.log: This log file contains information on what was done during the installation of the utility. It also indicates if the install or removal failed or succeeded.

- C:\Logs\Pre_Rights.txt: This file lists the rights of *Program Files\Westkm* before the installation of the Lockdown utility.

- C:\Logs\Post_Rights.txt: This file lists the rights of *Program Files\Westkm* after the installation of the Lockdown utility.

2.11 Configure DMS Services

If your organization is indexing documents that are managed by a DMS, make the following configuration changes as indicated for your DMS.

2.11.1 Configuration for DOCSFusion 5.0

If you are indexing documents stored in DOCSFusion 5.0, make the following configuration changes. Also refer to "2.11.3 DMS Properties in Configuration Files" on page 46.

2.11.1.1 Install the DOCSFusion API

Complete the following steps on the delivery server and the indexing server to install the DOCSFusion API and establish a connection to the DOCSFusion server.

1. Close all open applications.

2. Insert the DOCSFusion 5.0 CD-ROM into your CD-ROM drive.

3. Go to Start | Run, type the command cmd, and click OK.

4. In the command window, type the command D:, where *D:\\* is your CD-ROM drive, and press Enter.

5. Type the command cd dm api and press Enter.

6. Type the command Setup.exe /standalone and press Enter to start the installation.

7. When prompted, accept all the installation defaults.

8. In the command window, type exit and press Enter.

9. Go to Start | Programs | Hummingbird | Hummingbird DM Connection Wizard 5.0.

10. At the Wizard Welcome screen, click Next.

11. When prompted, enter the DOCSFusion server name and click Next.

Note: If necessary for your DOCSFusion configuration, first select Show Fail-Over and Load-Balancing Configuration.

12. At the Wizard Complete screen, click Finish.

2.11.1.2 Copy West km Forms to the DOCSFusion Server

Complete the following steps to copy West km forms to the DOCSFusion server.

1. Insert the West km CD-ROM 1 (Setup) into your CD-ROM drive and navigate to the Fusion Forms folder.

2. Copy the following files from the Fusion Forms folder on the CD-ROM to the DOCSFusion server where the DOCSFusion 5.0 software is installed. Place the files in the DOCSObjects folder (default location of C:\\Program Files\\Hummingbird\\DM Server\\DOCSObjects).

- km_versions.FRM
    - km_getquicksearches.FRM
    - km_default_profile.FRM
    - km_default_client_matter_profile.FRM (Copy this file only if your organization uses this custom form; otherwise use your organization's custom form. If you need assistance determining whether your organization needs a custom form, contact West km Technical Support.)

2.11.2 Configuration for iManage

If you are indexing documents stored in iManage, make the following configuration changes. Also refer to "2.11.3 DMS Properties in Configuration Files" on page 46.

If the iManage Server product was not installed on the delivery server, register the iManage .dll file on the delivery server so that it can communicate with your organization's DMS server. If the indexing server is on a separate machine from the delivery server, also register this file on the indexing server.

1. Copy the imanage.dll file from your iManage installation disk to the bin subfolder of the installation folder on the delivery server, e.g., C:\Program Files\Westkm\bin\.

2. At a command prompt, type regsvr32 *West km installation folder*\bin\imanage.dll and click OK. For example, type regsvr32 c:\program files\westkm\bin\imanage.dll.

3. Adjust the value for the iManage version property in the Web.config file according to your iManage API version. (See "6 Setting Properties in Configuration Files" on page 89 for instructions on setting properties in configuration files.)

<add key="IManageVersion" value="1.0" />

Property values are as follows, depending on your iManage setup:

| iManage Setup | Value for IManageVersion Property |
| --- | --- |
| Server 4.1, service pack 4 and higher (client is InfoRite 5.3) | 1.0.1.151 |
| Server 4.1, service pack 6 and higher (client is InfoRite 5.3) | 1.0 |
| Server 7.0 and higher (client is DeskSite 6.0) | 2.0 |

2.11.3 DMS Properties in Configuration Files

You may need to make changes to properties in West km configuration files to control communication between your DMS server and West km components.

For more information about setting properties in configuration files, see "6 Setting Properties in Configuration Files" on page 89.

Following is a list of DMS products and the properties whose values may need to be adjusted for that DMS. For property descriptions and allowable ranges, see "Appendix D: List of Properties in Configuration Files" on page 121.

iManage

Web.config and AtlasIndexingService.exe.config

PLClientMatterSeperator
IManageMaxRowsForSearch
IManageSessionTimeout
IManageVersion
IManageUseTrustedLogin
DmsUserIdsRequired
DmsUserPasswordsRequired IManageUseCombinedClientMatter
IManageAttrMappingTitle
IManageAttrMappingAbstract
IManageAttrMappingClass
IManageAttrMappingMatter
IManageAttrMappingMatterDescription
IManageAttrMappingClient
IManageAttrMappingClientDescription
IManageAttrMappingAuthor

DOCS Open/PCDocs

Web.config and AtlasIndexingService.exe.config

PLClientMatterSeperator
prefetchDocsProfiles
PCDocsSecurityLumpSize
PCDocsSecurityCacheGroups
PCDocsUseClientMatterMetaData
PCDocsUseCombinedClientMatter
PCDocsUseSubversions
PCDocsUseMatterCustomSql
PCDocsMatterCustomSql

DOCSFusion

Web.config and AtlasIndexingService.exe.config

PLClientMatterSeperator
FusionUseIndividualLogins
FusionGetQuickSearchFormName
FusionGetVersionInfoFormName
FusionUseSubversions
FusionUseDbFormsToRunQuickSearches
FusionNonDbRunQuickSearchFormName
FusionDefaultProfileSearchFormName
FusionUseClientMatterMetaData
FusionUseCombinedClientMatter
FusionClientMatterSearchFormName
FusionIgnoreMissingCustomMetaData
FusionClientIdFormFieldName
FusionMatterIdFormFieldName
FusionClientNameFormFieldName
FusionMatterNameFormFieldName

Chapter 3

Administering the KeySearch Hierarchy 3.1 Customizing the KeySearch Hierarchy 50

3.2 Assigning Documents to a KeySearch Topic 53

3.3 Removing Documents from a KeySearch Topic 54

3.4 Deleting Documents from West km 55

---

KeySearch is a tool from West that helps researchers easily and precisely retrieve documents relevant to a particular legal topic. Your West km members can use the KeySearch hierarchy of topics to retrieve relevant documents at your organization, as well as on Westlaw.

The KeySearch hierarchy in the westlaw.com interface retrieves documents at your organization and on Westlaw. The KeySearch hierarchy in the West km interface retrieves just documents at your organization.

If you choose, West's classification and routing engine (CaRE) can automatically assign your organization's documents to KeySearch topics when you index your documents in West km. If you are designated as an information manager, you can also

- customize the existing KeySearch hierarchy for your organization's specific needs.
- create and edit queries that use full-text searching to retrieve documents on KeySearch topics.
- manually assign a document collection to KeySearch topics (an option during indexing).

Note: If you want to assign a document collection to a customized KeySearch topic at the time of indexing, you must create the topic beforehand.

After your documents have been indexed in West km, as an information manager you can

- manually assign one or more documents to a KeySearch topic.
- manually remove one or more documents from a KeySearch topic.

- manually delete one or more documents from West km.

To designate a West km member as an information manager, select the Information Manager option for the member in the West km Professionals table. See "4.9 Administer West km Members" on page 76 for details.

3.1 Customizing the KeySearch Hierarchy

To access the KeySearch hierarchy of legal topics so you can customize it for your organization, 1. Open Internet Explorer on the delivery server or any other workstation with access to the delivery server and access http://*servername*/km/pldcfault.aspx, where *servername* is the name of your delivery server.

2. Click KeySearch Admin on the West km toolbar.

The KeySearch topics are listed alphabetically in the right frame. In this view, you can perform all KeySearch search functions, as well as customize the hierarchy.

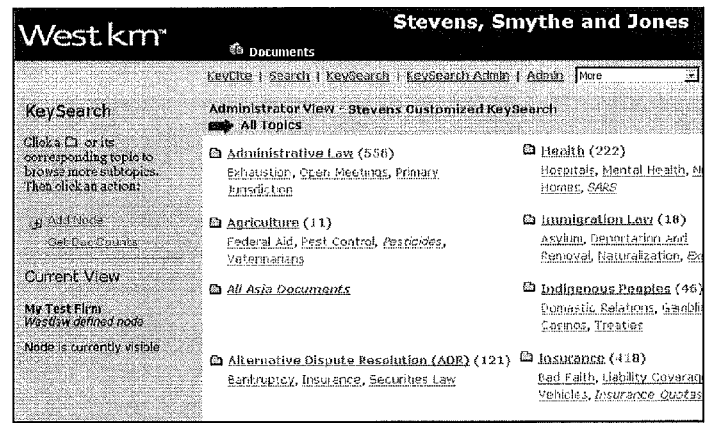

To browse the list of KeySearch topics and subtopics, click the Browse icons or hypertext links.

- Links in regular text (not italics) represent standard topics and subtopics. They can retrieve both Westlaw and your organization's documents.
- Links in italic text represent customized topics and subtopics that you have created. They retrieve only your organization's documents.
- Links in gray text represent standard or customized topics and subtopics that you have hidden from the view of West km members.

When you browse to a topic, a bread crumb trail at the top of the right frame shows your location in the KeySearch hierarchy. You can click a hypertext link in the bread crumb trail to move to that location in the hierarchy.

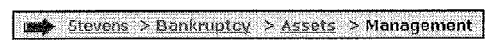

To display document counts after topics in the KeySearch hierarchy, click Get Doc Counts in the left frame. These numbers indicate the number of unique documents at your organization that have been assigned to that topic via manual classification or West's classification and routing engine (CaRE). To configure the display of these numbers, see "6.4 Configuring Document Counts in the KeySearch Hierarchy" on page 94.

To exit the administrative view of the KeySearch hierarchy and view the hierarchy as it is displayed to West km members, click KeySearch on the West km toolbar.

> Note: Customizations you make to the KeySearch hierarchy are not reflected in the KeySearch Scan feature until you update your organization's full-text indexes. See "4.7 Create and Update Full-Text Indexes" on page 74 for details.

3.1.1 Adding a KeySearch Topic

You can create a customized KeySearch topic by adding it to the KeySearch hierarchy:

1. In the administrative view of the KeySearch hierarchy, browse to the topic or subtopic above the point where you want to add the new topic. You can add a topic from any standard or customized topic within the hierarchy.

2. Click Add Node in the left frame.

3. Enter the following information for the new topic and click OK.

| | |
    |---|---|
    | Category name | The topic name that is displayed in the KeySearch hierarchy. |
    | Shortcut name | An optional name for the topic that is displayed as a hypertext link on the page one level above the new topic. |
    | Location | The location in the KeySearch hierarchy where the topic will be added. To select a different location, click Look-Up Location, browse to the location for the new topic, and click Use this Node. |
    | Query | An optional full-text query that is used to retrieve documents for the topic, in additional to automatic and manual classification methods. |

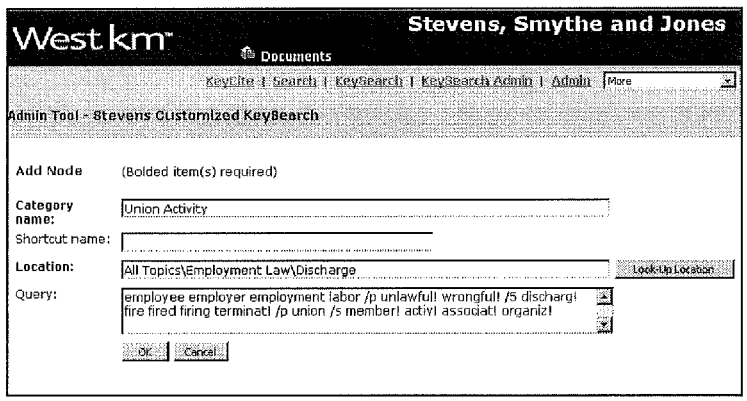

The hierarchy is displayed at the topic above the newly created topic. The new topic is represented by a hypertext link in italic text.

> Note: When you are indexing your documents and CaRE is configured to run, CaRE will not assign documents to customized KeySearch topics.

3.1.2 Editing a KeySearch Topic

You can edit a KeySearch topic you have created:

1. In the administrative view of the KeySearch hierarchy, browse to the topic or subtopic that you want to edit. You can edit any topic you have created, whether it is shown or hidden.

2. Click Edit Node in the left frame.

3. Edit the information for the topic and click OK.

The hierarchy is displayed at the topic above the edited topic.

3.1.3 Copying a KeySearch Topic

You can create a customized KeySearch topic by copying it from another topic:

1. In the administrative view of the KeySearch hierarchy, browse to the topic or subtopic that you want to copy. You can copy from any standard or customized topic within the hierarchy.

2. Click Copy Node.

3. Enter a category name and shortcut name (if desired) for the new topic.

4. The location is prepopulated from the topic you are copying. To select a new location, click Look-Up Location, browse to the location for the new topic, and click Use this Node.

5. The query is prepopulated from the topic you are copying. Edit the query if desired.

6. Click OK.

The hierarchy is displayed at the topic above the newly created topic. The new topic is represented by a hypertext link in italic text.

> Note: When you are indexing your documents and CaRE is configured to run, CaRE will not assign documents to customized KeySearch topics.

3.1.4 Hiding and Showing a KeySearch Topic

You can hide any KeySearch topic from the view of West km members at your organization.

1. In the administrative view of the KeySearch hierarchy, browse to the topic or subtopic that you want to hide. You can hide any standard or customized topic within the hierarchy.

2. Click Hide Node in the left frame.

The hierarchy is displayed at the topic above the hidden topic. The topic and its subtopics are represented by gray text.

> Note: Hiding a topic will not hide the same topic appearing elsewhere in the KeySearch hierarchy. For example, hiding *Searches and Seizures* under *Constitutional Law* will not automatically hide *Searches and Seizures* under *Criminal Justice*.

To show a topic that you have previously hidden, browse to the topic or subtopic that you want to show and click Show Node.

> Note: When you are indexing your documents and CaRE is configured to run, CaRE will assign documents to hidden KeySearch topics.

3.1.5 Deleting a KeySearch Topic

You can delete a KeySearch topic you have created:

1. In the administrative view of the KeySearch hierarchy, browse to the topic or subtopic that you want to delete. You can delete any topic you have created, whether it is shown or hidden.

2. Click Delete Node.

3. Click OK to confirm the deletion.

The hierarchy is displayed at the topic above the deleted topic.

3.2 Assigning Documents to a KeySearch Topic

After your organization's documents are indexed in West km (see "4 Indexing Your Organization's Documents" on page 57), you can manually assign a document or a set of documents to a KeySearch topic. Assigning a document to a KeySearch topic ensures that the document appears in the result list when a West km member accesses that topic.

To manually assign documents to a KeySearch topic,

1. In the West km pages, generate a result list of your organization's documents:

- To build a list of your organization's documents that cite a particular citation, click KeyCite on the West km toolbar, type the citation in the *New citation* next box under *KeyCite for Firm Documents*, and click GO.

- To search for your organization's documents, click Search on the West km toolbar, type one or more search terms in the text boxes under *Search for Firm Documents*, and click GO. (If you type multiple search terms, all terms must be found.)

- To access your organization's documents already assigned to a KeySearch topic, click KeySearch on the West km toolbar and search a topic.

2. In the result list in the right frame, select the check box preceding each document you want to assign to a KeySearch topic. To select all documents in the result list, click the Select All check box  in the result list heading.

3. Click Classify Selected Documents.

4. Navigate to the topic to which you want the documents assigned and click OK.

If a document collection containing a manually assigned document is re-indexed, the document stays assigned to the topics you've specified.

You can also assign a document to a KeySearch topic by clicking Classify this Document from a document's detail page. In addition, the *KeySearch Topics* section of this page lists all the topics to which the document is assigned. If a hand icon appears next to a topic, the document is manually assigned to that topic. If no hand icon appears, the document was automatically assigned via CaRE.

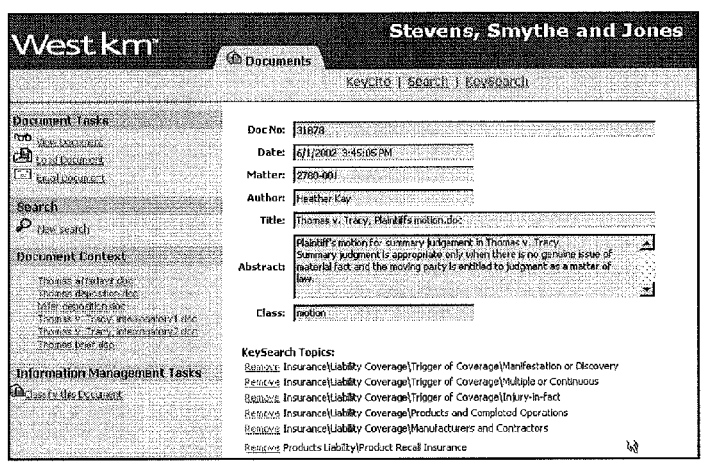

3.3 Removing Documents from a KeySearch Topic

After your organization's documents are indexed in West km (see "4 Indexing Your Organization's Documents" on page 57), you can manually remove a document or a set of documents from a KeySearch topic. Removing a document from a KeySearch topic ensures that the document will not appear in the result list when a West km member accesses that topic.

To manually remove documents from a KeySearch topic,

1. In the West km pages, click either KeySearch or KeySearch Admin on the West km toolbar and browse to the topic from which you want to remove documents.

2. Click the Search all of ... link at the top of the page or select a topic link prefaced by a Search icon .

3. Click Search to run the KeySearch query.

4. In the result list in the right frame, select the check box preceding each document you want to remove from the active KeySearch topic. To select all documents in the result list, Select All check box ☐ in the result list heading.

5. Click Remove Selected Documents from Topic.

6. Click OK.

If a document collection containing a manually removed document is re-indexed and CaRE is enabled, the document will be reclassified.

> Note: You can also remove a document from a KeySearch topic by clicking Remove next to a listed KeySearch topic on a document's detail page.

3.4 Deleting Documents from West km

After your organization's documents are indexed in West km (see "4 Indexing Your Organization's Documents" on page 57), you can permanently delete one or more documents from West km.

> Note: With this method, deleted documents cannot be re-added to West km unless you designate a new database and define and index a document collection containing that document (see "4.4 Designate Databases Containing Document Collections" on page 61 and see "4.5 Define and Index Document Collections" on page 65). It is preferable that you remove documents from West km by either deleting the documents from your organization's file system or by modifying your defined document collections to exclude the documents.

To delete documents from West km,

1. In the West km pages, generate a result list of your organization's documents:

- To build a list of your organization's documents that cite a particular citation, click KeyCite on the West km toolbar, type the citation in the *New citation* next box under *KeyCite for Firm Documents*, and click GO.

- To search for your organization's documents, click Search on the West km toolbar, type one or more search terms in the text boxes under *Search for Firm Documents*, and click GO. (If you type multiple search terms, all terms must be found.)

- To access your organization's documents already assigned to a KeySearch topic, click KeySearch on the West km toolbar and search a topic.

2. In the result list in the right frame, select the check box preceding each document you want to delete from West km. To select all documents in the result list, click Select All check box ☐ in the result list heading.

3. Click Delete Selected Documents from West km.

4. At the confirmation message, click OK.

Chapter 4

Indexing Your Organization's Documents 4.1 What You Need  59

4.2 Access the Administrative Tool in West km  59

4.3 Designate Administrator Accounts  60

4.4 Designate Databases Containing Document Collections  61

4.5 Define and Index Document Collections  65

4.6 Synchronize Document Collections  73

4.7 Create and Update Full-Text Indexes  74

4.8 Set a Document Security Level  75

4.9 Administer West km Members  76

---

When you initially index your organization's documents, West km imports the document collections you designate from your organization's DMS or NT file system (NTFS). As shown in the West km RID and CaRE Indexing Process diagram, West km then converts the documents to an HTML format, identifies citations, assigns documents to KeySearch legal topics using West's classification and routing engine (CaRE), and stores the converted documents. In a separate indexing process, West km creates the appropriate full-text search indexes. (Throughout these processes, the original document in the DMS is unchanged.)

West km RID and CaRE Indexing Process

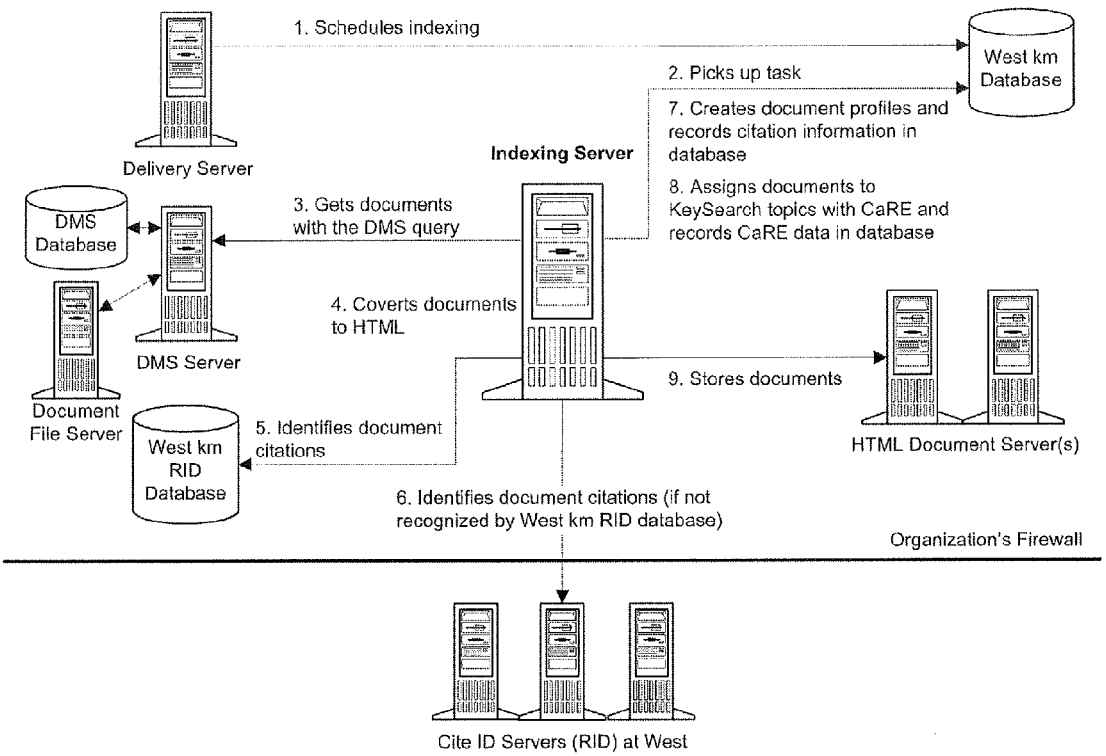

Subsequent update processes keep the documentation information current in West km:

- The indexing update process—either automatically or manually run—indexes any updated or new documents in the collection since indexing was last run. The indexing update process converts updated or new documents to HTML, indexes their citations, and assigns them to KeySearch topics. In addition, the indexing update process applies KeySearch classification and display name changes that have been made to a document collection since the last indexing.
- The synchronization process removes documents from West km, according to changes in your organization's document collections. Synchronization also schedules any new documents in the collection for indexing.
- The full-text update process creates and updates the indexes that are used to search your organization's documents by terms.

Supported platforms and formats for the documents you want to index include the following:

- Microsoft Word, versions through 2002
- Corel WordPerfect, versions through 10
- Lotus Word Pro, versions 96 through Millennium Edition 9.6

For information regarding support for other formats, call your West km representative at 1-888-877-6529 (option 8).

4.1 What You Need

Prior to indexing your organization's documents as explained in this chapter, you need the following:

- Document collections identifiable for indexing in NTFS folders or in saved searches in DMS databases.
- Your full-text searching (FTS) administrator account name and password (if you have not disabled full-text searching software).
- A Windows domain administrator account with access to all NTFS and DOCS Open/PCDocs documents you are indexing and to all West km server components.
- A user ID and password for an account that has the necessary read-only rights to access your organization's DMS and the documents you are going to index.
- If your organization uses Novell network software and DOCS Open/PCDocs, the user name and password for the Novell server login and the name of the Novell tree or the IP address of the Novell server.
- If your organization uses ProLaw Version 9 and Sybase database server, the network protocol for connecting to the database server.
- On your HTML document server(s), a folder to store HTML document renderings and the creation of a share for that folder; if you will use multiple HTML document storage locations, you need to create a folder and share for each.
- If you want to assign a document collection to a customized KeySearch topic, creation of the topic.
- Consideration of when and how often to update West km indexes after the initial indexing of documents.
- Information on your organization's West km members, including names, network IDs, and Westlaw passwords.

4.2 Access the Administrative Tool in West km

Using the administrative tool in West km, you can do the following:

- Designate databases or libraries that contain the document collections that you want to be indexed
- Define and then index those document collections
- Monitor the indexing processing of documents
- Synchronize West km with the documents in your document collections
- Designate the update frequency of the full-text index of your document collections

- Select a document security level to control access by your active West km members to your organization's documents
- Administer your West km members
- View usage tracking data (see "5.3 Tracking Usage" on page 86)

To access the administrative tool,

1. Make sure the West km Indexing Service is running (see "2.8 Start West km Services" on page 29 for details).

2. Open Internet Explorer on the delivery server or any other workstation with access to the delivery server and access http://*servername*/km/plhome.aspx, where *servername* is the name of your delivery server.

4.3 Designate Administrator Accounts

Before indexing your documents in West km, you must enter your full-text searching (FTS) administrator account and Windows domain administrator account.

A Windows domain administrator account is required. This account must have access to all NTFS and DOCS Open/PCDocs documents you are indexing and to all West km server components. In the West km NT Security Diagram on page 35, this account is represented by the West km Admin on the resource domain. If you are not using an NT networking environment, the Windows domain administrator account needs to be created locally with the same password on all West km server components.

To designate administrator accounts in West km,

1. In the administrative tool, click System Options in the left frame.

2. In the *NextPage Admin User ID* and *Password* text boxes, enter the name and password of your FTS administrator account. By default, the name is *administrator*. You will receive the password from West km Technical Support (available at 1-888-877-6529, option 8).

```
Next Page Admin UserID: administrator      Password: ********
```

3. Under *Remote Access*, type the user name (e.g., cat\kmadmin) and password for a Windows domain administrator account with access to all NTFS and DOCS Open/PCDocs documents you are indexing and to all West km server components. See "2.10 Set Security" on page 30 for more information.

```
Remote Access:
User Name: cat\kmadmin      Password: ********
```

4. Click Save.

4.4 Designate Databases Containing Document Collections

To index documents in West km, you must first designate the databases or DMS libraries that contain the document collections you want to index. Depending on your document storage method (i.e., a DMS or the NT file system), designate your databases as instructed in the following subsections.

4.4.1 Designating Databases with iManage, DOCS Open/PCDocs, DOCSFusion, and Lotus Notes 1. In the administrative tool, click Database Management in the left frame.

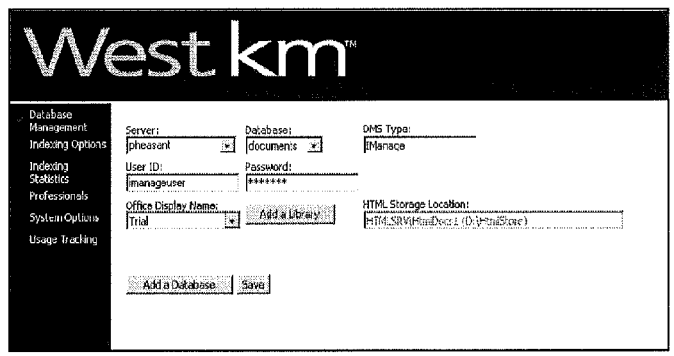

2. Click Add a Database.
3. In the Add a Database dialog box, type or select the following for the database that contains the document collections you want to be indexed:

a. Type the name of the server containing the DMS documents in the *Server* text box.

b. Type the name of the database containing the document collections in the *Database* text box.

c. Select the DMS used to manage the documents from the *DMS Type* drop-down list.

d. Type the user ID and password for the DMS server login in the *User ID* and *Password* text boxes.

DOCSFusion: The user ID is the name of the DOCSFusion administrator account whose primary group is docs_supervisors, and the password is the network password of the domain account tied to the DOCSFusion administrator account. The DOCSFusion administrator account must have the correct security settings to run all the DOCSFusion quick searches to be used with West km.

DOCS Open/PCDocs: The user ID and password are for a SQL Server account that has the necessary read-only rights to access the DOCS Open/PCDocs database.

e. If your organization uses Novell network software and DOCS Open/PCDocs, in the bottom section of the dialog box type the user name and password for the Novell server login in the *User Name* and *Password* text boxes. Type the name of the Novell tree or the IP address of the Novell server in the *Tree or Server IP* text box.

f. Select a location to store the HTML documents for this database from the *HTML Storage Location* drop-down list.

To designate a new location, click Add Storage Location, type the full path name (e.g., D:\HtmlStore) for the storage location you created on the HTML document server, type the server name (e.g., HTMLSRV), type the share name you created for the storage location (e.g., HtmlDocs1), and click OK.

g. If desired, select a display name for this database from the *Office Display Name* drop-down list. This name, such as a location or a practice category, will be used to identify the database to your West km members.

To designate a new display name, click Add Office Display Name, type the name you want (e.g., LA Office, Corporate), and click OK.

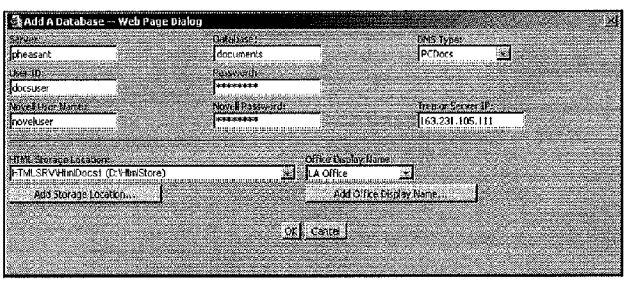

4. Click OK in the Add a Database dialog box.

5. At the *Update successful* notification message, click OK.

6. Repeat steps 2–5 for each database that contains document collections you want to index.

4.4.2 Designating Databases with ProLaw Version 9

1. In the administrative tool, click Database Management in the left frame.

2. Click Add a Database.

3. In the Add a Database dialog box, type or select the following for the database that contains the document collections you want to be indexed:

a. Type the name of the server containing the documents in the *Server* text box.

b. Type the name of the database containing the document collections in the *Database* text box.

c. Select ProLaw Version 9 from the *DMS Type* drop-down list.

d. Type the user ID and password for the ProLaw server login in the *User ID* and *Password* text boxes.

e. If your organization uses a Sybase database server for ProLaw Version 9, select the Sybase check box and type the network protocol for connecting to the database server in the *Protocol* text box; for example, tcpip{host=###.###.###.##}, where ###.###.###.## is the IP address.

f. Select a location to store the HTML documents for this database from the *HTML Storage Location* drop-down list.

To designate a new location, click Add Storage Location, type the full path name (e.g., D:\HtmlStore) for the storage location you created on the HTML document server, type the server name (e.g., HTMLSRV), type the share name you created for the storage location (e.g., HtmlDocs1), and click OK.

g. If desired, select a display name for this database from the *Office Display Name* drop-down list. This name, such as a location or a practice category, will be used to identify the database to your West km members.

To designate a new display name, click Add Office Display Name, type the name you want (e.g., LA Office, Corporate), and click OK.

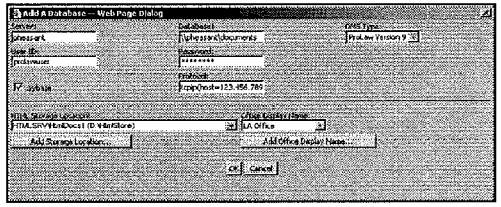

4. Click OK in the Add a Database dialog box.

5. At the *Update successful* notification message, click OK.

6. Repeat steps 2–5 for each database that contains document collections you want to index.

4.4.3 Designating Databases with the NT File System

1. In the administrative tool, click Database Management in the left frame.

2. Click Add a Database.

3. In the Add a Database dialog box, type or select the following for the folder that contains the document collections you want to be indexed:

a. Type the name of the server containing the documents in the *Server* text box.

b. Type the location on the server where the documents are stored in the *Database/Share* text box (e.g., if the documents are located at \\*pheasant*\*documents*, then type documents).

c. Select NTFS from the *DMS Type* drop-down list.

d. Select a location to store the HTML documents for this folder from the *HTML Storage Location* drop-down list.

To designate a new location, click Add Storage Location, type the full path name (e.g., D:\HtmlStore) for the storage location you created on the HTML document server, type the server name (e.g., HTMLSRV), type the share name you created for the storage location (e.g., HtmlDocs1), and click OK.

e. If desired, select a display name for this database from the *Office Display Name* drop-down list. This name, such as a location or a practice category, will be used to identify the database to your West km members.

To designate a new display name, click Add Office Display Name, type the name you want (e.g., LA Office, Corporate), and click OK.

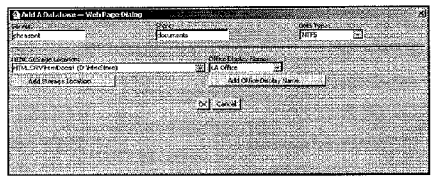

4. Click OK in the Add a Database dialog box.

5. At the *Update successful* notification message, click OK.

6. Repeat steps 2–5 for each database that contains document collections you want to index.

4.4.4 Editing Databases

To edit a designated database, select the server and database you want to edit at the Database Management page. Then edit or select new values and click Save. If you cannot click in a text box or select a value, that field cannot be edited.

Note: If you change the display name of a database with defined document collections and those collections do not have custom display names, the display name change is applied to those document collections during the next indexing of the collection.

4.5 Define and Index Document Collections

Once you have designated the databases or libraries that contain your document collections, you can define and index those collections from the Indexing Options page.

To access the Indexing Options page, click Indexing Options in the left frame of the administrative tool. In the top portion of the Indexing Options page, a list of servers, databases (or libraries), and document collections available for indexing are displayed. For example, available document collections could be sets of NTFS folders or DMS queries you have already created and saved.

In the bottom portion of the page, currently indexed document collections are displayed.

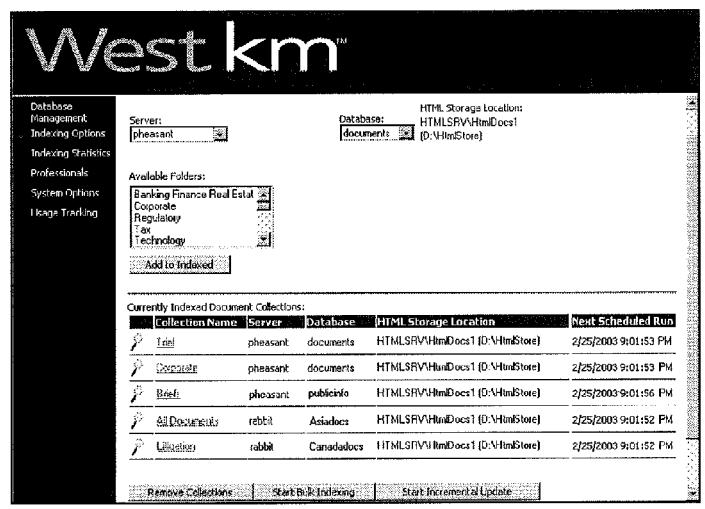

4.5.1 Define Document Collections

Complete the following steps to define new document collections:

1. If you added a database on the Database Management page before accessing the Indexing Options page, click F5 to refresh the display.

2. If you added a database for ProLaw Version 9 on the Database Management page, follow the instructions under "4.5.2 Add Document Collections with ProLaw Version 9" on page 68 for each collection you want to add. Then proceed with step 5 below.

3. Select the server containing the DMS documents you want to index from the *Server* drop-down list.

4. Select the database containing the document collection from the *Database* drop-down list.

5. If the documents are managed using a DMS, select the document collection you want to index from the *Available* list.

6. If the documents are stored using the NT file system, click the Browse button next to the *Available Folders* text box. In the *File name* text box, enter the server and share (\\\\*server*\\*share*\\) and navigate to the folder whose documents you want to index as a collection. Select a document in the folder and click Open.

7. Click Add to Indexed.

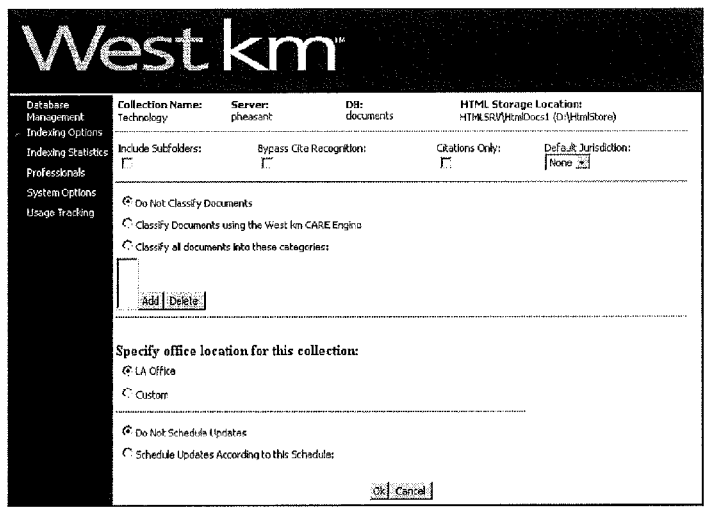

8. Select how you want the documents in the collection to be indexed (select as many that apply):

- If you want all subfolders at the location to be indexed as part of this collection, select the Include subfolders check box (this option is available for NTFS documents only).
- If you want to index only the text of documents (and not index citation information or classify documents using CaRE), select Bypass Cite Recognition.
- If you want to index only documents that contain one or more citations, select the Citations Only check box.
- If you want a default jurisdiction to be used for citations in this document collection that are missing jurisdictional information, select a state from the *Default Jurisdiction* drop-down list.

9. Select an option for assigning documents in this collection to KeySearch legal topics. (If you disabled CaRE during the installation process, then classification options are not available.)

- Do Not Classify Documents: Select this option if you don't want documents automatically assigned to KeySearch topics.

66  Chapter 4: Indexing Your Organization's Documents

- Classify Documents using the West km CaRE Engine: Select this option if you want CaRE to automatically assign documents with at least one case law citation to KeySearch topics. (If you selected to bypass cite recognition, this option is not available.)
- Classify all documents into these categories: Select this option to assign all documents to the listed KeySearch topics. To add a topic to the list, click Add, navigate to the topic, and click Save. To remove a topic from the list, select it and click Delete.

Note: To assign documents to a KeySearch topic that you have created, you must first create the topic. See "3.1.1 Adding a KeySearch Topic" on page 51 for details.

```
○ Do Not Classify Documents
○ Classify Documents using the West km CARE Engine
⊙ Classify all documents into these categories:
  Science, Computers, and Technology
                                    Add   Delete
```

10. If you want this document collection to have a display name different than the display name for the database containing the collection, select Custom. Then either select a new name, such as a location or a practice category, from the drop-down list. To create a new display name, click Add a Library.

```
Specify office location for this collection:
○ LA Office
⊙ Custom
  Technology--CA ▼     Add a Library
```

11. If you want the index for this document collection to be automatically updated, select Schedule Updates According to This Schedule. The default update schedule is every day at 12:00:00 a.m. (midnight), starting on the day after the current day. To change the update schedule do the following:

a. Type and select the frequency at which you'd like the indexing updates to occur. For example, type 2 and select Weeks to update the index every other week.

b. If you selected *Weeks* or *Months* in the previous step, select the day of the week on which you want indexing to occur.

```
○ Do Not Schedule Updates
⊙ Schedule Updates According to this Schedule:
Build Every:        on:            Next Scheduled Run:
 2       Weeks ▼   Sundays  ▼    4/25/2003 12:00:00 AM
``` c. Click the Next Scheduled Run calendar icon  to set the date and time on which you want indexing updates to start. Navigate to the month and year, click the date, select the time, and click OK.

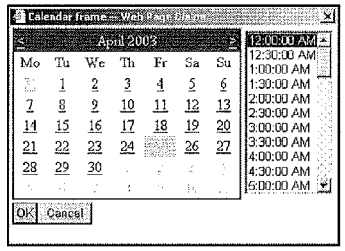

Updates will start according to the frequency you select, starting from the date and time of the next scheduled run. For example, if today's date is Friday, April 25, the following settings would result in these update dates:

| Setting for Frequency | Setting for Next Scheduled Run | Date Update Will Run |
| --- | --- | --- |
| 2 weeks on Sundays | Friday, April 18 (previous date) | Sunday, May 4 |
| 2 weeks on Sundays | Friday, April 25 (today's date) | Sunday, May 11 |
| 2 weeks on Sundays | Friday, May 2 (future date) | Sunday, May 18 |

After an update starts, the Next Schedule Run setting will automatically change to reflect the next date and time the update is scheduled to run.

Note: For the fastest processing speed, it is recommended that you (1) set start times after regular business hours, and (2) stagger start times when indexing multiple documents collections.

12. Click OK.

The document collection(s) is added to the *Currently Indexed Document Collections* list on the Indexing Options page.

To edit a document collection's definitions, on the Indexing Options page click the Edit icon  to the left of the collection in the *Currently Indexed Document Collections* list, make your changes, and click OK. Changes will be applied during the next indexing of the collection.

4.5.2 Add Document Collections with ProLaw Version 9

If you are indexing documents stored in ProLaw Version 9, complete the following steps to add a new document collection:

1. On the Indexing Options page, select the server containing the ProLaw Version 9 documents you want to index from the *Server* drop-down list.

2. Select the database containing the documents from the *Database* drop-down list.

3. Click Add Collection.

4. In the Document Collection dialog box, type a collection name and fill in any ProLaw Version 9 criteria you want used to select documents for inclusion in this collection. If you don't indicate any criteria, all documents in the selected database will be included.

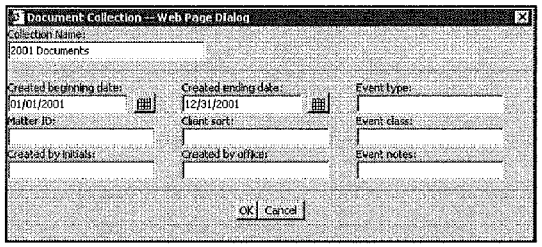

5. Click OK.

The collection is added to the *Available Collections* list on the Indexing Options page and is available for indexing.

To edit a collection you've already defined, select the collection in the *Available Collections* list and click Edit Collection.

4.5.3 Index Document Collections

Once you define a document collection, you need to index its documents. Complete these steps to index newly defined document collections, fully re-index previously indexed collections, or manually launch updates to indexed collections:

1. On the Indexing Options page, click the document collections in the *Currently Indexed Document Collections* list for each collection that you want to index. Selected collections are highlighted.

2. To start indexing, do one of the following:

- To index a newly defined collection or fully re-index a previously indexed collection, click Start Bulk Indexing. Indexing processes start immediately.

- To update the index for a previously indexed collection, click Start Incremental Update. Update processes start immediately.

Note: Full indexing includes the creation of full-text search indexes for the document collection, whereas indexing updates do not. See "4.7 Create and Update Full-Text Indexes" on page 74 for information on updating the full-text indexes at your organization.

3. You receive notification that the indexing process has started. Click OK.

The time required for indexing varies, depending on the processing power of the indexing server, the speed of your Internet connection, the number and length of documents, the number of citations within documents, the number of documents with one or more case law citations, the configuration of West km, and other activities on the server.

As soon as a document is indexed, it becomes available to your active West km members.

4.5.4 Removing Document Collections

If you no longer want a document collection to be indexed, you can remove the collection from the *Currently Indexed Document Collections* list:

1. On the Indexing Options page, click the document collections in the *Currently Indexed Document Collections* list for each collection that you want to remove. Selected collections are highlighted.

2. Click Remove Collections.

3. At the *Removing a collection* notification message, click OK.

4. At the *Update successful* notification message, click OK.

If you remove a document collection from the *Currently Indexed Document Collections* list that has been already indexed, it will prevent the collection from being re-indexed. The documents as they were last indexed, however, will still be available to members until the document collection is synchronized (see "4.6 Synchronize Document Collections" on page 73 for details). In addition, the documents will still be represented in full-text indexes until full-text indexes are updated (see "4.7 Create and Update Full-Text Indexes" on page 74).

4.5.5 Monitoring Indexing of Document Collections

You can view the indexing progress of a document collection. Statistics are shown for both bulk indexing and indexing update processes, whether automatically or manually initiated.

1. In the administrative tool, click Indexing Statistics in the left frame.

2. Select the document collection for which you want to view indexing statistics from the *Choose a Document Collection* drop-down list and click Next. To view statistics on all documents scheduled for indexing, select All Firm Documents.

Note: You can also view indexing statistics for a document collection by clicking the collection's name in the *Currently Indexed Document Collections* list on the Indexing Options page.

3. The indexing statistics for documents in the selected document collection are displayed. If you want to update the statistics while the indexing process is running, click Refresh.

Last Bulk Load

The *Last Bulk Load* table shows the indexing statistics for just the documents being indexed (or last indexed) in the collection. For bulk indexing, the figures total the number of documents in the collection (excluding the figure for any deleted documents). For indexing updates, the figures total just the new or modified documents that are being indexed within the collection (excluding the figure for any deleted documents).

All Bulk Loads

The *All Bulk Loads* table shows the current indexing statistics for all the documents in the collection. Whether the current processes are for bulk indexing or indexing updates, the figures always total the number of documents in the collection (excluding the figure for any deleted documents).

By default, the tables display figures for the following categories:

| This category: | Shows how many documents in the collection: |
| --- | --- |
| Scheduled | Are currently remaining to be indexed |
| Indexed | Have been successfully indexed |
| Errored | Have not been indexed because of processing errors |
| Identified as corrupt | Have not been indexed because they are corrupt |
| Physical file missing | Have not been indexed because the document file could not be found |
| Excluded based on file type | Have not been indexed because the document file is an unsupported file type |
| Deleted from syncing | Have not been indexed because the document (which was previously indexed) was deleted and then removed from the collection during the West km synchronization process |

To view a more detailed breakdown for the Scheduled, Indexed, and Errored categories, change the following property in the Web.config file to Y. (The default value is N.)

```
<add key="ShowIndividualStatusCode" value="Y" />
```

(See "6 Setting Properties in Configuration Files" on page 89 for instructions on setting properties in configuration files.)

With this property set to Y, the following additional categories are displayed in the tables. The total of figures for a group's individual categories equals the group figure.

| Group category: | This individual category: | Shows how many documents in the collection: |
| --- | --- | --- |
| Scheduled | Scheduled | Are currently remaining to be indexed. |
| | Scheduled (Delegated) | Are currently in process. |
| Indexed | Indexed (Completed successfully) | Have been successfully indexed. |
| | Indexed (RID partial error) | Have been indexed, but with an error in identifying citations with RID; at least one citation in the document was identified. |
| Errored | Errored (HTML conversion) | Have not been indexed because of a failure to convert the document to HTML. |
| | Errored (RID failure) | Have not been indexed because of a failure in RID to identify citations; no citations in the document were identified. |
| | Errored (General failure) | Have not been indexed because of a general processing failure. |
| | Errored (RID timed out) | Have not been processed because RID failed to communicate for 120 seconds. |

West km will attempt to re-index documents in the Errored (RID failure) and Errored (General failure) categories after six hours (360 minutes), as indicated by the value of the following property in AtlasIndexingService.exe.config:

```
<add key= "indexer_ErrorReprocessThresholdMinutes" value="360" />
```

> Note: If the indexing service is stopped, any delegated documents will not be re-indexed immediately after restarting the service. West km will attempt to re-index these documents after six hours (360 minutes), as indicated by the value of the indexer_DelegatedReprocessThresholdMinutes property in AtlasIndexingService.exe.config.

For documents in these categories, re-indexing will continue to be attempted at this rate in relation to the last failed attempt until the documents are indexed or until another indexing process is run and attempts to index the documents. At that point, the result of the most recent indexing process affecting the documents determines re-indexing attempts going forward.

Regardless of the result of a previous indexing process, the following occurs:

- During bulk indexing, all documents will be re-indexed.
- During an indexing update, only documents that are new or have been modified and that have a date and time after indexing last occurred will be re-indexed. (New or modified documents with a date and time before indexing last occurred will only be indexed if they were identified by the synchronization process.)

If you want to see more detailed information about West km indexing activity, for example if several documents had errors, see "5.2 Using Trace Logs" on page 82.

For information on monitoring the status of full-text indexing, see "4.7 Create and Update Full-Text Indexes" on page 74.

4.5.6 Stopping Indexing

If you want to stop the indexing process while it is running, do so by stopping the the West km services and the Word Wide Web Publishing Service. For each service listed, complete these steps on the service's associated server to stop the service:

1. Go to Start | Programs | Administrative Tools | Services.

2. In the Services window, right-click the name of the service (e.g., West km Indexing Service) and click Stop.

| West km Service | Associated Server |
| --- | --- |
| West km Indexing Service | Indexing server |
| West km Indexing Helper Service | Indexing server |
| West km CaRE Service | Indexing server |
| West km CaRE CNC Service | Indexing server |
| World Wide Web Publishing Service | Delivery server |

To restart services after they have been stopped, restart the World Wide Web Publishing Service and then start the West km services as instructed in "2.8 Start West km Services" on page 29.

4.6 Synchronize Document Collections

The synchronization feature in West km analyzes your currently indexed document collections and then

- removes indexed documents that have been deleted from your organization's file system
- removes indexed documents that are in collections you have removed from the *Currently Indexed Document Collections* list
- identifies new documents in the collections and schedules them for indexing To synchronize your document collections, complete the following steps:

1. In the administrative tool, click System Options in the left frame.

2. Under *KM->DMS Document Synchronization*, select the frequency at which you want your document collections to be synchronized by selecting a setting from the *Frequency* drop-down list.

3. Click the Next Scheduled Run calendar icon  to set the date and time on which you want synchronization processes to start. Navigate to a month and year, click a date, select a time, and click OK.

Synchronization processes will start according to the frequency you select, starting from the date and time of the next scheduled run.

Note: For the fastest processing speed, it is recommended that you set the start time after regular business hours.

4. Click Save.

5. If you want synchronization to start immediately (regardless of the frequency and next scheduled run settings), click Run Now.

For deleted or removed documents, entries in the West km database and HTML renderings are deleted. The documents will still be represented in full-text indexes, however, until full-text indexes are updated (see "4.7 Create and Update Full-Text Indexes" below).

4.7 Create and Update Full-Text Indexes

You can create and update full-text indexes of your West km documents. Full-text indexes are used to retrieve your organization's documents when a West km member at your organization performs a term search on your organization's documents.

A full-text index is created for each defined database (see "4.4 Designate Databases Containing Document Collections" on page 61) and is based on the HTML document renderings of indexed documents. The update process examines new, deleted, and modified documents since full-text indexing was last run and updates the indexes.

To create or update the full-text indexes at your organization,

1. In the administrative tool, click System Options in the left frame.

2. Under *Full Text Index Rebuild*, select the frequency at which you want your full-text indexes to be updated by selecting a setting from the *Frequency* drop-down list.

3. Click the Next Scheduled Run calendar icon  to set the date and time on which you want full-text indexing updates to start. Navigate to a month and year, click a date, select a time, and click OK.

Full-text indexing updates will start according to the frequency you select, starting from the date and time of the next scheduled run.

Note: For the fastest processing speed, it is recommended that you set the start time after regular business hours.

4. Click Save.

5. If you want full-text indexing to start immediately (regardless of the frequency and next scheduled run settings), click Run Now.

The full-text indexing process automatically creates the NextPage NXT 3 content service that defines the HTML documents that will be indexed for full-text searching; for more information about the manual steps behind this process, see "Appendix B: More about the West km Automated Setup."

> Note: If you disabled full-text searching software during the installation process, then settings to update the full-text index are not available.

To monitor the status of full-text indexing of documents, go to Start | Programs | West km | FTS Content Network Manager. When prompted, enter the name and password of your FTS administrator account. (By default, the name of the FTS administrator account is *Administrator*. The password you will receive from West km Technical Support, available at 1-888-877-6529, option 8.) Then click the View menu, click Statistics, and re-enter the name and password of your FTS administrator account if prompted.

4.8 Set a Document Security Level

By selecting a document security level, you control the access that your active West km members have to your indexed documents. The security levels are based upon the security implemented in your organization's DMS.

To select a document security level,

1. In the administrative tool, click System Options in the left frame.

2. Under *Document Security Level*, select the security level you want:

- None: All matching organization documents are listed in West km results, and all active West km members can view and load them. This is the lowest security setting and is selected by default.
    - Always Display Titles: All matching organization documents are listed in West km results, but members can only view and upload a document if they have the necessary DMS access rights.

- Full: Only documents to which the members have necessary DMS access rights are listed in West km results. This is the highest security setting.

Important: The performance you experience in West km is inversely proportional to the security level you select. The lowest security level will produce the best performance; the highest security level will negatively affect performance.

3. Click Save.

You can also select a security model for West km. See "2.10 Set Security" on page 30 for details.

4.9 Administer West km Members

You can administer your West km members—for example, activate or deactivate a member, add information for a member, or add a member.

In the administrative tool, click Professionals in the left frame. The Professionals page is displayed.

The Professionals table on the bottom portion of page lists members of your organization and includes the following categories of information:

| | |
|---|---|
| Name fields | The member's full name. |
| Network ID | The member's ID to log on to the organization's network, including the domain name. |
| Westlaw ID | The member's password to sign on to Westlaw, including numbers and letters. |

| | |
|---|---|
| Active User | When selected, the member is able to access your organization's documents from westlaw.com. You can have as many active members as provided in your license agreement. |
| Westkm Admin | When selected, the member has rights to the West km administrative tool. |
| Information Manager | When selected, the member has rights to administer your organization's KeySearch hierarchy. |

To change the sort order of the table, click the column heading by which you want to sort.

The initial list of members is compiled in the Professionals table during the indexing process. This list includes the Name field only and is based on the authors of documents in your document collections. From this list, you will need to edit member information, such as activate and add required information for a member, as well as add members.

> Note: Because the initial list of members is compiled from document authors, individual who are no longer with your organization may be included in the Professionals table. Although members cannot currently be deleted from the Professionals table, you can always edit member information to reflect an active employee.

The number of active West km members you are allowed is determined by your license agreement. Please call your West km representative at 1-888-877-6529 (option 8) if you need to purchase additional licenses.

4.9.1 Finding a Member

You can use the *Search Criteria* section on the Professionals page to easily find the listing for a particular member of your organization.

1. In the *Search Criteria* section, select whether you want to search for an inactive member, an active member, or both.

2. Type either the full name or last name of the member in the appropriate text box. Results will contain the specified text anywhere in that portion of the name.

3. Click Search.

The members matching your search criteria are listed in the Professionals table. (To display all members in the Professionals table, select Both in the Search Criteria section, clear any values in the text boxes, and click Search.)

4.9.2 Adding a Member

If a member isn't listed in the Professionals table, you can add the member.

Note: To avoid duplicate entries, always check the Professionals table for the member before adding a new entry.

1. Type the member's information in the first blank row of the text boxes in the table. A red asterisk indicates required information. In addition, active members require a Westlaw ID.

2. Repeat step 1 for as many as four additional new members.

3. Click Add Professionals.

If you want to add an extensive list of members to the Professionals table, call West km Technical Support at 1-888-877-6529 (option 8) for information on importing members.

4.9.3 Editing a Member

You can edit an existing member's listing, for example, to activate or deactivate a member or add information for a member.

1. Click Edit next to the member's listing in the Professionals table.

2. Make the necessary changes to the member's row and fill in all required information, which is marked with a red asterisk. In addition, active members require a Westlaw ID.

3. Click Update.

4.9.4 Adjusting the Professionals Table Configuration for iManage

West km typically uses NT login information along with other information in the Professionals table to verify the identity of West km members. If your organization uses iManage as its DMS and uses virtual logins rather than NT integrated logins, you can add a column in the table for a DMS user ID. If you want, you can also add a column for a DMS password.

To add these columns, adjust the following properties and values in the Web.config file as appropriate. (See "6 Setting Properties in Configuration Files" on page 89 for instructions on setting properties in configuration files.)

- If your organization does not use NT integrated logins with iManage, change the value for the following property to Y. This will add a DMS UserID column to the Professionals table, as well a Server\DB column for the server and database to which the member has access.

```
  <add key="DmsUserIdsRequired" value="Y"/>
  ```

- To also add a DMS Password column to the Professionals table, change the value for the following property to Y. (If not present already, this will also add a Server\DB column for the server and database to which the member has access.)

```
  <add key="DmsUserPasswordsRequired" value="Y"/>
  ```

By default, both values are set to N. When the value of the DmsUserIdsRequired property is set to Y, the Professionals page appears as follows.

Note: More than one database may be accessible to one member; in this situation, a drop-down list is displayed in the Server\DB column. When adding or editing a member's information, you will need to select the databases from the *Server\DB* drop-down list to which you want the member to have access and specify the member's DMS login information. The login information will apply to all selected databases.

4.9.5 Using the Professionals Table with West km Custom Authentication

If your organization uses West km custom authentication as its security model, the Professionals table will also include columns for Custom User Name and Custom User Password.

When administering your West km members, you will need to add West km usernames and passwords for each of your active members. Usernames and passwords are limited to 64 characters, and passwords are case-sensitive. Your active members will be prompted for this login information when accessing West km content from their Web browser or word processor.

See "2.10.2 West km Custom Authentication" on page 36 for more information about the West km custom authentication security model.

Chapter 5

Tracking Program Activity 5.1 Monitoring Events 81

5.2 Using Trace Logs 82

5.3 Tracking Usage 86

---

The event viewer and the tracing feature in West km provide a log of West km activity and allow you to monitor program processes and troubleshoot errors. This logging occurs while West km services are running.

5.1 Monitoring Events

An event log is created when West km services are started for the first time. Events are then logged as significant milestones are reached during the indexing process or when an error occurs.

Events are categorized as information, warning, or error events. In particular, you should monitor the event viewer for error events, which indicate that a West km server component has failed a required function.

If you have a distributed architecture, an event log is created on the delivery server, indexing server, and HTML document servers. The event log on the indexing server has more specific indexing messages, which make up the bulk of event logging.

To access the event log, complete these steps:

1. On the appropriate server, go to Start | Programs | Administrative Tools | Event Viewer.

2. In the Event Viewer window, click ProLaw in the navigation tree. Events are listed in the right frame.

3. To view more information about a specific event, double-click it.

5.1.1 Information Events

Informational events are logged when

- the West km indexing service is started
- the West km indexing service is stopped

- indexing of a document collection is started
- indexing of a document collection is finished

5.1.2 Warning Events

Warning events are logged when

- a West km server component fails to read its configuration property for starting one of the West km services.
- the processing of a document failed.
- a worker thread was aborted because it received a stop service command while processing a document. This could occur because West km didn't have rights to read the document or the document couldn't be found.
- the indexer believes it has encountered a corrupt document. This occurs when a document fails to be converted to HTML within the configuration time-out. In this instance, the service will automatically restart.

5.1.3 Error Events

Error events are logged when West km failures occur. This could happen when

- the West km indexing service fails to extract a collection of documents from the DMS for indexing
- a critical thread within the service has failed and the service needs to be restarted to function properly
- a thread responsible for processing a group of documents fails
- one of the West km services fails to start
- the delivery server could not access or communicate with another West km server component, e.g., the West km database, the indexing server, or the HTML document server

5.2 Using Trace Logs

If you encounter error events in the event log, you can use trace logs to gather additional information about program activity, allowing you to troubleshoot problems more effectively.

By default, West km trace logs are located in the Logs subfolder in the West km installation folder (e.g., C:\Program Files\Westkm\Logs). Trace logs relating to West's classification and routing engine (CaRE) are located in the CaRE\logs subfolder in the West km installation folder.

Trace logs include the following:

West km IIS Trace Log

| | |
|---|---|
| Description | Records activity on the IIS Web server application |
| File Name | prolaw.log |

| | |
|---|---|
| Description | Records activity on the IIS Web server application |
| Configured in this File | Web.config (delivery server) |

West km Indexing Trace Log

| | |
|---|---|
| Description | Records activity on the West km Indexing Service |
| File Name | prolawindexing.log |
| Configured in this File | AtlasIndexingService.exe.config (indexing server) |

West km Indexing Helper Trace Log

| | |
|---|---|
| Description | Records activity on the West km Indexing Helper Service |
| File Name | prolawindexinghelper.log |
| Configured in this File | AtlasIndexingHelperService.exe.config (indexing server) |

West km Search Trace Log

| | |
|---|---|
| Description | Records activity on the West km HTML Search Service |
| File Name | prolawHtmlSearch.log |
| Configured in this File | HtmlSearchService.exe.config (HTML document server) |

CaRE Trace Log

| | |
|---|---|
| Description | Intended only for debugging exceptions, it records events for the West km CaRE Service when the program exits. The program typically aborts when any major exception is encountered and error messages are written to the log file. |
| File Name | careservice.*date*.log |
| Configured in this File | ksh.classify.server.conf |

CaRE Command and Control Trace Log

| | |
|---|---|
| Description | Intended only for debugging exceptions, it records events for the West km CaRE CNC Service when the program exits. The program typically aborts when any major exception is encountered and error messages are written to the log file. |
| File Name | cncservice.*date*.log |
| Configured in this File | cnc_ksh.conf |

5.2.1 Configuring West km Trace Logs

For the West km trace logs (i.e., those whose names begin with *West km* in the section above), you can control the level of activity that is recorded, as well as the name and path of the trace log.

Turn on the logs when necessary, view the log files, and then turn off the logs when you are finished troubleshooting.

Important: West km trace logs increase in size quickly, so be sure to turn them off when you are finished troubleshooting.

To access and change West km trace log settings, complete the following steps:

1. Open the configuration file (listed above) in Notepad for the trace log you want to adjust. See "6 Setting Properties in Configuration Files" on page 89 for the servers and locations associated with West km configuration files.

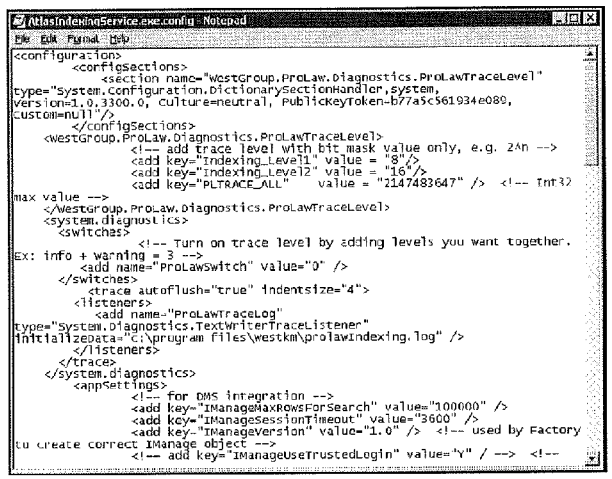

2. Locate *ProLawSwitch* in the configuration file.

```
<!-- Turn on trace level by adding levels you want together.
Ex: info + warning = 3 -->
        <add name="ProLawSwitch" value="0" />
```

3. Change the value of the ProLawSwitch to correspond to the activity you'd like to record in the trace log:

| Tracing Value | Activity Traced |
|---|---|
| 0 | tracing is off |
| 8 | function entering and exiting |
| 16 | function input parameters and return values |
| 31 | all tracing is on |

To record multiple types of activity, add the tracing values for the activities you want to be recorded. For example, type a value of 24 (8 + 16) if you want to record both function entering and exiting (value of 8) and function input parameters and return values (value of 16).

4. To change the location and name of a trace file, locate *ProLawTraceLog* in the configuration file and change the path and file name:

```
<add name="ProLawTraceLog"
type="System.Diagnostics.TextWriterTraceListener"
initializeData="c:\program files\westkm\logs\prolawIndexing.log" />
```

5. Save the configuration file.

6. Stop and then start the associated West km service on the appropriate server for the configuration file (see "6 Setting Properties in Configuration Files" on page 89).

5.2.2 Configuring CaRE Trace Logs

For the West km CaRE trace logs (i.e., those whose names begin with *CaRE* in the section above), you can control the type of activity that is recorded, as well as the name and path of the trace log.

To access and change CaRE trace log settings, complete the following steps:

1. Open the configuration file (listed above) in Notepad for the trace log you want to adjust. See "6 Setting Properties in Configuration Files" on page 89 for the servers and locations associated with West km configuration files.

2. To set a path and file name for the trace log, adjust the following property:

```
log.file : C:\Program Files\Westkm\CaRE\logs\careservice.%m_%d_%Y.log
```

You can enter the following date variables in the file name:

%Y    4-digit year
%y    2-digit year
%m    2-digit number (0-padded) representing the month
%d    2-digit number (0-padded) representing the day 3. To determine whether a time stamp is placed on each log message, adjust the following property:

```
log.format.long : 1
```

If set to *1*, a time stamp is placed on each log message; if set to *0*, a time stamp is not included.

4. Save the configuration file.

5. Stop and then start the associated West km service on the appropriate server for the configuration file (see "6 Setting Properties in Configuration Files" on page 89).

A newly named log file will be created each day if appropriate. To keep log files to a minimum, it is recommended that you purge log files on a daily or weekly basis.

Note: Although not recommended, CaRE trace logging can be turned off by not defining the log.file property.

5.2.3 Viewing Trace Logs

To view a trace log, navigate to the location designated in the trace file's associated configuration file and open the log file in Notepad.

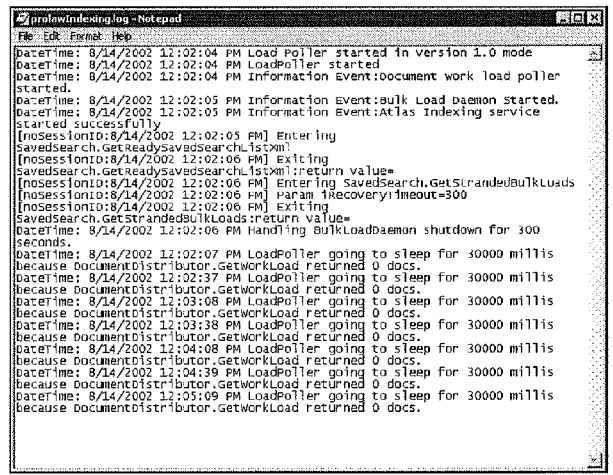

5.3 Tracking Usage

You can track, query, and export your organization's usage in West km. Data includes the type and date of the West km document transaction, the user completing the transaction, and the related matter and document number.

To view West km usage data for your organization, access the administrative tool (see "4.2 Access the Administrative Tool in West km" on page 59) and click Usage Tracking in the left frame.

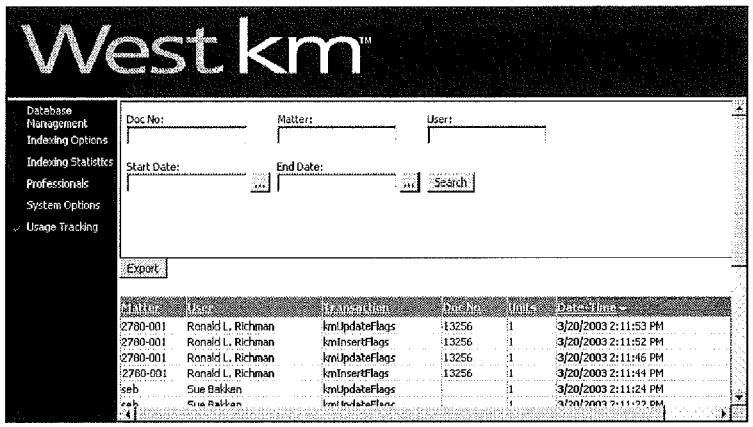

The following types of transactions are tracked in the table at the bottom of the right frame:

| Transaction | Description |
| --- | --- |
| kmKeyCite | an organization's document is retrieved as part of a citations list |
| kmSearch | an organization's document is retrieved as part of a search |
| kmKeySearchConceptual | an organization's document is retrieved in a KeySearch result because of its CaRE classification |
| kmKeySearchFullText | an organization's document is retrieved in a KeySearch result because of a query run on its full text |
| kmKeySearchRelevant | an organization's document is retrieved as part of a most statistically relevant KeySearch result (the document is either manually classified or retrieved both by CaRE classification and full text) |
| kmKeySearchDefault | an organization's document is retrieved in a KeySearch result when CaRE is disabled or when it is part of a customized KeySearch topic. |
| kmViewDoc | an organization's document is viewed |
| kmKcFlags | when an organization's document is viewed (ViewDoc), the number of unique citations with KeyCite status flags in the document |
| kmEditDoc | a copy of an organization's document is loaded |
| kmInsertFlags | KeyCite status flags are inserted in a word-processing document using the West km client |
| kmUpdateFlags | KeyCite status flags are updated in a word-processing document using the West km client |

For transactions other than kmViewDoc, the Units column provides the number of unique citations with KeyCite status flags in the document for that transaction.

5.3.1 Turning Usage Tracking On and Off

By default, usage data is turned on and logged to the West km database. To turn usage tracking off or on, open the Web.config file (default location of C:\Program Files\Westkm\Web.config) in Notepad, change the value setting for the usage tracking property, and save the configuration file. (See "6 Setting Properties in Configuration Files" on page 89.)

The property determining whether usage tracking is on or off is as follows, where a value of *true* turns usage tracking on, and a value of *false* turns it off.

```
<add key="atlas_UseUsageTracking" value="true" />
```

5.3.2 Querying and Exporting Usage Data

To query your usage data, enter your criteria in the text boxes at the top of the usage tracking page and click Search. The transactions that match your criteria are displayed in the usage tracking table.

For the document number, matter, and user criteria, transactions will be found whose values start with the letters you type. For the date criteria, you can either type the date (e.g., 4/25/2003) or click the Date browse button (...), navigate to a month and year, click a date, and click OK.

To display all usage tracking transactions, clear any values in the text boxes and click Search.

Once you have queried your usage data, you can export the data displayed in the usage tracking table to a text file of comma-separated values. You can then compile that data in another program, such as Excel, to create customized usage reports for your organization.

To export usage data to a file, click Export. By default, the file is saved to the following location on the delivery server: *West km installation folder*\Reports\UsageReportFile.txt (e.g., C:\Program Files\Westkm\Reports\UsageReportFile.txt).

To change the location of the exported file, open the Web.config file (default location of C:\Program Files\Westkm) in Notepad, change the path and file name of the value setting for the UsageReportFile property, and save the configuration file. (See "Setting Properties in Configuration Files" on page 89.)

```
<add key="UsageReportFile" value="C:\Program Files\Westkm\Reports\UsageReportFile.txt" />
```

If you would like assistance extracting your organization's usage data and compiling it in one or more customized reports, call your West km representative at 1-888-877-6529 (option 8).

Chapter 6

Setting Properties in Configuration Files 6.1 Setting Properties in a Distributed Architecture 90

6.2 Changing Your West km Images 92

6.3 Changing the Display of Your Citing Documents 92

6.4 Configuring Document Counts in the KeySearch Hierarchy 94

---

West km has several configuration files whose properties control communication among the various West km components. You can access and change settings in these configuration files.

| Configuration File | Location and File Name[1] | Associated Server | Associated Service |
|---|---|---|---|
| Indexing | *West km installation folder*\bin\ AtlasIndexingService.exe.config | Indexing Server | West km Indexing Service |
| Indexing Helper | *West km installation folder*\bin\ AtlasIndexingHelperService.exe.config | Indexing Server | West km Indexing Helper Service |
| CaRE | *West km installation folder*\CaRE\etc\ defaults.conf | Indexing Server | West km CaRE Service; West km CaRE CNC Service |
|  | *West km installation folder*\CaRE\etc\ ksh.classify.server.conf | Indexing Server | West km CaRE Service |
|  | *West km installation folder*\CaRE\etc\ cnc_ksh.conf | Indexing Server | West km CaRE CNC Service |
| IIS | *West km installation folder*\ Web.config | Delivery Server | No associated service; refresh the Web page |
| Search | *West km installation folder*\bin\ HtmlSearchService.exe.config | HTML Document Server | West km HTML Search Service |

1. The default location for the West km installation folder is C:\Program Files\Westkm.

See "Appendix D: List of Properties in Configuration Files" on page 121 for a description of the properties in each configuration file.

To open a configuration file and view or change its properties,

1. Open the configuration file you want to view or change in Notepad. If your West km server components are distributed across machines, make sure you open the file on the configuration file's associated server.

2. Make the necessary adjustments to properties in the configuration file.

3. Save the configuration file.

4. Stop and then start the associated West km service for the configuration file you've changed by completing the following steps:

a. Go to Start | Programs | Administrative Tools | Services.
   b. Right-click the service and click Stop.
   c. Right-click the service and click Start.

Note: If you've made changes to the Web.config file, you do not need to restart any service; just refresh the Web page.

6.1 Setting Properties in a Distributed Architecture

One dedicated server can be used for all West km server components (excluding your organization's DMS, which should reside on a separate server). Or, components can be distributed among several servers.

If you have a distributed server configuration and your configuration changes after installation, do the following:

- On any new servers, run the West km setup program as described in "2.2 Run the West km Setup Program" on page 7, selecting the features you want to install.

- On any existing servers whose West km features are affected by the configuration change, go to Start | Settings | Control Panel | Add/Remove Programs, select West km, click Change/Remove, select Modify, and follow the prompts. This process will remove the features you don't select and either install or reinstall the features you do select.

- Make sure the properties shown in the Typical Server Configuration for West km diagram below are adjusted accordingly. When editing these properties, make the changes on the configuration file's associated server.

The property values in the following diagram assume that the delivery server (KMSRV) was installed on D:\Westkm, the indexing server (IDXSRV) was installed on C:\Westkm, and the West km database resides on its own machine (DBSRV). In addition, the controller port values are the defaults. These values may need to change depending on what ports are being used by other processes. See "Appendix C: West km Ports" on page 119 for a complete list of the ports used by West km.

Typical Server Configuration for West km

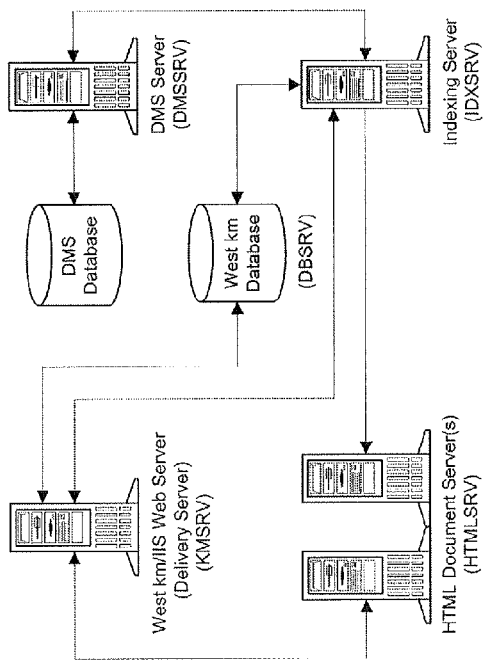

Web.config (KMSRV)

```
<HTMLConversionOptions>
  <add key="atlas_htmlconvert_template" value="d:\westkm\bin\conversion_template.htm"/>
</HTMLConversionOptions>
<appSettings>
...
<!-- DataBase to connect to for ProLaw Data -->
<add key="DbConnectionString" value="Data Source=KMSRV;
      Initial Catalog=km';User ID=kmuser';Password='kmuser'" />
<add key="atlas_template_clicktoeditLink" value="http://kmsrv/km/wlatlas.aspx" />
<!-- KeySearch Scan index configuration -->
<add key="indexer_DeliveryServer" value="KMSRV"/>
<!-- BulkLoadController -->
<add key="BulkLoadControllerServer" value="IDXSRV" />
<add key="BulkLoadControllerPort" value="8085" />
<add key="indexing_FtBuildControllerServer" value="IDXSRV"/>
<add key="indexing_FtBuildControllerPort" value="8085"/>
<add key="indexing_ProfileSyncControllerServer" value="IDXSRV"/>
<add key="indexing_ProfileSyncControllerPort" value="8085"/>
...
</appSettings>
```

AtlasIndexingService.exe.config (IDXSRV)

```
<appSettings>
...
<!-- BulkLoadController -->
<add key="BulkLoadControllerServer" value="IDXSRV"/>
<add key="BulkLoadControllerPort" value="8085"/>
<!-- Indexing -->
<add key="indexing_FtBuildControllerServer" value="KMSRV"/>
<add key="indexing_FtBuildControllerPort" value="8085"/>
<add key="indexing_ProfileSyncControllerServer" value="IDXSRV"/>
<add key="indexing_ProfileSyncControllerPort" value="8086"/>
<add key="indexer_IndexingHelperControllerPort" value="8086"/>
<add key="indexer_HtmlSearchControllerPort" value="8087"/>
<!-- CaRE configuration -->
<add key="care_Server" value="IDXSRV" />
<!-- KeySearch Scan Index configuration -->
<add key="indexer_DeliveryServer" value="KMSRV" />
<!-- DataBase to connect to for ProLaw Data -->
<add key="DbConnectionString" value="Data Source=DBSRV;
      Initial Catalog=km';User ID='kmuser';Password='kmuser'" />
...
</appSettings>
```

AtlasIndexingHelperService.exe.config (IDXSRV)

```
<HTMLConversionOptions>
  <add key="atlas_htmlconvert_template" value="c:\westkm\bin\conversion_template.htm"/>
</HTMLConversionOptions>
<appSettings>
...
<add key="indexer_IndexingHelperControllerPort" value="8086"/>
...
</appSettings>
```

HtmlSearchService.exe.config (HTMLSRV)

```
<appSettings>
  <add key="indexer_HtmlSearchControllerPort" value="8087"/>
</appSettings>
```

6.2 Changing Your West km Images

In westlaw.com, your organization's documents are identified to members with images unique to your organization. These images are saved in the images subfolder in the installation folder on the delivery server (e.g., C:\Program Files\Westkm\images) and can be changed to alternate .gif or .jpg images.

The images are as follows:

| Image Description | Required Dimensions | Default File Name | Property Name in Web.config |
|---|---|---|---|
| Your organization's documents on westlaw.com  | 65(w) x 49(h) pixels .90(w) x .68(h) inches | firmbrandinglogo.gif | atlas_image_Firm |
| Westlaw document headers  | 65(w) x 43(h) pixels .90(w) x .60(h) inches | firmsplat.gif | atlas_ada_xml_FirmSplat |
| Westlaw Information Tabs 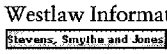 | 140(w) x 16(h) pixels 1.94(w) x .22(h) inches | firmdoclistsplat.gif | atlas_ada_xml_FirmDocListSplat |
| The West km page Stevens, Smythe & Jones | 350(w) x 30(h) pixels 4.86(w) x .42(h) inches | firmmoreinfologo.gif | atlas_image_FirmMoreInformation |

To change the images, you can either (1) replace the existing images with new .gif images with the same name, or (2) place new .gif or .jpg images (with new names) in the images subfolder and change the image property values in the Web.config file to point to the new file names.

To change the image property values, open the Web.config file (default location of C:\Program Files\Westkm\Web.config) in Notepad, change the value settings for the image properties as necessary, and save the configuration file. The new images appear in West km immediately.

> Note: The name of your organization is also displayed in westlaw.com on your organization's subtabs. If you want to change your organization's name on these subtabs, call West km Technical Support at 1-888-877-6529 (option 8).

6.3 Changing the Display of Your Citing Documents

You can select the way that your organization's citing documents are sorted in westlaw.com: (1) in reverse chronological order, based on the date the document was last modified, or (2) by their depth of treatment, and then in reverse chronological order. By default, documents are sorted by their depth of treatment.

For the depth of treatment option, KeyCite depth of treatment stars are used to indicate the extent to which each of your organization's documents discusses a displayed Westlaw document. The designation is based on the number of times your organization's document cites the displayed Westlaw document. The default settings for each depth of treatment category are as follows:

| Symbol | Default Definition | Default Range |
|---|---|---|
| ★★★★ | Examined | Your organization's document cites the displayed Westlaw document 10 or more times. |
| ★★★ | Discussed | Your organization's document cites the displayed Westlaw document 6–9 times. |
| ★★ | Cited | Your organization's document cites the displayed Westlaw document 2–5 times. |
| ★ | Mentioned | Your organization's document cites the displayed Westlaw document 1 time. |

To change these display options, open the Web.config file (default location of C:\Program Files\Westkm\Web.config) in Notepad, change the value settings for the display properties as necessary, and save the configuration file.

The property that determines the sort order is as follows, where a value of *true* sorts by depth of treatment and a value of *false* sorts reverse chronologically:

```
<!-- Depth Star settings -->
    <add key="atlas_use_depth_stars" value="true" />
```

The properties for the depth of treatment stars are as follows:

```
<add key="atlas_4stars_caption" value="Examined" />
<add key="atlas_4stars_max" value="2147483647" />
    <!-- Int32 Max value -->
<add key="atlas_4stars_min" value="10" />
<add key="atlas_3stars_caption" value="Discussed" />
<add key="atlas_3stars_max" value="9" />
<add key="atlas_3stars_min" value="6" />
<add key="atlas_2stars_caption" value="Cited" />
<add key="atlas_2stars_max" value="5" />
<add key="atlas_2stars_min" value="2" />
<add key="atlas_1stars_caption" value="Mentioned" />
<add key="atlas_1stars_max" value="1" />
<add key="atlas_1stars_min" value="0" />
```

Change the caption values if you want to change the definitions of the depth of treatment categories. Change the min and max values to indicate the range of times your organization's document must cite the displayed Westlaw document in order to belong to a particular depth of treatment category.

6.4 Configuring Document Counts in the KeySearch Hierarchy

You can select whether numbers are displayed after topics in the KeySearch hierarchy that indicate the number of unique documents at your organization that have been assigned to that topic via manual classification or West's classification and routing engine (CaRE).

These document counts are configurable for end users viewing the KeySearch hierarchy in westlaw.com and in the West km pages, as well as for information managers in the KeySearch administrative view. The following options are available:

- Automatically display document counts
- Enable document counts with a *Get Doc Counts* link in the left frame of the KeySearch hierarchy
- Disable document counts The *Get Doc Counts* link option is set by default for all views of the KeySearch hierarchy. When clicked, this link displays document counts for the topics on the current page of the KeySearch hierarchy.

Note: West km gets document counts from the West km database in real time, so the numbers can change if *Get Doc Counts* is clicked multiple times from the same location in the KeySearch hierarchy. This action is not recommended, however, because of the database resources that are required.

To configure document counts, open the Web.config file (default location of C:\Program Files\Westkm\Web.config) in Notepad, adjust the value settings for the document count properties as necessary, and save the configuration file.

The document count properties are as follows. The properties in each column correspond to a particular view of the KeySearch hierarchy:

| Name | Properties for westlaw.com and the West km pages (for end users) | Properties for the KeySearch administrative view (for information managers) |
|---|---|---|
| Display | atlas_ks_show_doc_counts_in_westlaw | atlas_ks_show_doc_counts_in_admin_tool |
| Link | atlas_ks_show_get_doc_count_link_in_westlaw | atlas_ks_show_get_doc_count_link_in_admin_tool |

To automatically display document counts, set a value of *true* for the Display property for the view you want to adjust. (The corresponding Link property is then set automatically to *false*.)

To enable document counts with a *Get Doc Counts* link in the left frame, set a value of *false* for the Display property and a value of *true* for the Link property for the view you want to adjust.

To disable document counts, set a value of *false* for both the Display and Link properties for the view you want to adjust.

Chapter 7

Backing Up and Removing the West km Application 7.1 Backing Up West km 97

7.2 Removing the West km Application 97

7.3 Removing West km Databases 99

7.4 Removing the Web Share Virtual Directory 100

7.1 Backing Up West km

As a standard precaution, you should regularly back up the following West km components:

- West km database
- West km RID database
- West km installation folder and all subfolders
- Documents in HTML storage locations

7.2 Removing the West km Application

To remove the West km application, complete the following steps on each West km server component:

1. Go to Start | Settings | Control Panel | Add/Remove Programs.
2. If you installed Simple CaRE Driver, select it, click Remove, and click Yes.
3. Select West km 2.0 and click Change/Remove.
4. At the InstallShield Wizard, select Remove and click Next.

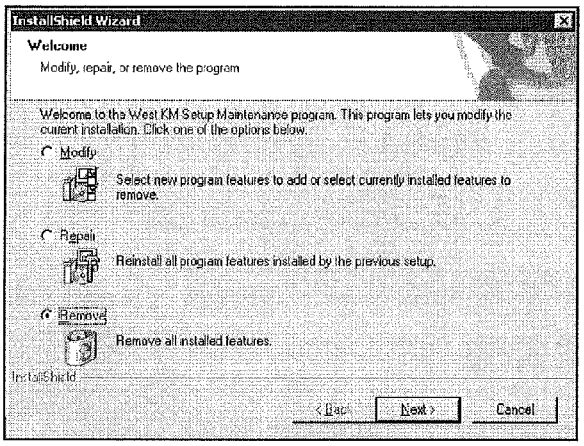
5. At the Confirm Uninstall dialog box, click OK.
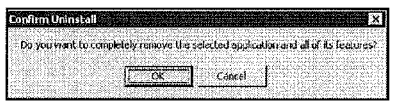
6. At the Stop IIS Services dialog box, click Yes.
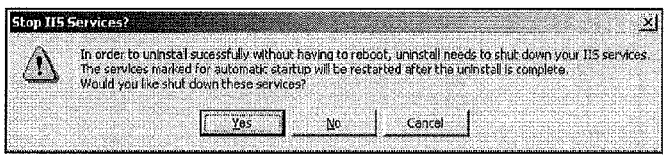
7. At the Maintenance Complete dialog box, click Finish.
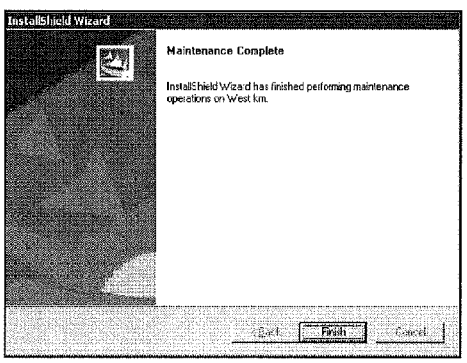
If NextPage NXT 3 software was installed as part of the West km installation, it will be removed with West km.

Other additional third-party software that was installed as part of the West km server installation (i.e., Microsoft .NET Framework, Sun Java Runtime Environment 1.3.1) is not removed with West km. If you wish to remove this software, do so separately via Add/Remove Programs in the Control Panel.

In addition, the Westkm folder will not be removed and will contain iManage .dll files and West km log files. The config_backup subfolder will contain backup copies of West km configuration files.

7.3 Removing West km Databases

To remove the West km database and West km RID database, complete the following steps on the server containing the databases:

1. Go to Start | Programs | Microsoft SQL Server | Enterprise Manager.

2. In the SQL Server Enterprise Manager window, expand the navigation tree in the left frame to display the databases for the server containing the databases.

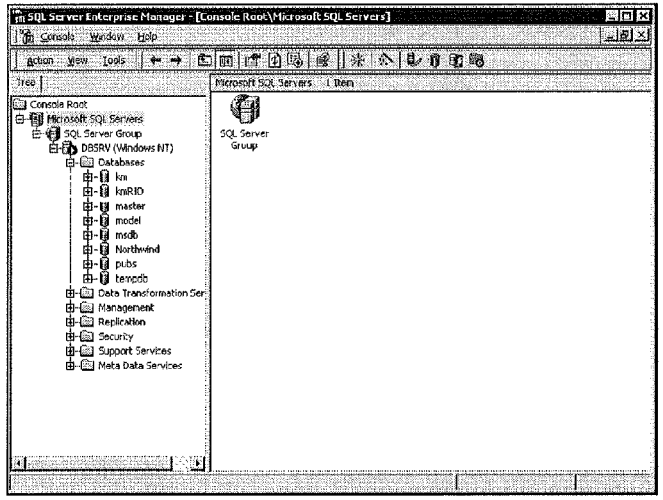

3. Right-click km in the Databases folder and click Delete.

4. Right-click kmRID in the Databases folder and click Delete.

5. In the navigation tree, expand the Security folder under the server name and click Logins.

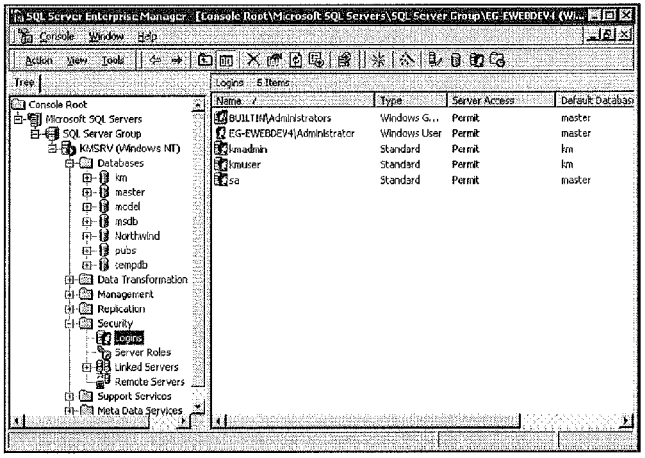

6. In the right frame, right-click kmadmin and click Delete.
7. In the right frame, right-click kmuser and click Delete.
8. Close the SQL Server Enterprise Manager window.

7.4 Removing the Web Share Virtual Directory

To remove the Web share virtual directory for West km, complete the following steps on the delivery server:

1. Go to Start | Programs | Administrative Tools | Internet Services Manager.
2. In the Internet Information Services window, expand the server name in the navigation tree in the left frame, and then expand the Default Web Site item.

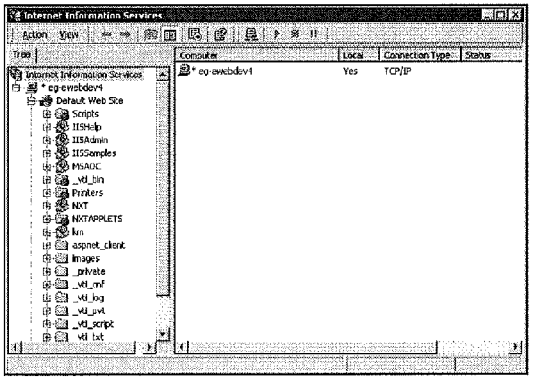

3. Right-click the km item under *Default Web Site* and click Delete.
4. Right-click the NXT item under *Default Web Site* and click Delete.
5. Right-click the NXTAPPLETS item under *Default Web Site* and click Delete.

Chapter 8

Installing the West km Client Application 8.1 Installing the West km Client at a Desktop 101

8.2 Silently Installing the West km Client over a Network 104

8.3 Modifying or Removing the West km Client 105

---

The West km client allows members of your organization to embed citation links and KeyCite status flags in their Microsoft Word and Corel WordPerfect documents, providing an instantaneous view of the validity of legal citations in a document.

This client can be installed at the client desktop or over a network using a push installation method such as System Management Server.

8.1 Installing the West km Client at a Desktop

To install the West km client at a client desktop, complete the following steps:

1. Close all open applications.
2. Insert the West km CD-ROM 1 (Setup) into your CD-ROM drive.
3. Navigate to the Client folder on the CD-ROM and double-click Westkm_client.exe.

4. At the Welcome dialog box, click Next.

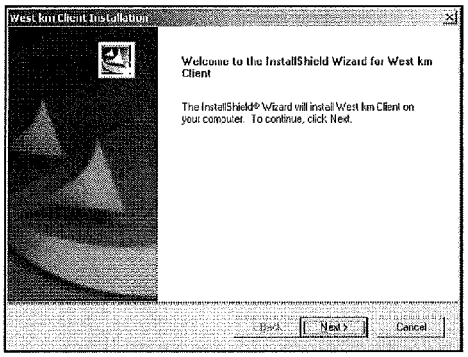

5. At the Choose Destination Location dialog box, select the folder where you want the West km client installed:

- To install to the default destination folder, click Next.
   - To install to a different destination folder, click Browse, double-click the folder for installation, click OK, and then click Next to continue.

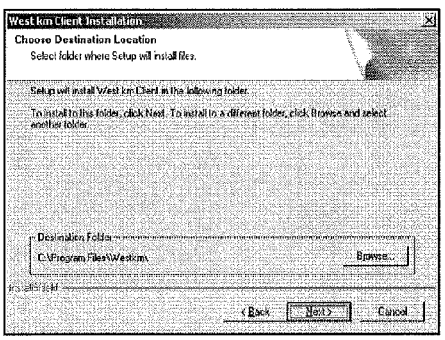

6. At the West km Delivery Server Location dialog box, type the name of the delivery server and click Next.

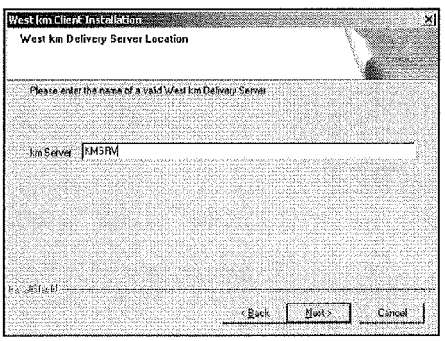

7. At the Wizard Complete dialog box, click Finish.

Note: If you are prompted to restart your computer, either select that option or restart your computer before running your word processor.

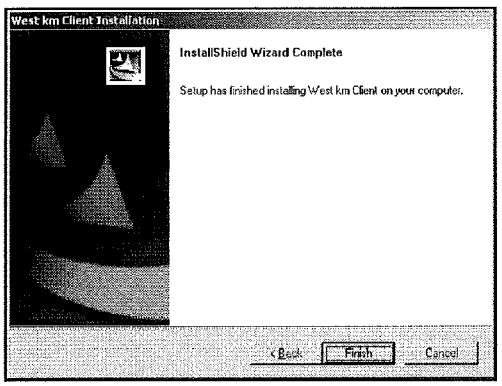

8. If a proxy server exists between the client machine and the West km delivery server, add the delivery server's address to the list of proxy server exceptions in Internet Explorer on the client machine. Access the Exceptions list by going to Tools | Internet Options | Connections | LAN Settings | Advanced in Internet Explorer.

8.1.1 Configuring the West km Client

By default, your West km members are prompted to enter a matter ID the first time they add citation links and KeyCite status flags to a word-processing document. In addition, this citation markup is deleted only when the Delete Flags feature is invoked.

After you install the West km client, you have the option to

- bypass prompts for the matter ID. (Note: If bypassed, a matter ID will not be included in the transactions tracked from the West km client.)
- automatically delete citation markup from word-processing documents when save operations are performed.

To adjust these options, change the registry settings for the computer on which the West km client is installed as follows:

- KMNoMatterID: Set the registry value to *1* to bypass the matter ID prompt; set the registry value to *0* enable the matter ID prompt.
- KMAutoDelete: Set the registry value to *1* to automatically delete citation markup when save operations are performed; set the registry value to *0* disable automatic deletion of citation markup.

8.2 Silently Installing the West km Client over a Network

To silently install the West km client over a network using a push installation method, complete the following steps:

1. Close Microsoft Word.

2. Insert the West km CD-ROM 1 (Setup) into your CD-ROM drive.

3. Copy the installation files in the Client\Network Setup folder on the CD-ROM to a shared location on your network (e.g., p:\westkm).

4. Record the silent installation in an InstallShield setup file (.iss):

a. Go to Start | Run, type command, and press Enter to access a command prompt.

b. Type setup.exe at the shared network location, followed by the *-r* switch to record the setup and the *-f1* switch to indicate the full path where the .iss file is to be placed. Then press Enter.

For example: sctup.exe -r -f1 "p:\westkm\setup.iss"

> Note: If the *-f1* switch is not used, then a setup.iss file will be placed in the Windows folder, e.g., C:\Windows or C:\WINNT.

c. Follow steps 4–7 under "8.1 Installing the West km Client at a Desktop," selecting the values that you want for the silent installations.

d. Type exit and press Enter to close the command prompt window.

5. For the silent installation, call setup.exe at the shared network location and use the .iss file. The *-s* switch indicates the silent installation and the *-f1* switch indicates the .iss file to use.

For example: setup.exe -s -f1 "p:\westkm\setup.iss"

> Note: If Microsoft Word is opened while the installation is in progress, then the installation could fail. If a return value is needed that indicates completion, e.g., for a batch file, then use *start /wait* together with the *-sms* switch when calling setup.exe.

For example: start /wait setup.exe -s -sms -f1 "p:\westkm\setup.iss"

> Note: If a proxy server exists between the client machine and the West km delivery server, you will also need to add the delivery server's address to the list of proxy server exceptions in Internet Explorer on the client machine. Access the Exceptions list by going to Tools | Internet Options | Connections | LAN Settings | Advanced in Internet Explorer.

8.3 Modifying or Removing the West km Client

Complete these steps if you want to change the location of the West km delivery server after the West km client has been installed, or if you want to remove the West km client:

1. Go to Start | Settings | Control Panel | Add/Remove Programs.
2. Select West km Client and click Change/Remove.
3. At the Welcome screen, do one of the following:
   - If you want to remove the West km client, select Remove and click Next. When you are asked to confirm the deletion, click Yes.
   - If you want to change the location of the West km delivery server, select Modify and click Next. Type the name of the delivery server and click Next.
4. Click Finish.

Appendix A

Installed West km Databases, Folders, and .dll Files

Databases

The following databases are installed on the West km database server:

| | |
|---|---|
| km | West km database for storing KeyCite and document metadata, data for indexing scheduling, KeySearch data, and CaRE data for assigning documents to KeySearch topics |
| kmRID | West km RID database for identifying citations in your organization's documents |

Folders

The following folders are installed in the West km installation folder (e.g., C:\Program Files\Westkm).

| | |
|---|---|
| bin | West km server binaries |
| CaRE | West's classification and routing engine software |
| Client | West km client installation files |
| config_backup | Backup copies of West km configuration files upon removal |
| controls | ActiveX controls |
| DB | West km database SQL scripts |
| Documentation | West km documentation |
| FTSearch | Files to enable full-text searching, including NextPage NXT 3 |
| images | Web application images |
| lib | RID Java libraries |
| Logs | West km trace logs |
| ProLaw10.Custom | Code for knowledge management feature |
| reports | Usage report log |
| Scan | Used to create and hold the Scan full-text searching file |
| Scripts | Web application scripts |
| Stylesheets | Web application stylesheets |
| Xml | XML data templates |

Registered .dll Files

The following .dll files are registered during installation:

*West km installation folder*\bin\PLIndexingCOM.dll
*West km installation folder*\bin\CiteFinder.dll
*West km installation folder*\bin\PwdCrypt.dll C:\WINNT\system32\msxml3.dll
C:\WINNT\system32\msxml3a.dll
C:\WINNT\system32\msxml3r.dll

Appendix B

More about the West km Automated Setup

For your information and troubleshooting purposes, this appendix contains the manual steps behind some of the automated setup processes in West km.

Installation and Update of NextPage NXT 3 Software

If you want to use the full-text indexing and searching capabilities of West km, install and configure NextPage NXT 3 version 3.4 software (provided with the purchase of West km) on each of the following West km server components that resides on a separate machine:

- delivery server
- HTML document servers

Installing NextPage NXT 3 Software

1. Close all open applications.
2. Insert the West km CD-ROM 1 (Setup) into your CD-ROM drive and navigate to the Program Files/Westkm/Temp/NXT folder.
3. Double-click Setup.exe.
4. At the installation page, click INSTALL NXT3.

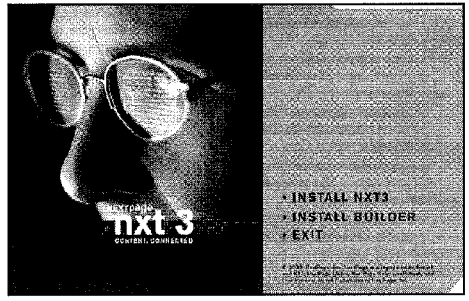

5. At the Welcome dialog box, click Next.
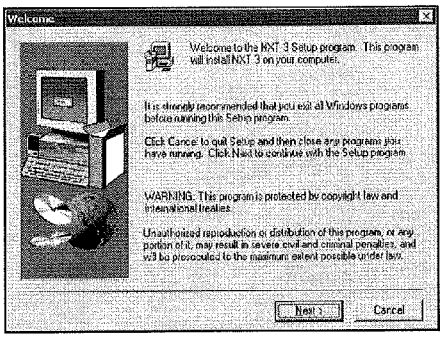
6. At the Software License Agreement dialog box, click Yes.
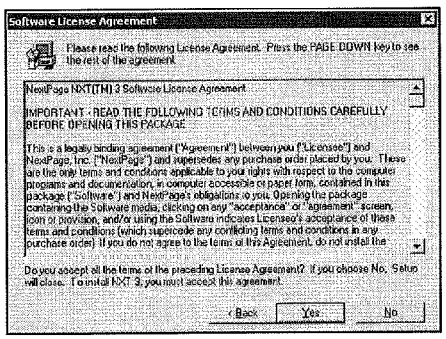
7. At the User Information dialog box, enter your name, your company, and the NXT 3 serial number and click Next. (You will receive the NXT 3 serial number from West km Technical Support, available at 1-888-877-6529, option 8.)
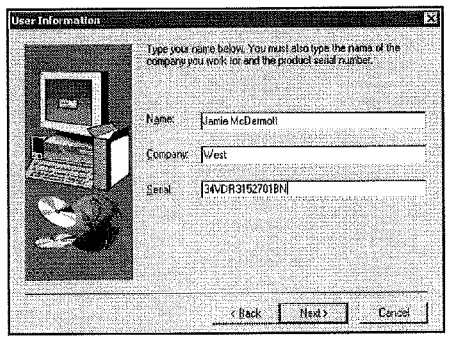

8. At the Choose Destination Location dialog box, select C:\Program Files\Westkm\FTSearch\Nextpage for the installation folder and click Next.

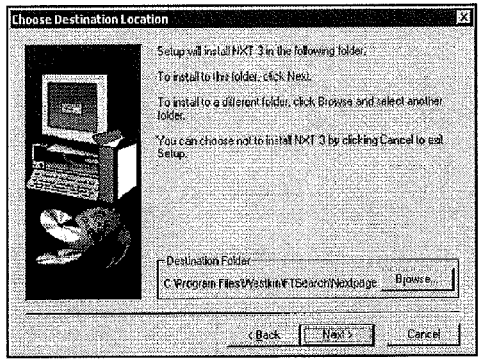

9. At the Select Components dialog box, clear the Documentation and Sample Files check boxes, so that only *Server Files* and *Language Templates* are selected. Then click Next.

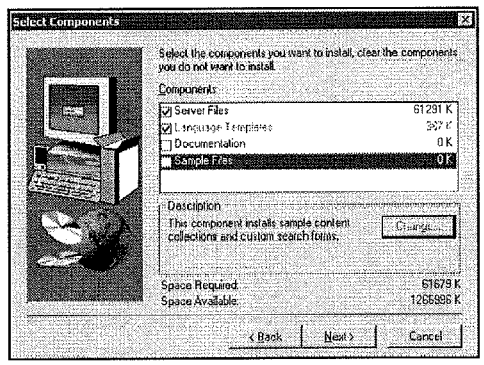

10. At the Select Program Folder dialog box, accept the default program folder and click Next.

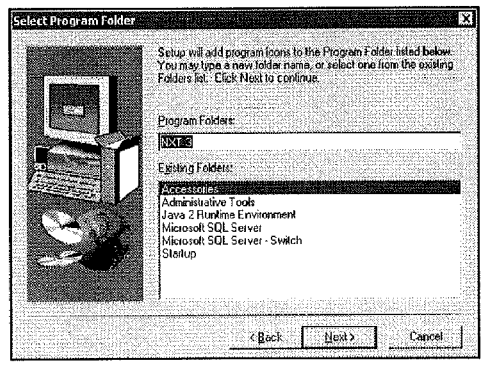

11. At the Enter Admin Password dialog box, type the password of your full-text searching (FTS) administrator account in the *Password* and *Confirm* text boxes. You will receive the password from West km Technical Support (available at 1-888-877-6529, option 8).

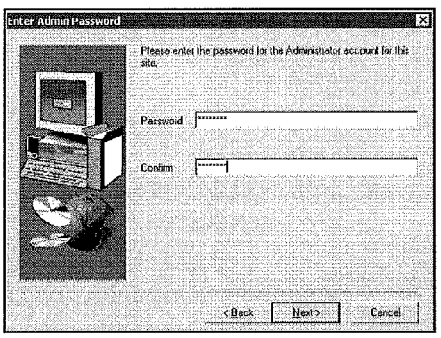

12. At the Setup Complete dialog box, click Finish. If you are prompted to restart your computer, do not do so.

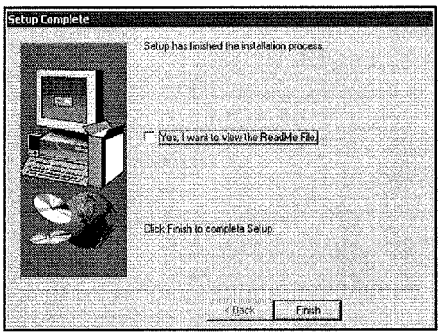

Updating NextPage NXT 3 Software

1. On the West km CD-ROM 1 (Setup), navigate to the Program Files/Westkm/Temp/NXTSP3 folder, double-click setup.exe to open the InstallShield wizard for installing NXT 3.4 service pack 3, and complete the following steps:

a. At the Welcome screen, click Next.
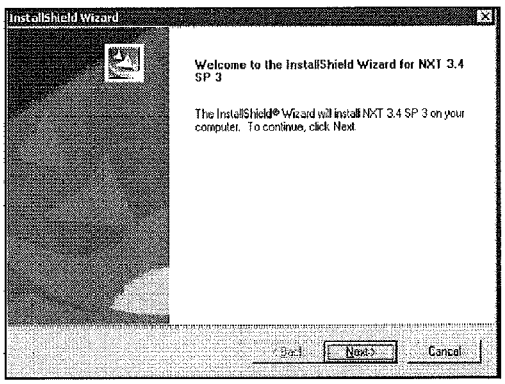
b. At the License Agreement screen, click Yes.
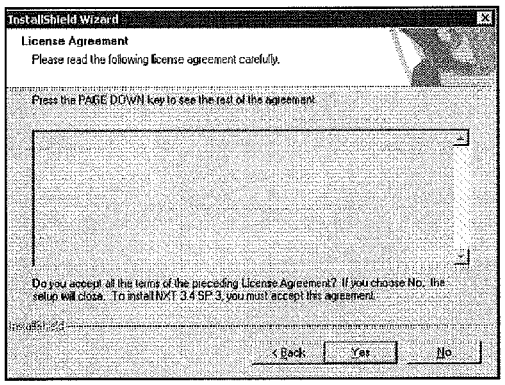
c. At the Backup Path screen, type the path where you want to back up existing NXT 3 files and click Next.
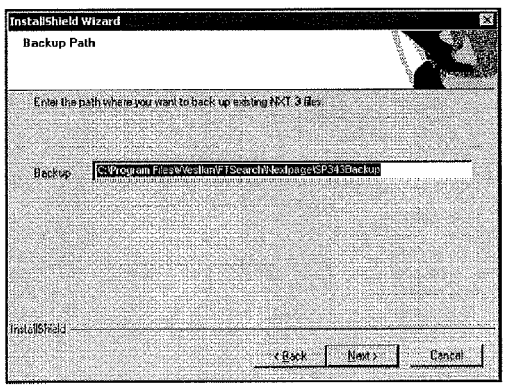

d. At the Start Copying Files screen, click Next.

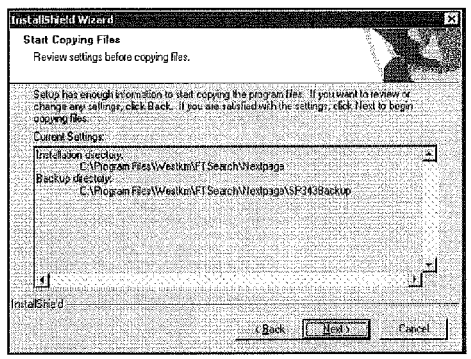

e. At the Wizard Complete screen, clear the Show the readme file check box and click Finish.

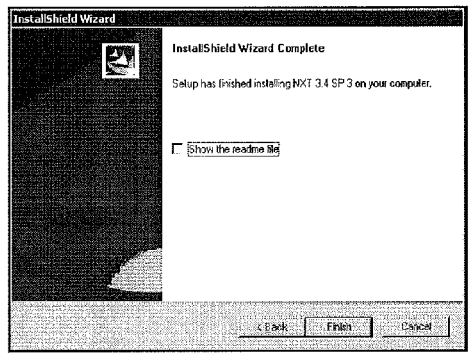

2. On the West km CD-ROM 1 (Setup), navigate to the Program Files/Westkm/Temp/NXTSP4 folder, double-click setup.exe to open the InstallShield wizard for installing NXT 3.4 service pack 4, and complete the same steps as for service pack 3.

3. Go to Programs | Administrative Tools | Services.

4. In the Services window, right-click World Wide Web Publishing Service in the right frame and click Stop.

5. Go to Start | Run, type the command regsvr32 -u External COMSupport.dll at the C:\Program Files\Westkm\FTSearch\Nextpage\bin folder, press Enter, and click OK.

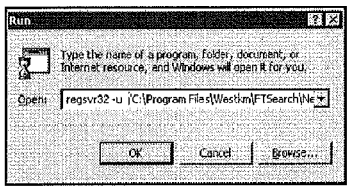

6. Go to Start | Run, type the command regsvr32 -u COMServices.dll at the C:\Program Files\Westkm\FTSearch\Nextpage\bin folder, press Enter, and click OK.

7. Copy all of the files from the Program Files/Westkm/Temp/NXTHotFix folder on the West km CD-ROM to the C:\Program Files\Westkm\FTSearch\Nextpage\bin folder on the server. Overwrite the existing files.

8. Go to Start | Run, type the command regsvr32 External COMSupport.dll at the C:\Program Files\Westkm\FTSearch\Nextpage\bin folder, press Enter, and click OK.

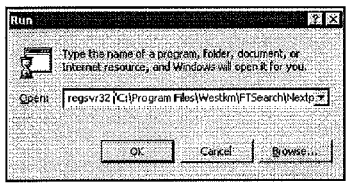

9. Go to Start | Run, type the command regsvr32 COMServices.dll at the at the C:\Program Files\Westkm\FTSearch\Nextpage\bin folder, press Enter, and click OK.

10. In the Services window, right-click World Wide Web Publishing Service in the right frame and click Start.

11. Close the Services window.

Creation of the NextPage NXT 3 Content Service

The West km full-text indexing process completes the following steps to define the HTML documents that will be indexed by NextPage NXT 3 for full-text searching.

1. Go to Start | Programs | NextPage | NXT 3 | Content Network Manager.

2. At the Server Connection dialog box, type the name and password of your NextPage administrator account in the *User name* and *Password* text boxes and click OK. (By default, the user name of the NextPage administrator account is *Administrator*.)

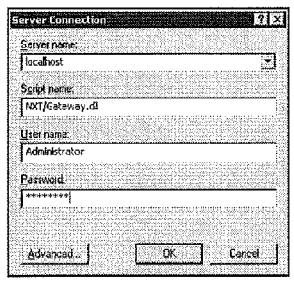

3. In the Content Network Manager window, right-click NXT in the navigation tree and click New | Folder.

4. In the Add Folder dialog box, type Westkm in the *Name*, *Title*, and *ID* text boxes and click OK.

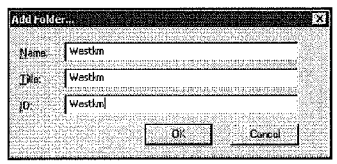

5. In the Content Network Manager window, click the Apply All Changes button .

6. In the navigation frame, expand the NXT item, right-click the Westkm folder, and click New | Content Service.

7. In the Add Content Service dialog box, do the following:

a. Verify that File System Service is selected from the *Type* drop-down list.
   b. Type HTMLStore in the *Name*, *ID*, and *Title* text boxes.
   c. Type the following value in the *Index Sheets* text box, adjusting the path if West km was not installed to C:\Program Files\Westkm:

text/html=C:\Program Files\Westkm/FTSearch/IndexSheets/
      HTML.xil;metadata=C:\Program Files\Westkm/FTSearch/IndexSheets/
      Metadata.xil d. Click OK.

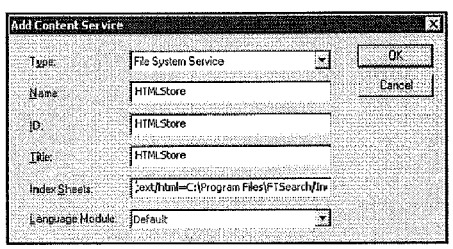

8. At the Wizard Welcome screen for File System Service, click Next.

9. At the File System Service screen, do the following:

a. Type the path for the HTML document location (e.g., C:\HTMLStore) in the *Root path* text box.

Important: Do not use the Browse button to navigate to the path.

b. Type the same path in the *Metadata path* text box.

Important: Do not use the Browse button to navigate to the path.

c. Type the following value in the text box to the right of the << *Add* button, and then click << Add:

.css;.gif;.xsd;.js;.xsl;.vsd;.jpeg;.jpg;.rdf;.nxt

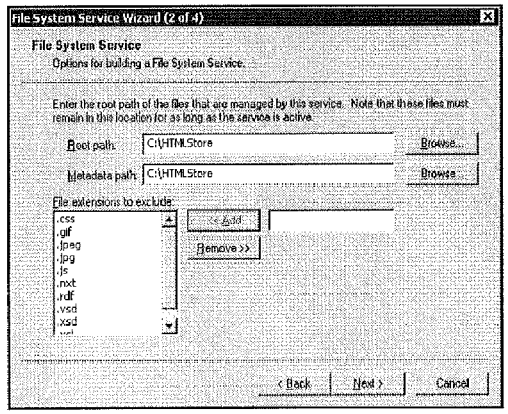

d. Click Next.

10. At the Build Schedule screen, clear the Build content service immediately check box, verify that Do not schedule builds of this content service is selected, and click Next.

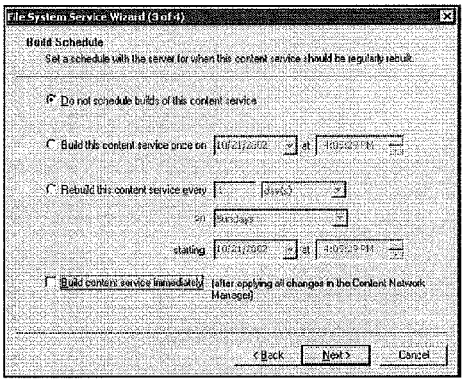

11. At the Wizard Completed screen, click Finish.

12. In the Content Network Manager window, click the Apply All Changes button
.

13. Close the Content Network Manager window.

Removal of NextPage NXT 3 Software

The West km setup program automatically installs NextPage NXT 3 for full-text indexing and searching. You can remove this software—for instance, if a problem occurs with the automatic installation and you want to remove and then manually install NextPage NXT 3.

To remove NextPage NXT 3, go to Start | Settings | Control Panel | Add/Remove Programs and then select and remove the following in the order listed:

- West km Full-Text Indexing Service Pack 4
- West km Full-Text Indexing Service Pack 3
- West km Full-Text Indexing

Appendix C

West km Ports

The ports used by West km are listed below. Port settings may need to be adjusted in West km configuration files if a conflict exists with another service already using that port or if a firewall between West km server components blocks ports.

Microsoft SQL Server
SQL Server's default port is 1433.

West km Delivery Server—IIS Configuration File
<add key="PLDmsServicePort" value="5364" />
<add key="BulkLoadControllerPort" value="8085" />
<add key="indexing_FtiBuildControllerPort" value="8085"/>
<add key="indexing_ProfileSyncControllerPort" value="8085"/>
<add key="ProLawTaskCompilerPort" value="5364" />

West km Indexing Server—Indexing Configuration File
<add key="PLDmsServicePort" value="5364" />
<add key="indexing_FtiBuildControllerPort" value="8085" />
<add key="BulkLoadControllerPort" value="8085" />
<add key="indexing_ProfileSyncControllerPort" value="8085" />
<add key="indexer_HtmlSearchControllerPort" value="8087" />
<add key="indexer_IndexingHelperControllerPort" value="8086" />
<add key="care_Port" value="11116" />

West km Indexing Server—Indexing Helper Configuration File
<add key="indexer_IndexingHelperControllerPort" value="8086" />

West km HTML Document Server—Search Configuration File
<add key="indexer_HtmlSearchControllerPort" value="8087" />

Appendix D

List of Properties in Configuration Files

AtlasIndexingService.exe.config 121

AtlasIndexingHelperService.exe.config 131

HtmlSearchService.exe.config 132

Web.config 132 defaults.config 146 ksh.classify.server.conf 146 cnc_ksh.conf 147

Following is a description of the properties in each configuration file.

Indexing Configuration File: AtlasIndexingService.exe.config

| Property Name | Allowable Range | Description |
| --- | --- | --- |
| PLTRACE_OFF<br>PLTRACE_INFO<br>PLTRACE_WARNING<br>PLTRACE_ERROR<br>ATLASTRACE_HIGHLEVEL<br>ATLASTRACE_LOWLEVEL<br>PLTRACE_ALL | Preassigned integer values.<br>Do not modify. | Tracing levels. One or more tracing levels can be enabled by setting the value for ProLawTraceSwitch. |
| DEFAULT_JURIS<br>GET_KC_FLAGS<br>APOS_AS_SECTION<br>DOC_YEAR<br>DOC_TYPE | State code.<br>True/False.<br>True/False.<br>True/False.<br>True/False. | RID processing options. These will be specific to an organization, based on document content and indexing requirements for the organization. |

Indexing Configuration File: AtlasIndexingService.exe.config (Continued)

| Property Name | Allowable Range | Description |
|---|---|---|
| ProLawSwitch | 0 to disable tracing. 2147483647 to enable all tracing levels. Custom combination of trace level values. Add together trace level values to enable multiple trace levels. | Sets tracing levels for the service. Tracing levels are defined in the *WestGroup.ProLaw.Diagnostics.ProLawTraceLevel* config section. |
| ProLawTraceLog | Local filename path. | Set the *initializeData* attribute to the local filename path where tracing information for the service will be written. |
| IManageMaxRowsForSearch | Integer value. | Maximum number of records to return for an iManage saved search. |
| IManageSessionTimeout | Integer value in seconds. | Session time-out value for iManage connection. |
| IManageVersion | 1.0, 1.0.0.142, 2.0 | IManage API version. |
| DmsUserIdsRequired DmsUserPasswordsRequired | Y/N. | Controls usage of iManage virtual user accounts and passwords for authenticating members. If set to Y, iManage security will determine document access rights. If set to N, internal security logic is used to determine document access rights. |
| IManageUseTrustedLogin | Y/N. | Controls login method for the iManage DMS server. Trusted login uses NT login; otherwise iManage-defined login required. |
| IManageUseCombinedClientMatter | Y/N. | Controls if matter ID and client ID from DMS should be combined in ProLaw database. |
| IManageAttrMappingTitle IManageAttrMappingAbstract IManageAttrMappingClass IManageAttrMappingMatter IManageAttrMappingMatterDescription IManageAttrMappingClient IManageAttrMappingClientDescription IManageAttrMappingAuthor | String. | Indicates how to map iManage document profile custom profile attributes to associated ProLaw document profile attributes. |
| PrefetchDocsProfiles | True/False. Do not modify. | Reserved for future performance enhancement when retrieving documents from DMS. |
| PCDocsSecurityLumpSize | Integer value. Recommended range is 75-250. | SQL statement group size parameter used when retrieving security attributes for documents. |
| PCDocsSecurityCacheGroups | True/False. | Controls checking group permissions for user on per-process basis. |
| PCDocsUseClientMatterMetaData | True/False. | Indicates whether client matter metadata is used in the DMS database. |

Indexing Configuration File: AtlasIndexingService.exe.config (Continued)

| Property Name | Allowable Range | Description |
| --- | --- | --- |
| PCDocsUseCombinedClientMatter | True/False. | Controls if matter ID and client ID from DMS should be combined in ProLaw database. |
| PCDocsUseSubversions | True/False. | Controls use of subversions for documents. |
| PCDocsUseMatterCustomSql | True/False. | Controls whether custom SQL is used to retrieve client matter metadata instead of default legal profile. |
| PCDocsMatterCustomSql | SQL statement. The following aliases must be used: matter_id matter_name client_id client_name | SQL query used to retrieve matter ID and client ID from custom profile. Contact West km Technical Support for SQL statement requirements. |
| PCDocsQuickSearchSqlTimeout | Integer value in seconds. | Maximum amount of time to wait for PCDocs-related SQL queries to complete. If the time-out period is exceeded, an exception is generated and the document is not indexed. |
| PLClientMatterSeperator | "-" (hyphen). Do not modify. | Separator character to be used when creating combined client ID and matter ID attribute in ProLaw document profile. |
| FusionUseIndividualLogins | True/False. | Control if Load Copy should use individual login (entered in Professionals page) or administrative level account. Can only be set to *True* in web.config. |
| FusionGetQuickSearchFormName | String. Do not modify. | Name of form used to retrieve the list of quicksearches from the Fusion server. |
| FusionGetVersionInfoFormName | String. Do not modify. | Name of form used to retrieve version information from the Fusion server. |
| FusionUseSubversions | True/False. | Controls use of sub-versions for documents. Important: Changing this setting requires re-indexing. |
| FusionUseDbFormsToRunQuickSearch | True/False. | Controls if database forms are used to run quicksearches. This should only be set to *True* if Fusion server was upgraded or if customized forms are being used. |
| FusionNonDbRunQuickSearchFormName | String. | Name of form used to run a quicksearch. This is an external form, not a database form. This property is ignored if FusionUseDbFormsToRunQuickSearches is set to *False*. |
| FusionDefaultProfileSearchFormName | String. Do not modify. | Name of form used to retrieve the default profile metadata from the Fusion server. |

List of Properties in Configuration Files

Indexing Configuration File: AtlasIndexingService.exe.config (Continued)

| Property Name | Allowable Range | Description |
|---|---|---|
| FusionUseClientMatterMetaData | True/False. | Controls loading of client and matter metadata. If set to *False*, other client/matter related properties are ignored. |
| FusionUseCombinedClientMatter | True/False. | Controls whether matter ID and client ID from DMS are combined in ProLaw database. |
| | | This property is ignored if FusionUseClientMatterMetaData is set to *False*. |
| FusionClientMatterSearchFormName | String. | Name of the form used to retrieve client/matter metadata. |
| | | If the default legal profile is being used, do not modify this property. |
| | | If a custom profile is being used, specify a custom external form name. |
| | | The following properties related to form field names must be unique; FusionClientIdFormFieldName FusionMatterIdFormFieldName FusionClientNameFormFieldName FusionMatterNameFormFieldName This property is ignored if FusionUseClientMatterMetaData is set to *False*. |
| FusionIgnoreMissingCustomMetaData | True/False. | For debugging purposes only. |
| | Do not modify. | Leave set to *False* unless debugging. |
| FusionClientIdFormFieldName | String. | Name of field in custom form, specified in FusionClientMatterSearchFormName, to use as the client ID. |
| | | This property can be optionally set if the client ID is contained in the matter ID. |
| | | If the default legal profile is being used, do not modify this property. |
| | | This property is ignored if FusionUseClientMatterMetaData is set to *False*. |
| FusionMatterIdFormFieldName | String. | Name of field in custom form, specified in FusionClientMatterSearchFormName, to use as the matter ID. |
| | | This property must be set and may contain the client ID. |
| | | If the default legal profile is being used, do not modify this property. |
| | | This property is ignored if FusionUseClientMatterMetaData is set to *False*. |

Indexing Configuration File: AtlasIndexingService.exe.config (Continued)

| Property Name | Allowable Range | Description |
| --- | --- | --- |
| FusionClientNameFormFieldName | String. | Name of field in custom form, specified in FusionClientMatterSearchFormName, to use as the client name. |
| | | If the default legal profile is being used, do not modify this property. |
| | | This property is ignored if FusionUseClientMatterMetaData is set to *False*. |
| FusionMatterNameFormFieldName | String. | Name of field in custom form, specified in FusionClientMatterSearchFormName, to use as the matter name. |
| | | If the default legal profile is being used, do not modify this property. |
| | | This property is ignored if FusionUseClientMatterMetaData is set to *False*. |
| FusionSecurityLumpSize | Integer value. Recommended range is 75-250. | SQL statement group size parameter used when retrieving security attributes for documents. |
| FusionSecurityCacheGroups | True/False. | Controls checking group permissions for user on per-process basis. |
| indexer_CreateControllerFlag | 0/1. | Controls starting bulk load controller. This controller is responsible for preparing newly added document collections to be recognized by the load poller for indexing. |
| | | If running indexing across multiple servers in a distributed processing environment, enable this option on a single server. |
| indexer_CreateDaemonFlag | 0/1. | Controls starting the indexing daemon. This daemon is responsible for preparing existing document collections to be recognized by the load poller for re-indexing. |
| | | If running indexing across multiple servers in a distributed processing environment, enable this option on a single server. |
| indexer_CreateFtiBuildDaemonFlag | 0/1. | Controls starting the full-text indexing build daemon. This daemon is responsible for preparing newly added NextPage control services for full-text indexing. |
| | | If running indexing across multiple servers in a distributed processing environment, enable this option on a single server. |

Indexing Configuration File: AtlasIndexingService.exe.config (Continued)

| Property Name | Allowable Range | Description |
|---|---|---|
| indexer_CreateDocSyncDaemonFlag | 0/1. | Controls starting the document synchronization daemon. This daemon is responsible for preparing existing document collections to be synchronized with indexing information in the km database. If running indexing across multiple servers in a distributed processing environment, enable this option on a single server. |
| indexer_CreateBulkLoadPurgeDaemonFlag | 0/1. | Controls starting the bulk load purge daemon. This daemon is responsible for removing expired bulk load and saved search schedule items in the West km database. The expiration period is 30 days and is not currently modifiable. If running indexing across multiple servers in a distributed processing environment, enable this option on a single server. |
| indexer_CheckFtiBuildFreqSeconds | Integer value in seconds. | How often to check if a full-text indexing build needs to be started. |
| indexer_FtiBuildMaxSecondsSameDocProgress | Integer value in seconds. | Amount of time to wait for NextPage to process a document for full-text indexing. If time-out period is exceeded, the full-text indexing build is aborted. NextPage will continue to attempt to re-index the document. |
| indexer_FtiBuildThreadSleepIntervalSeconds | Integer value in seconds. | How often the full-text indexing daemon checks for documents ready to be indexed. |
| indexer_NextPageSearchFolder | String. Do not modify. | Root folder name for NextPage content services. Defaults to "Westkm." |
| indexer_NextPageExcludeList | List of file extensions separated by semicolons. | File extensions of files to ignore when building the full-text index for a content service. |
| nextpage_index_sheets | List of file paths of NextPage index sheets. | Files containing templates for building full-text indexes. |
| nextpage_htmlstore_index_sheets | List of file paths of NextPage index sheets. | Files containing templates for building full-text indexes. The @P0 parameter is populated by the administrative interface when a new HTML storage location is added. |
| indexer_DelegatedReprocessThresholdMinutes | Integer value in minutes. | Amount of time to wait before attempting to index delegated documents when the indexing service is manually stopped, unexpectedly stopped, or crashes. |
| indexer_ErrorReprocessThresholdMinutes | Integer value in minutes. | Amount of time to wait before attempting to re-index documents that errored due to a RID failure or a general failure. |

Indexing Configuration File: AtlasIndexingService.exe.config (Continued)

| Property Name | Allowable Range | Description |
| --- | --- | --- |
| indexer_PollFrequencySeconds | Integer value in seconds. | The amount of time for the LoadPoller to wait before checking if there is more indexing processes to be delegated. |
| indexer_MaxWorkerThreads | Integer value. | The maximum number of threads used by the indexer. This number should never be greater than the indexer_ProxyMax property in AtlasIndexingHelperService.exe.config. |
| indexer_DocumentBatchSize | Integer value. | Number of documents to be indexed that are assigned to a single process thread. This number is highly dependent on amount of system memory and number of CPUs. |
| indexer_DaemonIntervalSeconds | Integer value in seconds. | How often the indexing daemon checks for documents ready to be re-indexed. |
| indexer_BulkLoadRecoveryTimeSpanMinutes | Integer value in minutes. | Amount of time to wait before attempting to index "stranded" documents loaded by the bulk load controller. Stranded bulk load documents have not been scheduled for indexing yet, due to the indexing service either unexpectedly stopping or crashing. |
| indexer_MaxDocProcessingTimeInSeconds | Integer value in seconds. | Maximum time to wait for indexing of a document to be completed. If time-out period is exceeded, document is marked as corrupt and no attempt is made to re-index the document. |
| indexer_MaxRIDProcessingTimeInSeconds | Integer value in seconds. | Maximum amount of time to wait for RID processing to complete. If the time-out period is exceeded, the document is marked as bad and no attempt is made to re-index the document. |
| indexer_MaxDocRetryTimesFromService Crashing | Integer value. | Maximum number of attempts at indexing a document that has errors unrelated to indexing service stopping or crashing. |
| indexer_MaxStartHelperServiceAttempts | Integer value. | Maximum number of attempts at starting the indexing helper service. |
| indexer_HelperServiceStartTimeoutInMinutes | Integer value in minutes. | Maximum amount of time to wait for the indexing helper service to start. |
| indexer_HelperServiceStopTimeoutInMinutes | Integer value in minutes. | Maximum amount of time to wait for the indexing helper service to stop. |
| indexer_CheckSyncFreqSeconds | Integer value in seconds. | How often to check if syncing needs to be started. |
| indexer_CheckBulkLoadPurgeSeconds | Integer value in seconds. | How often to check if bulk load purging needs to be started. |
| atlas_indexing_max_data_commands | Integer value. | Maximum number of data commands to process in one round trip to avoid network errors. Default value is 40. A value of 0 processes all commands. |

Indexing Configuration File: AtlasIndexingService.exe.config (Continued)

| Property Name | Allowable Range | Description |
|---|---|---|
| atlas_indexing_htmltemproot | Local path. | Location of temporary folder used by indexing process for HTML conversions and related processing. |
| atlas_indexing_ridinfoinxml | Y/N. | Controls inclusion of RID server diagnostic information in the RID data passed back to the indexing process. |
| atlas_indexing_noconvertofhtmlfiles | Y/N. | Controls whether HTML files should run through HTML conversion process during indexing. This may be necessary if source HTML documents have a different encoding than target encoding of the West km server. |
| atlas_indexing_types_for_events | Integer value. Possible values are: 0 = PC Docs 1 = iManage 2 = Lotus Notes 3 = NTFS 4 = ProLaw V9 | Indicates what DMS types receive event records. Event records are used to determine parent/child relationships between documents and attachments. |
| atlas_indexing_eventdesc | String. | Event record description. |
| atlas_citetypes_caselawlist atlas_citetypes_sf_caselawlist atlas_citetypes_statuteslist atlas_citetypes_sf_statutslist atlas_citetypes_shortformlist | List of citation codes. Do not modify. | Citation codes representing different types of legal documents. |
| indexer_DaemonStartTime | HH:MM:SS date format. | Set start time for indexing daemon. A start time and end time define the time span during which indexing services will run. |
| indexer_DaemonEndTime | HH:MM:SS date format. | Set end time for indexing daemon. A start time and end time define the time span during which indexing services will run. |
| indexer_PollerStartTime | HH:MM:SS date format. | Set start time for indexing load poller. A start time and end time define the time span during which indexing services will run. |
| indexer_PollerEndTime | HH:MM:SS date format. | Set end time for indexing load poller. A start time and end time define the time span during which indexing services will run. |
| indexer_FtiBuildDaemonStartTime | HH:MM:SS date format. | Set start time for full-text indexing build daemon. A start time and end time define the time span during which full-text indexing builds will run. |

Indexing Configuration File: AtlasIndexingService.exe.config (Continued)

| Property Name | Allowable Range | Description |
| --- | --- | --- |
| indexer_FtiBuildDaemonEndTime | HH:MM:SS date format. | Set end time for full-text indexing build daemon.<br><br>A start time and end time define the time span during which full-text indexing builds will run. |
| indexer_DocSyncDaemonStartTime | HH:MM:SS date format. | Set start time for document syncing daemon.<br><br>A start time and end time define the time span during which document syncing will run. |
| indexer_DocSyncDaemonEndTime | HH:MM:SS date format. | Set end time for document syncing daemon.<br><br>A start time and end time define the time span during which document syncing will run. |
| indexer_BulkLoadPurgeDaemonStartTime | HH:MM:SS date format. | Set start time for bulk load purge daemon.<br><br>A start time and end time define the time span during which indexing services will run. |
| iindexer_BulkLoadPurgeDaemonEndTime | HH:MM:SS date format. | Set end time for bulk load purge daemon.<br><br>A start time and end time define the time span during which indexing services will run. |
| indexing_FtiBuildControllerServer | Name of server. | Identifies server where full-text indexing build controller is running. |
| indexing_FtiBuildControllerPort | Open port. | TCP communications port for full-text indexing build controller on full-text indexing server. |
| BulkLoadControllerServer | Localhost or name of indexing server. | Identifies indexing server. |
| BulkLoadControllerPort | Open port. | TCP communications port for indexing service on indexing server. |
| indexing_ProfileSyncControllerServer | Name of server. | Identifies server where profile sync controller is running. |
| indexing_ProfileSyncControllerPort | Open port. | TCP communications port for full-text indexing server. |
| indexer_HtmlSearchControllerPort | Open port. | TCP communications port for Html Search Service on HTML document server. |
| indexer_IndexingHelperControllerPort | Open port. | TCP communications port for indexing helper service. |
| indexer_CareServices | String. | List of display names for CaRE services. |
| indexer_StartAndStopCareService | 0/1. | Controls whether the indexing service should start and stop the CaRE service. If set to 0, the CaRE service must be started manually. |

List of Properties in Configuration Files

Indexing Configuration File: AtlasIndexingService.exe.config (Continued)

| Property Name | Allowable Range | Description |
| --- | --- | --- |
| indexer_StopCareServiceDelayMinutes | Integer value in minutes. | Amount of time to wait before stopping the CaRE service. This allows the CaRE service time to complete its current process. |
| indexer_MaxStartCareServiceAttempts | Integer value. | Maximum number of attempts at starting the CaRE service. |
| indexer_CareServiceStartTimeoutInMinutes | Integer value in minutes. | Maximum amount of time to wait for the CaRE service to start. |
| indexer_CareServiceStopTimeoutInMinutes | Integer value in minutes. | Maximum amount of time to wait for the CaRE service to stop. |
| care_Server | String. | Identifies server where CaRE service is running. |
| care_Port | Open port. | TCP communications port for CaRE service. |
| care_URI | URL. Do not modify. | For locating CaRE processes. |
| care_Hostname | URL. Do not modify. | Network name of server running CaRE CNC process. |
| care_Username | String. Do not modify. | Username for CaRE administrative account. |
| care_Password | String. Do not modify. | Password for CaRE administrative account. |
| care_NumScores | Integer value. | Controls the number of scores received from CaRE. |
| indexer_DeliveryServer | String. | Identifies server where the full-text scan index is located. |
| indexer_NextPageScanIndex_NextPageFolder | String. | NextPage location of the scan index for the KeySearch hierarchy data. |
| indexer_NextPageScanIndex_NextPageService | String. | NextPage service name that builds and updates the scan index. The scan index is an index of the KeySearch hierarchy data. |
| indexer_NextPageScanIndex_XmlFileDirectory | Local path. | Location of folder on the delivery server containing KeySearch hierarchy input data for building the scan index. |
| indexer_NextPageScanIndex_XmlFileName | Local filename. | Name of file containing KeySearch hierarchy input data. |
| indexer_NextPageScanIndex_IndexDirectory | Local path. | Location of folder on the delivery server containing the scan index for KeySearch hierarchy data. |
| indexer_NextPageScanIndex_IndexSheetFilePath | Local filename. | File containing templates for building the scan index. |
| DbConnectionString | Server name depends on system configuration; database user and password should not be modified. | West km database connection string. |

130 Appendix

Indexing Helper Configuration File: AtlasIndexingHelperService.exe.config

| Property Name | Allowable Range | Description |
| --- | --- | --- |
| indexer_ProxyMax | Integer value. | Number of proxy objects created for HTML converter and KeyCite finder components. |
| | | Must be equal or greater than the value for indexer_MaxWorkerThreads property specified in AtlasIndexingService.exe.config. If not, there will not be enough proxy objects to meet demand of worker threads and indexing errors may result. |
| indexer_IncludeCitationTitlesFlag | 0/1. | Controls RID processing to include document titles. |
| indexer_IndexingHelperControllerPort | Open port. | TCP communications port for indexing helper service. |
| atlas_htmlconvert_template | Local path. | Locations of template file containing HTML conversion options. |
| atlas_htmlconvert_charset | windows1252, utf8. | Character encoding set for HTML conversion. |
| INITIAL_HEAP_SIZE MAX_HEAP_SIZE | Integer value must be a multiple of 1024 greater than 1MB. Append the letter $k$ or $K$ to indicate kilobytes, or $m$ or $M$ to indicate megabytes. | Java Virtual Machine memory settings. These values depend on the size of an organization's documents, the number of citations contained in the documents, and the amount of server memory. Organizations with typically large documents may want to increase the initial heap size. Organizations with documents containing a high density of citations may want to increase the maximum heap size. |
| ProLawSwitch | 0 to disable tracing. | Sets tracing levels for the service. |
| | 2147483647 to enable all tracing levels. | Tracing levels are defined in the *WestGroup.ProLaw.Diagnostics* |
| | Custom combination of trace level values. Add together trace level values to enable multiple trace levels. | *.ProLawTraceLevel* config section. |
| ProLawTraceLog | Local filename path. | Set the *initializeData* attribute to the local filename path where tracing information for the service will be written. |
| atlas_indexing_query_timeout | Integer value in seconds. Do not modify. | Maximum amount of time to wait for indexing-related SQL queries to complete. |

Search Configuration File: HtmlSearchService.exe.config

| Property Name | Allowable Range | Description |
| --- | --- | --- |
| ProLawSwitch | 0 to disable tracing. | Sets tracing levels for the service. |
| | 2147483647 to enable all tracing levels. | Tracing levels are defined in the *WestGroup.ProLaw.Diagnostics* |
| | Custom combination of trace level values. Add together trace level values to enable multiple trace levels. | *.ProLawTraceLevel* config section. |
| ProLawTraceLog | Local filename path. | Set the *initializeData* attribute to the local filename path where tracing information for the service will be written. |
| indexer_HtmlSearchControllerPort | Open port. | TCP communications port for the HTML Search Service on the HTML document server. |

IIS Configuration File: Web.config

| Property Name | Allowable Range | Description |
| --- | --- | --- |
| PLTRACE_OFF<br>PLTRACE_INFO<br>PLTRACE_WARNING<br>PLTRACE_ERROR<br>ATLASTRACE_HIGHLEVEL<br>ATLASTRACE_LOWLEVEL<br>PLTRACE_ALL | Preassigned integer values.<br>Do not modify. | Tracing levels. One or more tracing levels can be enabled by setting the value for ProLawTraceSwitch. |
| DEFAULT_JURIS<br>GET_KC_FLAGS<br>APOS_AS_SECTION<br>DOC_YEAR<br>DOC_TYPE | State code.<br>True/False.<br>True/False.<br>True/False.<br>True/False. | RID processing options. These will be specific to an organization, based on document content and indexing requirements for the organization. |
| atlas_htmlconvert_template | Local path. | Locations of template file containing HTML conversion options. |
| atlas_htmlconvert_charset | UTF-8.<br>Do not modify. | Only UTF-8 is supported in order to support NextPage full-text indexing. |
| startqueryprogress | True/False.<br>Do not modify. | Controls bypassing user authentication for progress queries. |
| <WestkmDisplayOptions><br>    title<br>    docno<br>    modified_date_time<br>    author<br>    matter<br>    matter_desc<br>    dmslibraryname<br></WestkmDisplayOptions> | Y/N. | Controls display of citation information on Westlaw pages. If set to Y, information field will be hidden. |

132 Appendix

IIS Configuration File: Web.config (Continued)

| Property Name | Allowable Range | Description |
| --- | --- | --- |
| ProLawSwitch | 0 to disable tracing. 2147483647 to enable all tracing levels. Custom combination of trace level values. Add together trace level values to enable multiple trace levels. | Sets tracing levels for the service. Tracing levels are defined in the *WestGroup.ProLaw.Diagnostics .ProLawTraceLevel* config section. |
| ProLawTraceLog | Local filename path. | Set the *initializeData* attribute to the local filename path where tracing information for the service will be written. |
| DbConnectionString | Server name depends on system configuration; database user and password should not be modified. | West km database connection string. |
| WindowsDomainName | String. | Domain of the West km users. Used to authenticate Word client users. |
| atlas_AuthenticationMode | Possible values are: None kmAuthentication IWA Values are case-sensitive. | Authentication mode to use. A value of *None* uses a predefined km_test_user account. A value of *kmAuthentication* requires a custom West km account to be created by the West km administrator. A value of *IWA* uses your current Windows logon account. |

IIS Configuration File: Web.config (Continued)

| Property Name | Allowable Range | Description |
|---|---|---|
| atlas_xsl_FirmCiteList<br>atlas_xsl_FirmCiteListParentChild<br>atlas_xsl_RidXmlToKcFlagXml<br>atlas_xsl_FirmDocumentList<br>atlas_xsl_FirmDocumentListHeader<br>atlas_xsl_FirmDocumentListFullScreen<br>atlas_xsl_FirmDocContext<br>atlas_xsl_FirmDocNav<br>atlas_xsl_DbXmlToCiteListXml<br>atlas_xsl_DbXmlToDocContextXml<br>atlas_xsl_DbXmlToReferencesXml<br>atlas_xsl_DbXmlToFirmDocumentListXml<br>atlas_xsl_ChooseIndexingStats<br>atlas_xsl_ShowIndexingStats<br>atlas_xsl_ShowIndexingStatsDetail<br>atlas_xsl_SearchCiteList<br>atlas_xsl_SearchCiteListFullScreen<br>atlas_xsl_SearchCiteListHeader<br>atlas_xsl_SearchCiteListFooter<br>atlas_xsl_SearchQueryProgress<br>atlas_xsl_KeySearchAdmin<br>atlas_xsl_KeySearchCategoryDetail<br>atlas_xsl_KeySearchCategoryDetailError<br>atlas_xsl_KeySearchBrowseLocation<br>atlas_xsl_KeySearchHierarchy<br>atlas_xsl_KeySearchHierarchyLeft<br>atlas_xsl_KeySearchHierarchyRight<br>atlas_xsl_KeySearchScanNoResults<br>atlas_xsl_KeySearchScanResults<br>atlas_xsl_KeySearchScanTaxXml<br>atlas_xsl_KeySearchAdminSearch | XSL stylesheet path.<br>Do not modify. | Stylesheets for administrative tool Web pages. |
| atlas_ada_sql_GetProfileInformation<br>atlas_ada_sql_GetSplatForDocument<br>atlas_ada_sql_GetSplatForTab<br>atlas_ada_sql_GetFirmDocumentList<br>atlas_ada_sql_GetFirmDocumentList_NoDepthStars<br>atlas_ada_sql_GetFirmDocumentListCount<br>atlas_ada_sql_GetOffsets<br>atlas_ada_sql_GetCountCitedDocs<br>atlas_ada_sql_GetFirmDocumentListAll<br>atlas_ada_sql_GetCiteList<br>atlas_ada_sql_CheckDocForCites<br>atlas_sql_AddUsageRecord<br>atlas_ada_sql_GetFirmTabList | SQL statements.<br>Do not modify. | Data access statements for West km database. |
| atlas_ada_UseKCFlags | True/False.<br>Do not modify. | Controls inclusion of KeyCite flags in indexed documents.<br>Only used for testing. |
| atlas_ada_UseOldRIDFormat | True/False.<br>Do not modify. | Controls support for older RID citation markup format. Only used for testing. |
| atlas_htmlstream_size | Integer value between 0 and X. | Controls size of HTML data sent to RID server for optimizing performance. |

IIS Configuration File: Web.config (Continued)

| Property Name | Allowable Range | Description |
|---|---|---|
| atlas_applySecurityOnSplat | True/False. | Controls display of organization's West km icon. If set to *False*, icon is displayed regardless of user access to organization document list. User may still be restricted from accessing organization documents, but the icon display informs user that organization documents containing the citation do exist.<br><br>If set to *True*, the icon is only displayed after checking that user has access to at least one document in the organization's document list. |
| confidentiality_message | String.<br>Set value to "" to prevent display of message box. | Optional warning message detailing privacy concerns. The message is displayed in a pop-up window once per session. Users will see the pop-up window when they view the first organization document in that session. |
| atlas_WebProxyHost<br>atlas_WebProxyPort<br>atlas_WebProxyBypassProxyOnLocal | IP address or URL.<br>Open port number.<br>True/False. | Proxy server setup.<br>If using machine settings for proxy server setup, leave these entries commented out. |
| atlas_image_workproduct<br>atlas_image_clicktoedit<br>atlas_image_ViewMax<br>atlas_image_ViewSplit<br>atlas_image_citesDoc<br>atlas_image_nextPage<br>atlas_image_search_status<br>atlas_image_infoicon<br>atlas_image_star<br>atlas_image_ping<br>atlas_image_cFlag<br>atlas_image_gFlag<br>atlas_image_nFlag<br>atlas_image_rFlag<br>atlas_image_uFlag<br>atlas_image_yFlag<br>atlas_image_closfldr<br>atlas_image_ggo<br>atlas_image_mag_glass_tr<br>atlas_image_information<br>atlas_image_activeArrow<br>product_logo<br>firm_header_logo | Local path or URL of image file.<br>Do not modify. | Images used when displaying Westlaw pages. |
| atlas_image_Firm<br>atlas_image_FirmMoreInformation<br>atlas_ada_xml_FirmSplat<br>atlas_ada_xml_FirmDocListSplat | Modify these to change organization-specific logos and images. | Images used when displaying Westlaw pages. |

IIS Configuration File: Web.config (Continued)

| Property Name | Allowable Range | Description |
|---|---|---|
| atlas_url_DocumentContext<br>atlas_url_Document<br>atlas_url_DocumentNav<br>atlas_template_SerialNumLink<br>atlas_template_CiteLink<br>atlas_template_DocNameLink<br>atlas_template_KCSerialNumLink<br>atlas_template_KCCiteLink<br>atlas_template_KCDocNameLink<br>atlas_template_FullScreenDocListLink<br>atlas_template_ViewMaxLink | URL.<br>Do not modify. | West km URLs used by Web broker to maintain context. |
| atlas_template_clicktoeditLink | Modify domain name portion of URL to server name or domain name of KM server. | West km URLs used by Web broker to maintain context. |
| atlas_more_info_link_domain | West km admin Web page name.<br>Do not modify. | Web page to handle "More Information" link. |
| atlas_docsecurity_error_page | West km admin Web page name.<br>Do not modify. | Default error page to display when document security is violated. |
| atlas_ada_url_kcFlagServer | URL.<br>Do not modify. | KeyCite flags server for retrieving current status of KeyCite flags in Westlaw documents. |
| atlas_domain_westlaw | URL.<br>Do not modify. | Westlaw domain URL used to construct Westlaw links. |
| atlas_url_WestlawFind<br>atlas_url_WestlawKeyCite | URL.<br>Do not modify. | Westlaw URLs to link to from Word plug-in. |
| westkm_use_library_groupings | True/False. | Controls display of library groupings in Westlaw pages and the administrative tool. |
| westkm_alllibraries_text | String. | Default display name in the library grouping drop-down list. This value is only used if westkm_use_library_groupings is set to *True*. |
| atlas_use_depth_stars<br>atlas_4stars_caption<br>atlas_4stars_max<br>atlas_4stars_min<br>atlas_3stars_caption<br>atlas_3stars_max<br>atlas_3stars_min<br>atlas_2stars_caption<br>atlas_2stars_max<br>atlas_2stars_min<br>atlas_1stars_caption<br>atlas_1stars_max<br>atlas_1stars_min | Modify to change the display of citing documents and set depth of treatment categories. | Controls sort order and depth of treatment categories for citing documents in westlaw.com. |

IIS Configuration File: Web.config (Continued)

| Property Name | Allowable Range | Description |
|---|---|---|
| atlas_style_highlight<br>atlas_style_no_confidence_link<br>atlas_style_docviewerbannerbody<br>atlas_style_docviewerbannerheading | HTML text style tags. | Text styles to apply in Westlaw pages. |
| atlas_create_no_confidence_links | True/False. | Text styles to apply in Westlaw pages. |
| atlas_fdl_num_first_page<br>atlas_fdl_num_other_page | Integer value. | Controls number of organization documents to display on KC Citing Ref tab in Westlaw. |
| atlas_UseUsageTracking | True/False. | Controls enabling of usage tracking. |
| atlas_useTitleInCiteOffsets | True/False. | Controls RID processing to include document titles.<br>Only used by Word plug-in. |
| atlas_showNextPageLogo | True/False.<br>Do not modify. | Controls display of the NextPage logo in the search cite list displayed in westlaw.com. |
| atlas_record_count_for_full_security | String.<br>Possible values are:<br>Default<br>Approx<br>Morethan | How to display the record count in the organization document list when full security is on. With full security on, the user may not have rights to all the documents in the list, so the caption in the document list should indicate this. Examples would be "Approximately 34 document(s)" or "Showing more than 40 documents." |
| atlas_indexing_query_timeout | Integer value in seconds.<br>Do not modify. | Maximum amount of time to wait for indexing-related SQL queries to complete. |
| indexer_DeliveryServer | String. | Identifies server where the full-text scan index is located. |
| indexer_NextPageScanIndex_NextPageFolder | String. | NextPage location of the scan index for the KeySearch hierarchy data. |
| indexer_NextPageScanIndex_NextPageService | String. | NextPage service name that builds and updates the scan index. The scan index is an index of the KeySearch hierarchy data. |
| indexer_NextPageScanIndex_XmlFileDirectory | Local path. | Location of folder on the delivery server containing KeySearch hierarchy input data for building the scan index. |
| indexer_NextPageScanIndex_XmlFileName | Local filename. | Name of file containing KeySearch hierarchy input data. |
| indexer_NextPageScanIndex_IndexDirectory | Local path. | Location of folder on the delivery server containing the scan index for KeySearch hierarchy data. |
| indexer_NextPageScanIndex_IndexSheetFilePath | Local filename. | File containing templates for building the scan index. |
| atlas_citetypes_caselawlist<br>atlas_citetypes_sf_caselawlist<br>atlas_citetypes_statuteslist<br>atlas_citetypes_sf_statutslist<br>atlas_citetypes_shortformlist | List of citation codes.<br>Do not modify. | Citation codes representing different types of legal documents. |

IIS Configuration File: Web.config (Continued)

| Property Name | Allowable Range | Description |
|---|---|---|
| IManageMaxRowsForSearch | Integer value. | Maximum number of records to return for an iManage saved search. |
| IManageSessionTimeout | Integer value in seconds. | Session time-out value for iManage connection. |
| IManageVersion | 1.0, 1.0.1.151, 2.0 | iManage API version. |
| DmsUserIdsRequired DmsUserPasswordsRequired | Y/N. | Controls usage of iManage virtual user accounts and passwords for authenticating members. If set to Y, iManage security will determine document access rights. If set to N, internal security logic is used to determine document access rights. |
| IManageUseTrustedLogin | Y/N. | Controls login method for the iManage DMS server. Trusted login uses NT login; otherwise iManage-defined login required. |
| IManageUseCombinedClientMatter | Y/N. | Controls if matter ID and client ID from DMS should be combined in ProLaw database. |
| IManageAttrMappingTitle IManageAttrMappingAbstract IManageAttrMappingClass IManageAttrMappingMatter IManageAttrMappingMatterDescription IManageAttrMappingClient IManageAttrMappingClientDescription IManageAttrMappingAuthor | String. | Indicates how to map iManage document profile custom profile attributes to associated ProLaw document profile attributes. |
| prefetchDocsProfiles | True/False. Do not modify. | Reserved for future performance enhancement when retrieving documents from DMS. |
| PCDocsSecurityLumpSize | Integer value. Recommended range is 75-250. | SQL statement group size parameter used when retrieving security attributes for documents. |
| PCDocsSecurityCacheGroups | True/False. | Controls checking group permissions for user on per-process basis. |
| PCDocsUseClientMatterMetaData | True/False. | Indicates whether client matter metadata is used in the DMS database. |
| PCDocsUseCombinedClientMatter | True/False. | Controls if matter ID and client ID from DMS should be combined in ProLaw database. |
| PCDocsUseSubversions | True/False. | Controls use of sub-versions for documents. Important: Changing this setting requires re-indexing! |
| PCDocsUseMatterCustomSql | True/False. | Controls if matter ID and client ID should be retrieved from custom profile instead of default legal profile. |

Appendix

IIS Configuration File: Web.config (Continued)

| Property Name | Allowable Range | Description |
| --- | --- | --- |
| PCDocsMatterCustomSql | SQL statement. The following aliases must be used: matter_id matter_name client_id client_name | SQL query used to retrieve matter ID and client ID from custom profile. |
| PLClientMatterSeperator | "-" (hyphen). Do not modify. | Separator character to be used when creating combined client ID and matter ID attribute in ProLaw document profile. |
| FusionUseIndividualLogins | True/False. | Control if Load Copy should use individual login (entered in Professionals page) or administrative level account. Can only be set to *True* in web.config. |
| FusionGetQuickSearchFormName | String. Do not modify. | Name of form used to retrieve the list of quicksearches from the Fusion server. |
| FusionGetVersionInfoFormName | String. Do not modify. | Name of form used to retrieve version information from the Fusion server. |
| FusionUseSubversions | True/False. | Controls use of sub-versions for documents. Important: Changing this setting requires re-indexing. |
| FusionUseDbFormsToRunQuickSearch | True/False. | Controls if database forms are used to run quicksearches. This should only be set to *True* if Fusion server was upgraded or if customized forms are being used. |
| FusionNonDbRunQuickSearchFormName | String. | Name of form used to run a quicksearch. This is an external form, not a database form. This property is ignored if FusionUseDbFormsToRunQuickSearches is set to *False*. |
| FusionDefaultProfileSearchFormName | String. Do not modify. | Name of form used to retrieve the default profile metadata from the Fusion server. |
| FusionUseClientMatterMetaData | True/False. | Controls loading of client and matter metadata. If set to *False*, other client/matter related properties are ignored. |
| FusionUseCombinedClientMatter | True/False. | Controls whether matter ID and client ID from DMS are combined in ProLaw database. This property is ignored if FusionUseClientMatterMetaData is set to *False*. |

IIS Configuration File: Web.config (Continued)

| Property Name | Allowable Range | Description |
|---|---|---|
| FusionclientMatterSearchFormName | String. | Name of the form used to retrieve client/matter metadata. |
| | | If the default legal profile is being used, do not modify this property. |
| | | If a custom profile is being used, specify a custom external form name. |
| | | The following properties related to form field names must be unique: FusionClientIdFormFieldName FusionMatterIdFormFieldName FusionClientNameFormFieldName FusionMatterNameFormFieldName |
| | | This property is ignored if FusionUseClientMatterMetaData is set to *False*. |
| FusionIgnoreMissingCustomMetaData | True/False. | For debugging purposes only. |
| | Do not modify. | Leave set to *False* unless debugging. |
| FusionClientIdFormFieldName | String. | Name of field in custom form, specified in FusionClientMatterSearchFormName, to use as the client ID. |
| | | This property can be optionally set if the client ID is contained in the matter ID. |
| | | If the default legal profile is being used, do not modify this property. |
| | | This property is ignored if FusionUseClientMatterMetaData is set to *False*. |
| FusionMatterIdFormFieldName | String. | Name of field in custom form, specified in FusionClientMatterSearchFormName, to use as the matter ID. |
| | | This property must be set and may contain the client ID. |
| | | If the default legal profile is being used, do not modify this property. |
| | | This property is ignored if FusionUseClientMatterMetaData is set to *False*. |
| FusionClientNameFormFieldName | String. | Name of field in custom form, specified in FusionClientMatterSearchFormName, to use as the client name. |
| | | If the default legal profile is being used, do not modify this property. |
| | | This property is ignored if FusionUseClientMatterMetaData is set to *False*. |

140 Appendix

IIS Configuration File: Web.config (Continued)

| Property Name | Allowable Range | Description |
|---|---|---|
| FusionMatterNameFormFieldName | String. | Name of field in custom form, specified in FusionClientMatterSearchFormName, to use as the matter name.<br><br>If the default legal profile is being used, do not modify this property.<br><br>This property is ignored if FusionUseClientMatterMetaData is set to *False*. |
| FusionSecurityLumpSize | Integer value. Recommended range is 75-250. | SQL statement group size parameter used when retrieving security attributes for documents. |
| FusionSecurityCacheGroups | True/False. | Controls checking group permissions for user on per-process basis. |
| PLDmsServicePort | Open port. | .NET Remoting port number.<br><br>This property must have the same value in all service configuration files. |
| PCDocsDmsServiceEndPoint | PCDocsDmsService. Do not modify. | .NET Remoting endpoint. |
| NtfsDirServiceEndPoint | NtfsDirectoryService. Do not modify. | .NET Remoting endpoint. |
| NtfsFileServiceEndPoint | NtfsFileService. Do not modify. | .NET Remoting endpoint. |
| BulkLoadControllerServer | Localhost or name of indexing server. | Identifies indexing server. |
| BulkLoadControllerPort | Open port. | TCP communications port for indexing service on indexing server. |
| indexing_FtiBuildControllerServer | Name of server. | Identifies server where full-text indexing build controller is running. |
| indexing_FtiBuildControllerPort | Open port. | TCP communications port for full-text indexing build controller on full-text indexing server. |
| indexing_ProfileSyncControllerServer | Name of server. | Identifies server where profile sync controller is running. |
| indexing_ProfileSyncControllerPort | Open port. | TCP communications port for full-text indexing server. |
| atlas_doc_marginHeight | Integer value in pixels. | Controls vertical margin when displaying organization documents. |
| atlas_doc_marginWidth | Integer value in pixels. | Controls horizontal margin when displaying organization documents. |
| atlas_error_page | West km admin Web page name. Do not modify. | Default error page for admin screens. |
| heracles_nextpage_enabled | True/False. | Controls whether full-text index builds are performed. |

IIS Configuration File: Web.config (Continued)

| Property Name | Allowable Range | Description |
|---|---|---|
| heracles_nextpage_max_hits | Integer value. | Maximum number of documents to process for full-text indexing. |
| heracles_nextpage_overflow_hits | Integer value. | Maximum number of documents to process before generating an exception. To prevent an exception, this number must be greater than the value for heracles_nextpage_max_hits.<br><br>Allows overriding of heracles_nextpage_max_hits in cases where the organization wants to be notified after a certain number of documents have been processed. |
| heracles_nextpage_query_timeout | Integer value. | Maximum amount of time to wait for NextPage-related SQL queries to complete. If time-out period is exceeded, an exception is generated and document is not indexed. |
| heracles_nextpage_search_root | String.<br>Do not modify. | Root folder name for NextPage content services.<br>Defaults to "Westkm." |
| heracles_natural_language_config_root | Local path. | Location of Natural Language configuration files. |
| heracles_page_size | Integer value. | Number of records to be displayed per page. |
| heracles_progress_refresh_rate | Integer value in seconds.<br>Do not modify. | Amount of time between page refreshes for the administrative tool status page. |
| prolaw_doc_fulltext_sort_limit | Integer value. | Maximum number of records that ProLaw will allow to be sorted for display through the ProLaw UI. If search results are more than this number, sorting will not be allowed on full-text searches. |
| prolaw_doc_search_minimum_process_count | Integer value. | Number of documents to process for full-text indexing when full security is on. With full security on, the user may not have rights to all the documents in the list. The atlas_record_count_for_full_security property will control how the count of matching documents with user rights is displayed in the ProLaw UI. |
| prolaw_doc_search_max_in_clause | Integer value. | Performance factor for controlling maximum number of documents to include in specific SQL queries. |
| prolaw_doc_search_security_mult_factor | Integer value. | Performance factor related to the percentage of documents to which users have rights. Used to reduce the number of database accesses caused by users having rights to a low percentage of total documents indexed. |

IIS Configuration File: Web.config (Continued)

| Property Name | Allowable Range | Description |
|---|---|---|
| prolaw_doc_search_ft_term_mult_factor | Integer value. | Performance factor related to prolaw_doc_search_security_mult_factor. Used to reduce the number of database accesses caused by searches using more than just full-text criteria. |
| prolaw_doc_search_max_hits | Integer value. | Maximum number of documents to process for full-text indexing. |
| prolaw_doc_search_overflow_hits | Integer value. | Maximum number of documents to process before generating an exception. To prevent an exception, this number must be greater than the value for prolaw_doc_search_max_hits. Allows overriding of prolaw_doc_search_max_hits in cases where organization wants to be notified after a certain number of documents have been processed. |
| prolaw_doc_search_querytimeout | Integer value. | Maximum amount of time to wait for NextPage-related SQL queries to complete. If time-out period is exceeded, an exception is generated and document is not indexed. |
| plgrid_pagesize | Integer value. | Number of full-text search result items to display per page. |
| showDocumentContext | True/False. | Controls display of document context in the More Information pages. |
| KeyCiteModeMsg | String. | Message to display in document profile view under More Information link if that document has not been processed by KeyCite. |
| atlas_firm_name | String. | Text to display under the top category in the firm customized KeySearch hierarchy view. |
| atlas_ks_show_doc_counts_in_westlaw | True/False. | Controls automatic display of document counts in Westlaw KeySearch hierarchy view. Document count equals the number of CaRE classified documents plus the number of manually classified documents. |
| atlas_ks_show_get_doc_count_link_in_westlaw | True/False. | Controls display of the *Get Doc Counts* link in Westlaw KeySearch hierarchy view. This property is ignored if atlas_ks_show_doc_counts_in_westlaw is set to *True*. |
| atlas_ks_show_doc_counts_in_admin_tool | True/False. | Controls automatic display of document counts in the KeySearch administrative view. Document count equals the number of CaRE classified documents plus the manually classified documents. |

IIS Configuration File: Web.config (Continued)

| Property Name | Allowable Range | Description |
|---|---|---|
| atlas_ks_show_get_doc_count_link_in_admin_tool | True/False. | Controls display of the *Get Doc Counts* link in KeySearch administrative view.<br><br>This property is ignored if atlas_ks_show_doc_counts_in_admin_tool is set to *True*. |
| atlas_ks_doc_counts_query_timeout_secs | Integer. | Maximum amount of time to wait for completion of SQL query to calculate KeySearch document counts. |
| atlas_care_enabled | True/False. | Controls whether documents are processed with CaRE. |
| atlas_ks_toggle_text | String. | Text to display under the link in Westlaw to enable a user to toggle to the KeySearch hierarchy that retrieves Westlaw documents only. |
| UsageReportFile | Local filename path. | Contains output from usage report generator. |
| MoreInfoDisplayOption | Y/N. | Controls display of More Information link. |
| ShowIndividualStatusCode | Y/N. | Controls whether indexing statistics are displayed with grouped status codes or individual status codes for indexing and error counts on the administrative tool Indexing Statistics page. |
| IndexingStatsQueriesBufferInSeconds | Integer value in seconds. | Include in the indexing statistics the scheduled indexing runs for a document collection that have been started within this amount of time prior to the latest scheduled indexing run. This allows indexing statistics to more accurately reflect indexing counts for concurrent update and "catch-up" indexing processes. Catch-up indexing processes changes that do not require the HTML conversion and cite recognition stages of indexing. For example, an indexing update requiring 2 documents to be re-indexed is scheduled 1 second after a catch-up indexing process on 3 documents. The statistics should reflect a total of 3 documents currently being indexed. |
| <httpHandlers><br>  <add verb="*" path="PLDefault.aspx" type="ProLaw.Broker.ProLawBroker, ProLaw.Broker" /><br></httpHandlers> | String. | Identifies the Http Handler for requests to PLDefault.aspx.<br><br>PLDefault.aspx is the entry point into More Information. |

IIS Configuration File: Web.config (Continued)

| Property Name | Allowable Range | Description |
|---|---|---|
| <httpHandlers><br>  <add verb="*" path="ksAdmin.aspx" type="ProLaw.Broker.AtlasBroker, ProLaw.Broker" /><br>  <add verb="*" path="ksAddCategory.aspx" type="ProLaw.Broker.AtlasBroker, ProLaw.Broker" /><br>  <add verb="*" path="ksBrowseLocation.aspx" type="ProLaw.Broker.AtlasBroker, ProLaw.Broker" /><br></httpHandlers> | String. | Identifies the Http Handler for requests to various KeySearch pages. |
| compilation | Debug attribute can be true or false. | Controls ASP.NET debugging.<br>Leave set to *false* unless debugging ASP.NET; otherwise run-time performance will be impacted. |
| customErrors | DefaultRedirect attribute set to West km admin Web page name. Do not modify.<br>Mode attribute can be set to the following:<br>On<br>Off<br>RemoteOnly | Controls display of custom error page.<br>Leave Mode attribute set to *RemoteOnly* for security purposes. |
| authentication | Mode attribute can be set to the following:<br>Windows<br>Forms<br>Passport<br>None | Controls authentication method for ASP.NET.<br>Leave Mode attribute set to *Windows* for security purposes. |
| trace | Do not modify. | Controls enabling of application trace logging. |
| SessionState | Server IP address depends on system configuration; database user and password should not be modified. | West km database connection string. |

CaRE Configuration File: defaults.conf

| Property Name | Allowable Range | Description |
| --- | --- | --- |
| app.cwd | Local path replaces [_km_CareInstallDir]. | CaRE installation folder, which is usually C:\Program Files\Westkm\CaRE\. |
| exchangePort | Open port. | Used for communications between the West km CaRE service and the West km CaRE CNC service. The default port is 11115. This value needs to change only if there is a port conflict. |

CaRE Configuration File: ksh.classify.server.conf

| Property Name | Allowable Range | Description |
| --- | --- | --- |
| config.includes | Local path(s). Multiple file paths must be separated by semicolon. | Location of other configuration files to include. The CaRE installation folder replaces [_km_CareInstallDir]. |
| param.sideArray.memoryLimit | Integer. | Controls the amount of memory used by CaRE processes. The total memory used by CaRE is 650 MB plus this property value. By default, 1 GB of dedicated RAM is used, translating to a value of *350000000* for this property. |
| log.file | String. Valid substitutions are %Y - 4-digit year %y - 2-digit year %m - 2-digit 0-padded number representing the month %d - 2-digit 0-padded number representing the day | Path and log filename format string. |
| log.format.long | 1/0. | Controls the format of log messages. If set to *1*, the service uses a long format that places a time stamp on each log message. |
| log.format.stderr | 1/0. | Controls whether messages are logged to standard error, i.e., console (screen) output, as well as the log file specified in log.file. A value of *1* enables standard error logging. A value of *0* disables it. Standard error logging is useful only when debugging the console version of CaRE. It doesn't apply to the Windows service version used with West km. |

CaRE Configuration File: cnc_ksh.conf

| Property Name | Allowable Range | Description |
| --- | --- | --- |
| config.includes | Local path(s). Multiple file paths must be separated by semicolon. | Location of other configuration files to include. The CaRE installation folder replaces [_km_CareInstallDir]. |
| param.net.httpPort | Open port. | TCP communications port for the West km CaRE CNC service. It must match the care_Port property in AtlasIndexingService.exe.config. The default port is 11116. This value needs to change only if there is a port conflict. |
| log.file | String. Valid substitutions are %Y - 4-digit year %y - 2-digit year %m - 2-digit 0-padded number representing the month %d - 2-digit 0-padded number representing the day | Path and log filename format string. |
| log.format.long | 1/0. | Controls the format of log messages. If set to 1, the service uses a long format that places a time stamp on each log message. |
| log.format.stderr | 1/0. | Controls whether messages are logged to standard error, i.e., console (screen) output, as well as the log file specified in log.file. A value of 1 enables standard error logging. A value of 0 disables it. Standard error logging is useful only when debugging the console version of CaRE. It doesn't apply to the Windows service version used with West km. |
| threadCount | 1. | The number of threads used for low priority tasks in the Command and Control (CnC) program. There are no low priority tasks defined when CnC is used within West km, so this property should be set to 1. |
| priorityThreadCount | 1-9. | The number of threads the Command and Control (CnC) program uses to simultaneously process classification requests. A value of 9 (the default) directs the CnC program to use up to 9 simultaneous threads, thereby enhancing performance. The CnC program is responsible for routing classification requests from multiple clients to the CaRE engine. |

Index

–A–

ActiveX controls 14
activity, tracking 81
adding
    databases 61
    document collections 65
    document storage locations 62
    KeySearch topics 51
    members 78
administering West km members 76
administrative tool 59, 77
administrator
    account 21, 34, 60
    initial user 12, 19
    KeySearch 49, 77
    rights 77
anonymous
    disabling in NextPage NXT 3 15
    IIS permissions 36
assigning documents 53
AtlasIndexingHelperService.exe.config
    distributed architecture configuration 90
    properties listing 131
    setting properties 89
    trace log configuration 83
AtlasIndexingService.exe.config
    CaRE configuration 27
    distributed architecture configuration 90
    DOCS Open configuration 47
    DOCSFusion configuration 47
    error re-indexing threshold 72
    iManage configuration 46
    properties listing 121
    setting properties 89
    trace log configuration 83
authentication
    custom 36
    in iManage 78
    integrated Windows 34
    none 38
    and Professionals table 80
    setting security 30
automated setup 109

–B– bulk index 69, 72
bypass cite recognition 66

–C–

CaRE
    *See* classification and routing engine (CaRE)
    trace logs 83
CaRE flat-file database 25
changing West km images 92
citations only 66
Cite ID servers (RID) 3
classification and routing engine (CaRE)
    configuration 25
    configuration files 89
    document counts 94
    enabling 11
    flat-file database 25
    at indexing 49, 57, 67
    at installation 6
    Simple CaRE Driver 27, 97
    trace logs 83
client
    West km 14
client, West km 101
cnc_ksh.conf 89, 147
configuration
    of CaRE 25
    of DMS services 44
    files 46, 89, 121
    IIS 34
    iManage 45
    of West km trace logs 84
content service, NextPage NXT 3 116
copying KeySearch topics 52
Corel WordPerfect 58
counts of documents classified by CaRE 94
custom authentication 36
customizing KeySearch topics 50

–D– databases
    designating 61
    installed 107
    *See also* CaRE flat-file database
    *See also* West km database
    *See also* West km RID database
date of indexing 67, 74
default
    CaRE memory setting 26
    depth of treatment ranges 92
    display name for document collection 67
    document security 75
    image file names 92
    jurisdiction 66
    number of document assignments via CaRE 27
    ports 90
    professionals table configuration 79
    security setting 30
    sort order 92
    trace log locations 82
    usage tracking setting 88
    West km installation folder 102 defaults.conf 89, 146
defining document collections 65
deleting
    documents 55, 58, 73
    KeySearch topics 53
delivery server
    installed software 5, 6
    installing West km 7
    name 11
    NextPage NXT 3 109
    permissions 34
    port settings 119
depth of treatment stars 92
desktop installation of West km client 101
display name for document collection 67
distributed architecture
    diagram 3
    event logs in 29, 81
    installing West km in 7
    setting properties 90
dll files registered 107
DMS 57
    configuration 44
    designating databases with 61
    libraries 61
    properties 46
    server 3
DOCS Open
    document security and authentication 31
    domain administrator account 34, 60
    domain user account 62
    properties 47
DOCSFusion
    configuring 44
    document security and authentication 32
    domain user account 61
    properties 47
document collections
    defining 65
    designating databases containing 61
    editing 68
    removing 70
    synchronizing 73
    updating full-text indexes 58, 74
    updating indexes 58, 67, 69, 72
documents
    assigning to KeySearch topics 53
    CaRE counts 94
    deleting 55, 73
    HTML 57, 62
    indexing 57, 69
    monitoring indexing of 70, 75
    removing from KeySearch topics 54
    searching 55
    security 75
    setting number of CaRE assignments 27
    sort order 92
    synchronizing 58
domain administrator account 34, 60 domain name 11, 60

–E–
editing
    document collections 68
    KeySearch topics 52
    members 78
error events 82
event log 29
    monitoring 81
exporting usage 88
exporting usage data 86

–F–
failures 82
features of West km 1
files
    installed 107
    See also configuration files
finding members in the Professionals table 77
folders installed 107
full index 69, 72
full-text indexing
    creation of 57
    enabling 11
    monitoring 75
    updates 58, 74
    See also full-text searching
    See also indexing
    See also NextPage NXT 3
full-text searching
    administrator account 60
    creating the content service 75, 116
    disabling anonymous access 15
    folder 107
    and KeySearch 49
    password 60, 112
    software 5
    See also full-text indexing
    See also NextPage NXT 3

–H–
hiding KeySearch topics 52
hierarchy, KeySearch 50
HTML document server 3
    installed software 5, 6
    installing West km 7
    NextPage NXT 3 109
    permissions 34
    port settings 119
    services 29
    storage locations 62
HTML documents 57, 62
HTML search service
    See West km HTML search service
HtmlSearchService.exe.config 89
    distributed architecture configuration 90
    properties listing 132
    setting properties 89 trace log configuration 83

–I–

IIS
- configuration file
  - See Web.config
- permissions 36
- trace log 82

IIS Web server 3
images, changing 92
iManage
- authentication with 78
- configuration 45
- document security and authentication 31
- properties 46 include subfolders 66
incremental indexing updates 69, 72
indexing
- bulk 69, 72
- configuration file
  - See AtlasIndexingService.exe.config
- monitoring 70, 75
- stopping 73
- updates 58, 67, 69, 72
- See also full-text indexing indexing helper
- configuration file
  - See AtlasIndexingHelperService.exe.config
- trace log 83 indexing server 3
- installed software 5, 6
- installing West km 7
- name 11
- permissions 34
- port settings 119
- services 29 indexing service
- See West km indexing service indexing trace log 83
information events 81
information manager 49, 77
initial West km administrative user 12, 19
installed databases, folders, and files 107
installing
- NextPage NXT 3 109
- West km 5, 7
- West km client 101 integrated Windows authentication 34, 78, 80
Internet Explorer 6, 8
Internet Information Server (IIS) 6
- See also IIS

–J– jurisdiction 66

–K–

KeyCite 55, 92
KeySearch data, importing 20
KeySearch topics
- adding 51
- assigning documents to 53
- copying 52
- customizing 50
- deleting 53
- editing 52
- hiding and showing 52
- removing documents from 54
- setting number of CaRE document assignments 27 ksh.classify.server.conf 26, 89, 146

–L– legal topics
- See KeySearch topics library
- DMS 61
- name 67 logs
- event 81
- trace 82, 84
- usage 86
- viewing 86

Lotus Notes 33
Lotus Word Pro 58

–M– members 76
- adding 78
- editing 78
- finding in the Professionals table 77 memory, setting CaRE 26
Microsoft .NET Framework 6, 7
Microsoft SQL Server
- port setting 119
- software requirement 6
- system administrator account 21

Microsoft Word 58
monitoring indexing 70, 75

–N– naming a document collection 67
network ID 76
network installation of West km client 104
NextPage NXT 3 5
- administrator account 60
- creating the content service 75, 116
- disabling anonymous access 15
- folder 107
- installing 109
- password 60, 112
- removing 118
- updating 112

Notepad 88
- configuration files 90
- display properties 93, 94
- images 92
- trace logs 84, 85, 86
- usage tracking 88

NT file system

Index designating databases 63
document security and authentication 33
domain administrator account 34, 60
indexing documents 57
NT integrated Windows authentication 34, 78, 80

–O–

OLE DB Provider 6
overview of West km 1

–P– passwords
    full-text searching 60, 112
    Microsoft SQL Server 21
    West km 30, 80
    Westlaw 12, 76
path name, West km 9
PCDocs
    See DOCS Open
permissions
    IIS 36
    West km NT security 34, 39
ports 90, 119
professionals
    See members
ProLaw
    adding document collections with 68
    designating databases with 62
    document security and authentication 33
    and Sybase database server 6
ProLaw event log 29
    monitoring 81
properties
    in configuration files 89, 121
    in a distributed architecture 90
    DMS 46
    event log 29
proxy server 12, 103, 104

–Q– querying
    members in the Professionals table 77
    usage 88
    usage data 86

–R–

RAM, setting CaRE 26
registered .dll files 107
removing
    document collections 70
    documents from KeySearch 54
    West km application 97
    West km client 105
    West km full-text indexing application 118
    See also deleting
reporting usage 88
requirements 6, 39
RID database
    See West km RID database RID servers 3
rights
    administrator 77
    West km NT security 34

–S– search
    configuration file
        See HtmlSearchService.exe.config
    trace log 83
searching documents 55
security
    requirements 39
    setting a document security level 75
    setting a model for West km 30
server components 1, 5
services
    defaults for NT 34
    monitoring events 81
    See also West km services
setting properties 89
setup, automated 109
showing KeySearch topics 52
silent installation of West km client 104
Simple CaRE Driver 27, 97
software
    installed 5
    requirements 6
sorting of citing documents 92
stars 92
statistics, indexing 70
stopping
    indexing 73
    West km services 73
storage of documents 62
Sun Java Runtime Environment 6, 8
Sybase database server 6
synchronizing document collections 58, 73
    See also indexing
system diagram
    typical server configuration 3, 90
    West km NT security 34
    West km server components 1
system requirements 6

–T– time of indexing 67, 74
topics, legal
    See KeySearch topics
trace logs
    configuring 84
    using 82
    viewing 86
tracking
    program activity 81
    usage 86
transactions, usage 86

–U– updating
- full-text indexes 58, 74
- indexes 58, 67, 69, 72
- NextPage NXT 3 112 usage, tracking 86 users
- *See* members

–V– viewing trace logs 86
virtual logins 78

–W– warning events 82
Web share virtual directory 100
Web.config
- authentication 36
- display properties 93, 94
- distributed architecture configuration 90
- DOCS Open configuration 47
- DOCSFusion configuration 47
- image properties 92
- iManage configuration 46, 79
- indexing statistics 71
- properties listing 132
- setting properties 89
- trace log properties 83
- usage tracking properties 88

West km
- administrative tool 59, 77
- authentication 80
- automated setup 109
- custom authentication 36
- documents
  - defining collections 65
  - deleting 55, 58
  - indexing 57, 69
  - removing collections 70
  - security 75
  - sort order 92
  - synchronizing collections 73
  - updating full-text indexes 58, 74
  - updating indexes 58, 67, 69, 72
- images 92
- initial administrative user 12, 19
- installing 5
- members 76
- overview 1
- passwords 30
- security 30, 75
- security requirements 39
- server components 1, 81
- services 29
- tracking activity 81

West km application 5
- installing 7
- removing 97

West km CaRE CNC service
- activity log 83
- starting 29
- stopping 73

West km CaRE service
- activity log 83
- starting 29
- stopping 73

West km client
- enabling 14
- installing 101
- removing 105

West km database 3
- creating 16
- importing KeySearch data 20
- at installation 5, 11, 107

West km database server
- installed software 5, 6
- name 11

West km HTML search service
- activity log 83
- at installation 6
- starting 29

West km IIS Lockdown utility 39

West km indexing helper service
- activity log 83
- starting 29
- stopping 73

West km indexing service 5
- activity log 83
- starting 29
- stopping 73

West km RID database 3
- creating 22
- at installation 5, 107
- server name 11

West km server 3

West km services
- configuration files 89
- monitoring events 81
- starting 29
- stopping 73

Westlaw
- and KeyCite 92
- and KeySearch 50
- passwords 12, 76
- servers 3

Windows 2000 Server 6

Windows authentication
- *See* integrated Windows authentication

Conclusion

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A system comprising:
a processor; and
a memory that contains instructions that are readable by the processor and cause the processor to:
receive a query that indicates at least one legal topic;
provide a response to the query indicating each work-product document and each case law document that matches the at least one legal topic, wherein each indicated work-product document includes a depth-of-treatment value indicating a degree to which each indicated work-product document evaluates a specific case law document;
indicate, in the response provided to the query, a reliability of each work-product document using:
a validity indicator for each work-product document, the validity indicator for each work-product document indicating a validity status of at least one case cited within each work-product document; and
a rating indicator for each work-product document, the rating indicator for each work-product document indicating a user rating of each work-product document based on previous users of each work-product document, the user rating indicating a utility of the document as determined by the previous users of each wok-product document; and
prior to providing the response:
retrieve each work-product document that matches the at least one legal topic from a first database; and
retrieve each case law document that matches the at least one legal topic from a second database.

2. The system recited in claim 1, wherein the query indicates the at least one legal topic from a hierarchy of legal topics.

3. The system as recited in claim 1, wherein the instructions further cause the processor to:
receive a second query for a particular case law document; and
provide a second response to the second query indicating each work-product document which includes at least one legal citation associated with the particular case law document according to a depth-of-treatment value, the depth-of-treatment value indicates a degree to which each work-product document evaluates the particular case law document.

4. The system recited in claim 3, wherein the instructions further cause the processor to:
index each work-product document according to a hierarchy of legal topics based on the at least one legal citation and the set of text; and
index each case law document according to the hierarchy of legal topics.

5. The system recited in claim 3, wherein the degree to which each work-product document is evaluated is based on at least a count that each legal citation references the particular case law document.

6. The system recited in claim 3, wherein, each work-product document and each case law document is associated with a respective date, wherein, the second response is organized according to the depth-of-treatment value and a chronological order based on the respective date.

7. The system recited in claim 1, wherein the query is an enterprise search query.

8. The system recited in claim 1, wherein the instructions further cause the processor to:
determine the validity status of the at least one case cited within each work-product document, resulting in the validity indicator used in the indication of reliability of each work-product document.

9. The system recited in of claim 7, wherein the first and second databases are separated by a firewall.

10. The system recited in claim 1, wherein the processor further converts at least one work-product document of the each work-product document into a markup language.

11. The system recited in claim 1, wherein the query is received from an agent of a law firm, via a user-device, wherein each work-product document comprises internal law-firm content including at least one of briefs, client letters and legal memoranda.

12. The system recited in claim 1, wherein, each work-product document and each case law document is associated with a respective date, wherein, each work-product document and non-work product document that matches the at least one legal topic indicated by the response, is organized according to a chronological order based on the respective date.

13. The system recited in claim 1, wherein the processor is further operable to:
provide the hierarchy of legal topics for display on a user-device; and
indicate a number of work-product documents associated with each legal topic of the hierarchy of legal topics.

14. The system recited in claim 1, wherein each work-product document is associated with an indicator that identifies an author of the work-product document and an office location of the author.

15. A tangible, non-transitory, computer-readable media having software encoded thereon, the software, when executed by a processor, operable to:
index at least one work-product document according to a hierarchy of legal topics based on at least one legal citation and at least a set of text corresponding to the at least one work-product document, each legal citation further associated with a case law document having legal precedence;
receive a query that indicates at least one legal topic from the hierarchy of legal topics; and
provide a response to the query indicating each work-product document that matches the at least one legal topic and each case law document associated with each legal citation corresponding to each work-product document, wherein each indicated work-product document includes a depth-of-treatment value indicating a degree to which each indicated work-product document evaluates a specific case law document;
indicate, in the response provided to the query, a reliability of each work-product document using:
a validity indicator, the validity indicator indicating a legal precedence validity status of each case law document associated with each legal citation corresponding to each work-product document; and a rating indicator, the rating indicator indicating a user rating of each work-product document based on previous users of each work-product document, the user rating indicating a utility of the document as determined by the previous users of each wok-product document; and prior to providing the response:
retrieve each work-product document that matches the at least one legal topic from a first database; and
retrieve each case law document that matches the at least one legal topic from a second database.

16. The non-transitory, computer-readable media of claim 15, wherein, the software, when executed by the processor, is further operable to:
index each case law document according to the hierarchy of legal topics, and
wherein, when the response to the query further indicates each case law document that matches the at least one legal topic.

17. The non-transitory, computer-readable media of claim 16, wherein, the software, when executed by the processor, is further operable to:
determine the validity indicator for each case law document.

18. A method for facilitating a knowledge management system comprising:
receiving at least one work-product document, each work-product document including at least one legal citation and at least a set of text, the at least one legal citation associated with a non-work-product document having legal precedence;
indexing each work-product document according to a hierarchy of legal topics based on the at least one legal citation and the set of text;
indexing each non-work-product document associated with the at least one legal citation included in each work-product document according to the hierarchy of legal topics;
generating a validity indicator that indicates a validity status of the legal precedence for each non-work-product document associated with the at least one legal citation included in each work-product document;
generating an indicator that indicates a user rating of each work-product document based on previous users of each work-product document, the user rating indicating a utility of the document as determined by the previous users of each wok-product document;
receiving a query that indicates at least one legal topic of the hierarchy of legal topics; and
providing a response to the query indicating each work-product document and non-work-product document that matches the at least one legal topic, the response indicating a reliability of each work-product document using the validity indicator for each non-work-product document and the rating indicator for each work-product document, wherein each work-product document that matches the at least one legal topic is retrieved from a first database, and wherein each non-work-product document that matches the at least one legal topic is retrieved from a second database, and wherein each indicated work-product document includes a depth-of-treatment value indicating a degree to which each indicated work-product document evaluates a specific non-work-product document.

* * * * *